(12) United States Patent
Oh et al.

(10) Patent No.: US 11,601,963 B2
(45) Date of Patent: *Mar. 7, 2023

(54) COMMUNICATION METHOD AND DEVICE IN MOBILE COMMUNICATION SYSTEM

(71) Applicant: Samsung Electronics Co., Ltd., Gyeonggi-do (KR)

(72) Inventors: Jinyoung Oh, Seoul (KR); Jeongho Yeo, Gyeonggi-do (KR); Younsun Kim, Gyeonggi-do (KR); Seunghoon Choi, Gyeonggi-do (KR); Taehan Bae, Seoul (KR)

(73) Assignee: Samsung Electronics Co., Ltd

( * ) Notice: Subject to any disclaimer, the term of this patent is extended or adjusted under 35 U.S.C. 154(b) by 148 days.

This patent is subject to a terminal disclaimer.

(21) Appl. No.: 17/120,741

(22) Filed: Dec. 14, 2020

(65) Prior Publication Data

US 2021/0100020 A1 Apr. 1, 2021

Related U.S. Application Data

(63) Continuation of application No. 16/429,789, filed on Jun. 3, 2019, now Pat. No. 10,869,330, which is a
(Continued)

(51) Int. Cl.
*H04W 72/04* (2009.01)
*H04W 72/12* (2023.01)
(Continued)

(52) U.S. Cl.
CPC ....... *H04W 72/1284* (2013.01); *H04L 5/0044* (2013.01); *H04L 5/0053* (2013.01);
(Continued)

(58) Field of Classification Search
CPC ................. H04L 12/28; H04L 12/50
(Continued)

(56) References Cited

U.S. PATENT DOCUMENTS

2011/0249582 A1 10/2011 Choi et al.
2013/0143614 A1 6/2013 Lee et al.
(Continued)

FOREIGN PATENT DOCUMENTS

CN 104885506 9/2015
CN 105052068 11/2015
(Continued)

OTHER PUBLICATIONS

PCT/ISA/210 Search Report issued on PCT/KR2017/001182 (pp. 4).
(Continued)

*Primary Examiner* — Dang T Ton
(74) *Attorney, Agent, or Firm* — The Farrell Law Firm, P.C.

(57) ABSTRACT

Provided is a terminal that includes a transceiver that transmits and receives signals, and a controller that receives, from a base station, control information including uplink configuration information for a plurality of subframes, to confirm information, for uplink transmission, from the uplink configuration information, and transmit an uplink signal based on the information for the uplink transmission, and a method for controlling the terminal.

20 Claims, 35 Drawing Sheets

Related U.S. Application Data continuation of application No. 16/075,911, filed as application No. PCT/KR2017/001182 on Feb. 3, 2017, now Pat. No. 10,694,539.

(60) Provisional application No. 62/328,284, filed on Apr. 27, 2016, provisional application No. 62/291,676, filed on Feb. 5, 2016.

(51) Int. Cl.
  *H04W 74/00* (2009.01)
  *H04L 5/00* (2006.01)
  *H04W 52/34* (2009.01)
  *H04W 72/0446* (2023.01)

(52) U.S. Cl.
  CPC .......... *H04L 5/0092* (2013.01); *H04L 5/0094* (2013.01); *H04W 52/34* (2013.01); *H04W 72/04* (2013.01); *H04W 72/0446* (2013.01); *H04W 72/12* (2013.01); *H04W 74/00* (2013.01)

(58) Field of Classification Search
  USPC ......................................................... 370/329
  See application file for complete search history.

(56) References Cited

U.S. PATENT DOCUMENTS

| | | |
|---|---|---|
| 2014/0128120 A1 | 5/2014 | Dahlman et al. |
| 2014/0328315 A1 | 11/2014 | Dinan |
| 2015/0092646 A1 | 4/2015 | Tabet et al. |
| 2015/0131609 A1 | 5/2015 | Dinan |
| 2015/0245323 A1 | 8/2015 | You et al. |
| 2015/0257173 A1 | 9/2015 | You et al. |
| 2015/0333893 A1 | 11/2015 | Lee et al. |
| 2015/0358916 A1 | 12/2015 | Park et al. |
| 2015/0373675 A1 | 12/2015 | Seo et al. |
| 2016/0007324 A1 | 1/2016 | Lee et al. |
| 2016/0050648 A1 | 2/2016 | Seo et al. |
| 2016/0242150 A1 | 8/2016 | Kang et al. |
| 2016/0255489 A1 | 9/2016 | Seo et al. |
| 2019/0173612 A1 | 6/2019 | Kimura |
| 2022/0086715 A1* | 3/2022 | Hong .................. H04B 7/0695 |

FOREIGN PATENT DOCUMENTS

| | | |
|---|---|---|
| CN | 105122680 | 12/2015 |
| CN | 105210430 | 12/2015 |
| CN | 105227286 | 1/2016 |
| EP | 2 943 030 | 11/2015 |
| KR | 1020120017005 | 2/2012 |
| KR | 1020150034584 | 4/2015 |
| KR | 1020150105289 | 9/2015 |
| WO | WO 2015/053584 | 4/2015 |
| WO | WO 2015/174748 | 11/2015 |
| WO | WO 2017/048107 | 3/2017 |

OTHER PUBLICATIONS

PCT/ISA/237 Written Opinion issued on PCT/KR2017/001182 (pp. 7).
Ericsson, R1-156413, 3GPP TSG RAN WG1 Meeting #83, Anaheim, USA, Nov. 15-22, 2015, PUSCH definition for MTC (pp. 7).
Samsung, R1-156745, 3GPP TSG RAN WG1 #83, Anaheim, USA, Nov. 16-20, 2015, HARQ-ACK for PUSCH (pp. 4).
LG Electronics, "Discussion on PUSCH Transmissions for MTC", R1-154237, 3GPP TSG RAN WG1 Meeting #82, Aug. 24-28, 2015, 4 pages.
Ericsson, "DCI Content for MTC", R1-152498, 3GPP TSG RAN WG1 Meeting #81, May 25-29, 2015, 4 pages.
European Search Report dated Jan. 4, 2019 issued in counterpart application No. 17747771.8-1219, 11 pages.
Alcatel-Lucent et al., "Coverage Enhancement for Physical Data & Control Channels", R1-144697, 3GPP TSG RAN WG1 Meeting #79, Nov. 17-21, 2014, 7 pages.
Chinese Office Action dated Jun. 3, 2021 issued in counterpart application No. 201780010133.9, 13 pages.
Indian Examination Report dated May 20, 2022 issued in counterpart application No. 202138029001, 4 pages.

* cited by examiner (a) (b) (c) (d)

COMMUNICATION METHOD AND DEVICE IN MOBILE COMMUNICATION SYSTEM

PRIORITY

This application is a Continuation of U.S. patent application Ser. No. 16/429,789, filed on Jun. 3, 2019, which is a Continuation of U.S. patent application Ser. No. 16/075,911, issued as U.S. Pat. No. 10,694,539 on Jun. 23, 2020, which was filed on Aug. 6, 2018 as a U.S. National Phase Entry of PCT International Application No. PCT/KR2017/001182 which was filed on Feb. 3, 2017, and claims priority to U.S. Provisional Patent Application Nos. 62/291,676 and 62/328,284, which were filed on Feb. 5, 2016 and Apr. 27, 2016, respectively, the content of each of which is incorporated herein by reference.

BACKGROUND OF THE INVENTION

1. Field of the Invention

The present disclosure relates to a method for transmitting, by a terminal, an uplink shared channel in at least one uplink subframe using at least one or one or more uplink configuration information.

In addition, the present disclosure relates to transmission/reception method and apparatus capable of reducing a transmission time interval in a radio cellular communication system.

2. Description of the Related Art

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency spectrum, in the 5G communication system, beam-forming, massive MIMO, full dimensional MIMO (FD-MIMO), array antenna, analog beam-forming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc. is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been researched. In the IoT environment, an intelligent Internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, technologies such as the sensor network, the machine to machine (M2M), and the machine type communication (MTC), have been implemented by techniques such as the beamforming, the MIMO, and the array antenna that are the 5G communication technologies. The application of the cloud radio access network (cloud RAN) as the big data processing technology described above may also be considered as an example of the fusing of the 5G communication technology with the IoT technology.

SUMMARY OF THE INVENTION

The present invention has been made to address at least the above-mentioned problems and/or disadvantages and to provide at least the advantages described below. Accordingly, an aspect of the present invention is to provide a method for controlling an electronic device by processing an input reflecting a user's intention and the electronic device implementing the same.

An object of the present disclosure is directed to provision of a method for transmitting, by a terminal, an uplink shared channel in one or more uplink subframe using uplink transmission configuration information received from a base station.

In an LTE or LTE-A system, in order to transmit a signal in a transmission time interval shorter than a subframe, there is a need to provide a method for knowing where a shortened TTI to be used by a UE using a shortened TTI (shortened-TTI UE) starts and how long the TTI is. The present disclosure has been made to solve the above-mentioned problems, and it is an object of the present disclosure to define a signal transmission method using a shortened TTI in a downlink and an uplink in each transmission time in an LTE or an LTE-A system supporting a transmission time interval shorter than 1 ms and provide a method and an apparatus capable of allowing a terminal to know information on the shortened TTI.

In accordance with an aspect of the present invention, a method of a terminal is provided that includes receiving, from a base station, a radio resource control (RRC) message including information associated with a number of a plurality of time domain scheduling units including symbols for a physical uplink shared channel (PUSCH); receiving, from the base station, downlink control information (DCI) including an information field, wherein the information field corresponds to first information associated with a starting symbol and second information associated with a number of symbols; and transmitting, to the base station, uplink data through the PUSCH based on the information associated with the number of the plurality of time domain scheduling units, first information associated with the starting symbol and second information associated with the number of symbols, wherein the first information associated with the starting symbol and the second information associated with the number of symbols are applied to each of the plurality of time domain scheduling units.

In accordance with another aspect of the present invention, a method of a base station is provided that includes transmitting, to a terminal, a radio resource control (RRC) message including information associated with a number of a plurality of time domain scheduling units including symbols for a physical uplink shared channel (PUSCH); transmitting, to the terminal, downlink control information (DCI) including an information field, wherein the information field corresponds to first information associated with a starting symbol and second information associated with a number of symbols; and receiving, from the terminal, uplink data through the PUSCH based on the information associated with the number of the plurality of time domain scheduling units, first information associated with the starting symbol and second information associated with the number of symbols, wherein the first information associated with the starting symbol and the second information associated with the number of symbols are applied to each of the plurality of time domain scheduling units.

In accordance with a further aspect of the present invention, a terminal is provided that includes a transceiver configured to transmit and receive a signal; and a controller configured to receive, from a base station, a radio resource control (RRC) message including information associated with a number of a plurality of time domain scheduling units including symbols for a physical uplink shared channel (PUSCH), receive, from the base station, downlink control information (DCI) including an information field, wherein the information field corresponds to first information associated with a starting symbol and second information associated with a number of symbols, and transmit, to the base station, uplink data through the PUSCH based on the information associated with the number of the plurality of time domain scheduling units, first information associated with the starting symbol and second information associated with the number of symbols, wherein the first information associated with the starting symbol and the second information associated with the number of symbols are applied to each of the plurality of time domain scheduling units.

In accordance with another aspect of the present invention, the base station is provided that includes a transceiver configured to transmit and receive a signal; and a controller configured to: transmit, to a terminal, a radio resource control (RRC) message including information associated with a number of a plurality of time domain scheduling units including symbols for a physical uplink shared channel (PUSCH), transmit, to the terminal, downlink control information (DCI) including an information field, wherein the information field corresponds to first information associated with a starting symbol and second information associated with a number of symbols, and receive, from the terminal, uplink data through the PUSCH based on the information associated with the number of the plurality of time domain scheduling units, first information associated with the starting symbol and second information associated with the number of symbols, wherein the first information associated with the starting symbol and the second information associated with the number of symbols are applied to each of the plurality of time domain scheduling units.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE INVENTION

Figure 1A:
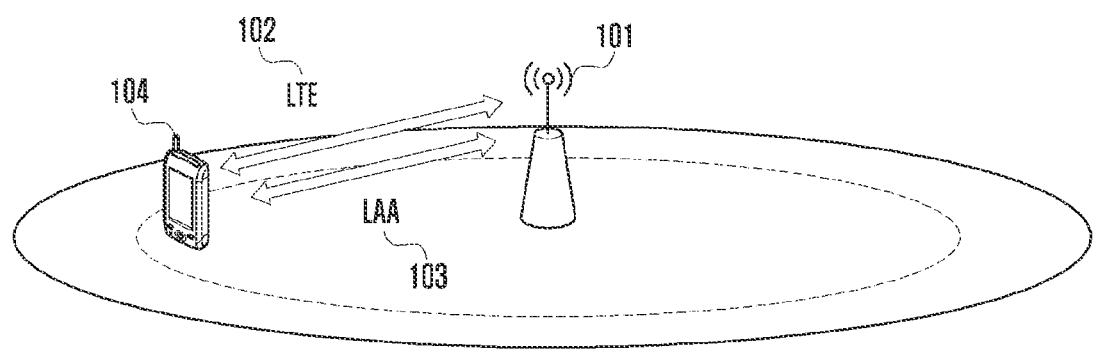
FIGS. 1A and 1B are diagrams illustrating a communication system to which the present disclosure is applied.

Hereinafter, exemplary embodiments of the present disclosure will be described in detail with reference to the accompanying drawings. Further, when it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

First Embodiment

In recent years, a wireless communication system has been developed as a high-speed and high-quality wireless packet data communication system to provide a data service and a multimedia service in addition to provision of early voice-oriented service. In order to support the high-speed and high quality wireless packet data transmission service, various wireless communication standards such as high speed downlink packet access (HSDPA), high speed uplink packet access (HSUPA), long term evolution (LTE), long term evolution advanced (LTE-A) of $3^{rd}$ generation partnership project (3GPP), high rate packet data (HRPD) of 3GPP2, and 802.16 of institute of electrical and electronics engineers (IEEE) have been developed. In particular, the LTE/LTE-A (hereinafter, referred to as LTE) has been consecutively developed and progressed to improve system throughput and frequency efficiency. Typically, in the case of the LTE system, data transmission rate and system throughput may be significantly increased by using a frequency integration technology (carrier aggregation, CA) capable of operating the system using a plurality of frequency spectrums. However, the frequency spectrum in which the LTE system currently operates is a licensed spectrum or licensed carrier that an operator may use with its own authority. However, in a case of a frequency spectrum (e.g. 5 GHz or less) in which generally the wireless communication service is provided, since it is already occupied and used by other operators or other communication systems, it may be difficult for the operator to secure a plurality of licensed spectrum frequencies. Therefore, it is difficult to increase the system throughput using the CA technology. Accordingly, in order to process explosively increasing mobile data in a situation in which it is hard to secure the licensed spectrum frequency as described above, recently, a technology for utilizing the LTE system in unlicensed spectrum or unlicensed carrier has been researched (e.g., LTE in unlicensed (LTE-U) and licensed-assisted access (LAA)). Among the unlicensed spectrums, particularly, a 5 GHz bandwidth is used by the relatively smaller number of communication devices as compared to 2.4 GHz unlicensed spectrum, and may utilize significantly wide bandwidth, thus it is relatively easy to secure an additional frequency spectrum. In other words, the licensed spectrum frequency and the unlicensed spectrum frequency may be utilized by using the LTE technology aggregating and using a plurality of frequency spectra, that is, the CA technology. In other words, an LTE cell in a licensed spectrum may be configured as PCell (or Pcell), an LTE cell (LAA cell or LTE-U cell) in unlicensed spectrum may be configured as SCell (or Scell), such that the LTE system may be operated in the licensed spectrum and the unlicensed spectrum using the existing CA technology. In this case, the system may also be applied to dual-connectivity environment in which the licensed spectrum and the unlicensed spectrum are connected by a non-ideal backhaul, as well as the CA in which the licensed spectrum and the unlicensed spectrum are connected by an ideal backhaul. However, in the present disclosure, the description will be made under the assumption of the CA environment in which the licensed spectrum and the unlicensed spectrum are connected by an ideal backhaul.

In general, the LTE/LTE-A system is a scheme of transmitting data using an orthogonal frequency division multiple access (OFDM) transmission scheme. In the OFDM scheme, the modulated signal is positioned at a two-dimensional resource consisting of time and frequency. Resources on a time base are differentiated by different OFDM symbols and are orthogonal to each other. Resources on a frequency base are differentiated by different sub-carriers and are also orthogonal to each other. That is, if the OFDM symbol designates a specific OFDM symbol on the time base and designates a specific sub-carrier on the frequency base, the OFDM scheme may point to one minimum unit resource, which is called a resource element (hereinafter, referred to as 'RE'). Different REs have the orthogonal characteristics to each other even though they pass through a frequency selective channel, so that signals transmitted in different REs may be received by a receiving side without mutual interference. In the OFDM communication system, a downlink bandwidth consists of a plurality of resource blocks (hereinafter, referred to as RBs), and each physical resource block (hereinafter, referred to as 'PRB') may consist of 12 sub-carriers arranged along the frequency base and 14 or 12 OFDM symbols arranged along the time base. Here, the PRB becomes a basic unit of the resource allocation.

A reference signal (hereinafter, referred to as 'RS') is a signal received from a base station and enabling the terminal to perform channel estimation. In the LTE communication system, the reference signal includes a demodulation reference signal (hereinafter, referred to as 'DMRS') as one of a common reference signal (CRS) and a dedicated reference signal. The CRS is a reference signal transmitted over the entire downlink bandwidth and may be received by all terminals, and is used for channel estimation, feedback information configuration of the terminals, or demodulation of a control channel and a data channel. The DMRS is also the reference signal transmitted over the entire downlink bandwidth and is used for the demodulation of the data channel and the channel estimation and is not used for the feedback information configuration unlike the CRS. Therefore, the DMRS is transmitted through the PRB resource to be scheduled by the terminal.

The subframe on the time base consists of two slots having a length of 0.5 msec, that is, a first slot and a second slot. A physical dedicated control channel (hereinafter, referred to as 'PDCCH') region that is a control channel region and an enhanced PDCCH (ePDCCH) region that is a data channel region are divided on the time base and transmitted. This is to quickly receive and demodulate a control channel signal. In addition, the PDCCH region is located over the entire downlink bandwidth, in which one control channel is divided into control channels in a small unit and is dispersed over the entire downlink bandwidth. The uplink is largely divided into the control channel (PUCCH) and the data channel (PUSCH). A response channel to a downlink data channel and other feedback information are transmitted through the control channel when there is no data channel and are transmitted to the data channel when there is the data channel.

Figure 1B:
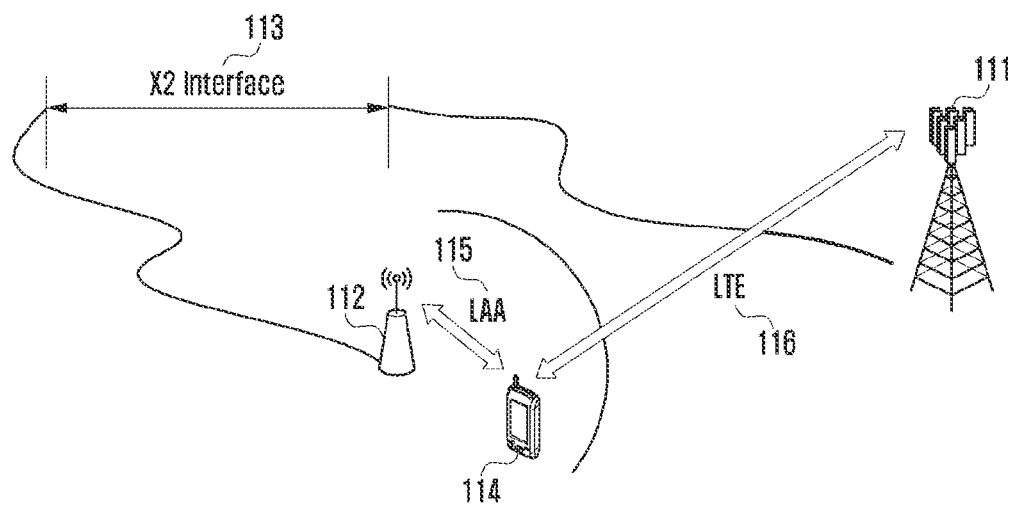

FIGS. 1A and 1B are diagrams illustrating a communication system to which the present disclosure is applied.

Referring to FIGS. 1A and 1B, FIG. 1A illustrates the case in which an LTE cell 102 and an LAA cell 103 exist in one small base station 101 in a network and a terminal 104 transmits/receives data to/from a base station through the LTE cell 102 and the LAA cell 103. There is no restriction on a duplex scheme for the LTE cell 102 or the LAA cell 103 and it may be assumed that a cell performing a data transmitting and receiving operation using a licensed spectrum is the LTE cell 102 or a PCell, and a cell performing a data transmitting and receiving operation using unlicensed spectrum is the LAA cell 103 or an SCell. However, the uplink transmission may be limited to be performed only through the LTE cell 102 when the LTE cell is the PCell.

FIG. 1B illustrates a case in which an LTE macro base station 111 for achieving wide coverage in the network and an LAA small base station 112 for increasing data transmission amount are installed, and in this case, there is no restriction on the duplex scheme of the LTE macro base station 111 or the LAA small base station. At this point, the LTE macro base station 111 may also be replaced with the LTE small base station. Further, the uplink transmission may be configured to be performed only through the LTE base station 111 when the LTE base station is the PCell. In this case, it is assumed that the LTE base station 111 and the LAA base station 112 have an ideal backhaul network. Therefore, X2 communication 113 may be made between fast base stations and therefore even though the uplink transmission is transmitted only to the LTE base station 111, the LAA base station 113 may receive the related control information in real time from the LTE base station 112 through the X2 communication 113. The schemes proposed in the present disclosure may be applied to both of the system of FIG. 1A and the system of FIG. 1B.

Generally, in the unlicensed spectrum, a plurality of devices share and use the same frequency spectrum or channel. At this point, the devices using the unlicensed spectrum may be different systems. Therefore, a general operation of the devices operated in unlicensed spectrum for mutual coexistence among various devices is as follows.

A transmitter that requires a signal transmission, including data, control signals or the like, may confirm whether to occupy the channels of other devices for the unlicensed spectrum or channel in which the signal transmission is performed, before performing the signal transmission and may not occupy or occupy the channel according to the channel occupancy state of the determined channels. The operation is generally referred to as listen-before-talk (LBT). In other words, the transmitter needs to determine whether or not the channel can be occupied according to a previously defined or configured method. At this point, the method for sensing a channel may be previously defined or configured. In addition, a channel sensing time is sensed may be previously defined or set, and may be selected as any value within a certain range. Further, the channel sensing time may be set in proportion to a set maximum channel occupancy time. At this point, the channel sensing operation for determining whether the channel can be occupied as described above may be configured differently according to the unlicensed frequency spectrum in which the operation is performed or according to regulations by area and country. For example, the United States may use the unlicensed spectrum without performing a channel sensing operation, in addition to an operation for radar detection in 5 GHz frequency spectrum.

The transmitter that intends to use the unlicensed spectrum may detect whether to use other devices for the corresponding channel through the channel sensing operation (or LBT) as described above and may occupy and use the channel when the channel occupancy of other devices is not detected in the channel. At this point, the devices that use the unlicensed spectrum may be operated by predefining or setting a maximum channel occupancy time for which the channel is consecutively occupied after the channel sensing operation. At this time, the maximum occupancy time may be previously defined according to regulations defined by frequency spectrum, area or the like or may be set separately from a base station in the case of other devices, for example, a terminal. At this point, the channel occupancy time may be set differently by unlicensed spectrum, area, and country. For example, in the case of Japan, the maximum occupancy time in the unlicensed spectrum of the 5 GHz bandwidth is regulated to 4 ms. On the other hand, in the case of Europe, a channel may be consecutively occupied up to 10 ms or 13 ms and may be used. At this point, the devices occupying the channel for the maximum occupancy time may re-perform the channel sensing operation and then re-occupy the channel according to the channel sensing result.

Figure 2:
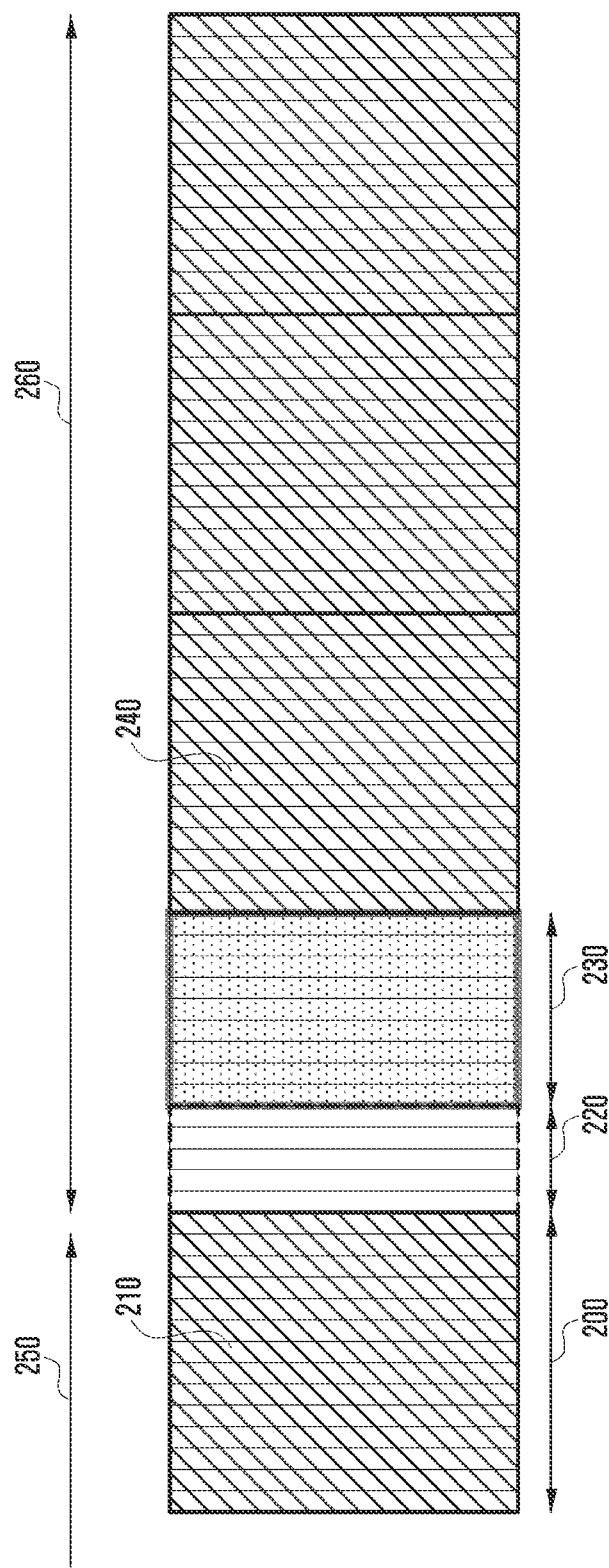
FIG. 2 is a diagram illustrating a channel occupancy operation according to a channel sensing operation.

The channel sensing and occupancy operation in the unlicensed spectrum as described above will be described below with reference to FIG. 2. FIG. 2 is a diagram illustrating an example of a downlink transmission process of transmitting, by a base station, data or a control signal to a terminal, which may also be applied to the uplink transmission in which the terminal transmits a signal to the base station.

The LTE subframe (or subframe) 200 of FIG. 2 is a subframe having a length of 1 ms, and may consist of a plurality of OFDM symbols. At this point, the base station and the terminal capable of performing communication using the unlicensed spectrum may occupy the corresponding channel for the set channel occupancy time (or TXOP) 250 and 260, thereby performing communication. If the base station occupying the channel for the set channel occupancy time 250 requires additional channel occupancy, the base station performs the channel sensing operation 220 and then may re-occupy the channel according to the result of the channel sensing operation and may use or may not use the occupied channel. At this point, the required channel sensing period (or length) may be previously defined between the base station and the terminal or may be set in the terminal by the base station through a higher layer signaling or may be differently set according to the result of transmitting/receiving data transmitted through the unlicensed spectrum.

In addition, at least one of variables applied to the channel sensing operation that is re-performed as described above may be set differently from the previous channel sensing operation.

The channel sensing and occupancy operations may be configured differently according to regulations defined by frequency spectrum, area, and country. For example, the above-mentioned channel sensing and occupancy operations will be described in detail with reference to, for example, load-based equipment which is one of channel access methods of regulation EN 301 893 in Europe about the 5 GHz bandwidth.

If the base station requires the additional channel use after the maximum channel occupancy time 250, the base station needs to determine whether other devices occupy the channel for a minimum channel sensing period 220. At this point, the minimum channel sensing period 220 may be determined as follows according to the maximum channel occupancy interval.

Maximum channel occupancy interval $13/32 \times q$, ($q=4, \ldots, 32$)

Minimum channel sensing period ECCA slot length×rand (1, q)

In the above Equation, the ECCA slot length is the minimum unit (or length) of the channel sensing period previously defined or set. That is, when q=32, the transmitter may occupy the unlicensed spectrum for up to 13 ms. In this case, as the minimum channel sensing period, a random value from 1 to q (that is, 1 to 32) may be selected, and a total channel sensing period may be the ECCA slot length× the selected random value. Therefore, when the maximum channel occupancy interval increases, generally, the minimum channel sensing period also increases. The method for setting a maximum channel occupancy interval and a minimum channel sensing period are only on example and may be applied differently according to regulations defined by frequency spectrum, area, and country and may be changed according to frequency regulation revision in the future. In addition, it may be configured to include additional operations (for example, introduction of an additional channel sensing period) or the like in addition to the channel sensing operation according to the frequency regulation.

If the base station does not detect other devices using the corresponding unlicensed spectrum in the channel sensing period 220, that is, if it is determined that the channel is in an idle state, the base station may immediately occupy and use the channel. At this point, it may be determined whether or not to occupy other devices in the channel sensing period 220 using a reference value previously defined or set. For example, if a size of a received signal received from other devices for the channel sensing period is greater than a predetermined reference value (for example, −62 dBm), it may be determined that the channel is occupied by other devices. If the size of the received signal is smaller than the reference value, it may be determined that the channel may be in an idle state. At this point, the method for determining channel occupancy may include various methods such as the previously defined signal detection, including the size of the received signal as described above.

Since a normal LTE operation is operated in a subframe unit (e.g., performing a signal transmitting and receiving operation from a first OFDM symbol of a subframe), it may not transmit or receive a signal in a specific OFDM symbol as soon as a channel sensing operation is performed. Accordingly, the base station that detects the idle channel in the channel sensing period 220 within the subframe as described above may transmit a specific signal for the channel occupancy from the time when the channel sensing period 220 ends to the verge of a transmission of a first OFDM symbol of a next subframe, that is, for the interval 230. In other words, the base station may transmit second signals (e.g., PSS/SSS/CRS or newly defined signal, etc.) for the channel occupancy for the corresponding unlicensed spectrum, synchronization of the terminal, or the like, prior to transmitting a first signal (e.g., normal (E)PDCCH and PDSCH) transmitted in a subframe 210 or 240. At this point, the transmitted second signals may not be transmitted according to the time when the channel sensing period ends. Further, when the corresponding channel occupancy start time is set within the specific OFDM symbol, a third signal (newly defined signal) is transmitted to a next OFDM symbol start time, and then the second signal or the first signal may be transmitted. For convenience of description, the present disclosure describes the channel sensing operation interval using the OFDM symbol unit, but the channel sensing operation interval may be set regardless of the OFDM symbol of the LTE system.

Here, the second signal may be generated by reusing PSS/SSS used in the current LTE system or by using at least one of the PSS and the SSS using a sequence different from a root sequence used in the current licensed spectrum. In addition, the second signal may be generated using a sequence other than the PSS/SSS sequences required to generate a unique value the base station (physical cell ID (PCID)) in the unlicensed spectrum, and thus the second signal may be used so as not to be confused with the unique value of the base station. Further, the second signal may include at least one of CRS and CSI-RS currently used in the LTE system, or (E)PDCCH or PDSCH or a signal having modified form of the (E)PDCCH or the PDSCH may be used as the second signal.

At this point, since the interval 230 in which the second signal is transmitted is included in the channel occupancy time, the frequency efficiency may be maximized by transmitting the minimum information through the second signal transmitted in the interval 230.

Figure 3:
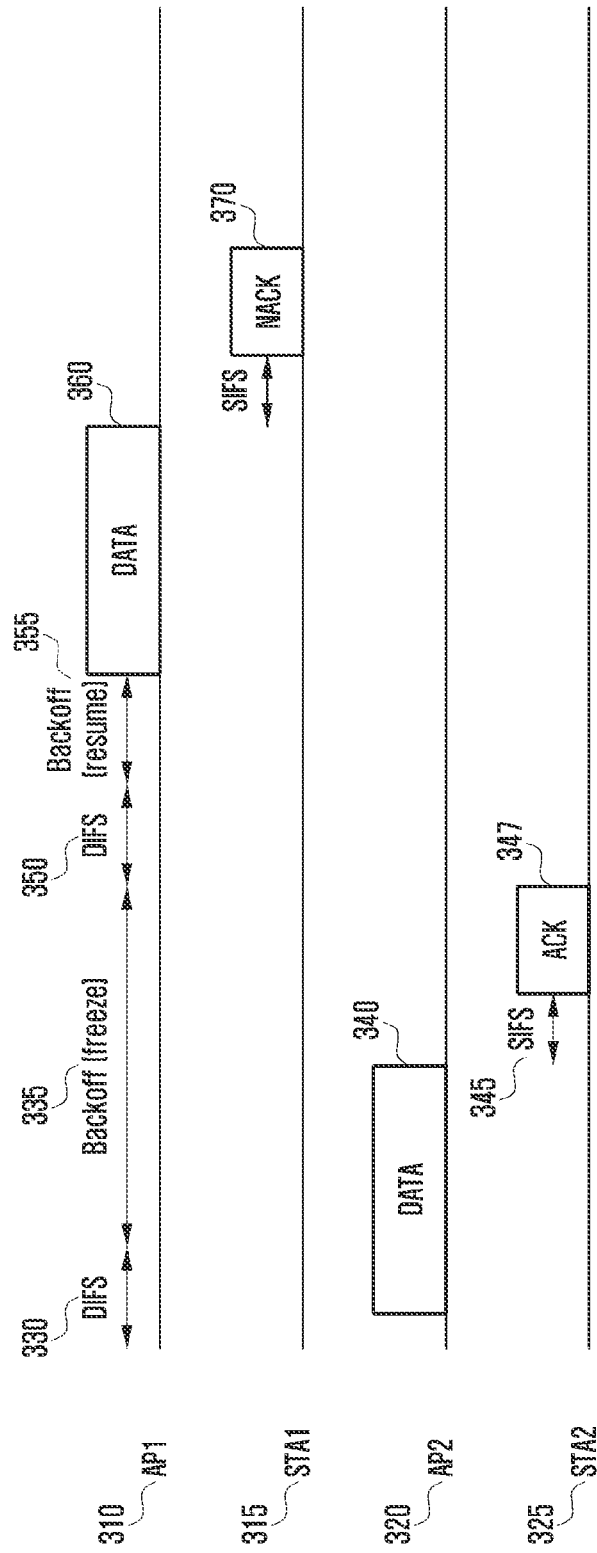
FIG. 3 is a diagram illustrating a channel access method for unlicensed spectrum of a WiFi system.

As described above, the LTE system (hereinafter referred to as an LAA or LAA cell) using the unlicensed spectrum requires a new type channel access (or LBT) scheme different from one using the existing unlicensed spectrum for mutual coexistence with other systems (hereinafter, WiFi) using the unlicensed spectrum as well as satisfaction of regulations on the unlicensed spectrum to be used. The channel access method for using the unlicensed spectrum of the WiFi system will be briefly described below with reference to FIG. 3.

If there are data to be transmitted to station 1 (STA1) or terminal 1 315, a WiFi AP1 310 needs to perform the channel sensing operation for the corresponding channel to occupy the channel. At this point, the channel is generally detected for a DCF interframe space (DIFS) time 330. It may be determined whether other devices occupy the channel by various methods, including strength of the signal received for the time, the detection of the previously defined signal, or the like. If it is determined that the channel is occupied by other device 320 for the channel sensing time 330, the AP1 310 selects a random variable 355, for example, N within a set contention window (e.g., 1-16). Generally, such operation is called a backoff operation. Next, the AP1 310 detects the channel for a previously defined time (e.g., 9 µs), and if it is determined that the channel is in the idle state, subtracts the selected variable N 355 by 1. That is, the update of N=N−1 is made. If it is determined that other devices occupy the channel for the time, the variable N 355 is frozen without being subtracted. A STA2 325 receiving data transmitted from an AP2 320 like the above 340 transmits ACK or NACK 347 for the reception of the data 340 to the AP2 320 after an SIFS time 345. At this point, the STA2 325 may always transmit the ACK/NACK 347 without performing a channel sensing operation. After the ACK 347 transmission of the STA2 325 ends, the AP1 310 may know that the channel is in an idle state. At this point, if it is determined that the channel is in the idle state for the DIFS time 350, the AP1 310 detects the channel for a predetermined time (for example, 9 µs) which is previously defined or set for the backoff operation, and if it is determined that the channel is in the idle, again subtracts the selected variable N 355. That is, the update of N=N−1 is made. At this point, if N=0, the AP1 310 may occupy the channel to transmit data 360 to the STA1 315. Hereinafter, the terminal receiving the data 360 may transmit the ACK or the NACK for the data reception to the AP1 310 after the SIFS time. At this point, the AP1 310 receiving the NACK from the STA1 315 may select a random variable N used in a next backoff operation within the increased contention window. That is, if it is assumed that the contention window used is [1,16] and the data reception result of the STA1 315 is NACK, the contention window of the AP1 310 receiving the NACK may increase to [1, 32]. The AP1 310 receiving the ACK may set the contention window to be an initial value (e.g., [1, 16]) or decrease or maintain the preset contention window.

However, for example, in the case of the WiFi system, communication is generally made between one AP (or base station) and one STA (or terminal) within the same time. Further, like 347 and 370 of FIG. 3, the STA (or the terminal) transmits its data reception state (for example, ACK or NACK) to the AP (or the base station) immediately after receiving the data. At this point, after receiving the ACK or the NACK from the terminal 315 or 325, the AP 310 or 320 performs the channel sensing operation for the next data transmission operation. However, in the case of the LAA system, the data transmission may be performed from one base station to a plurality of terminals within the same time. Further, the uplink transmission in the LAA system may be performed by the terminal receiving the uplink transmission configuration information of the base station at the time defined by the uplink transmission configuration. For example, in the case of FDD, when the base station configures the uplink transmission in the terminal in subframe n, the terminal in which the uplink transmission is configured may perform an uplink shared channel transmission (or uplink transmission) in subframe n+4. At this point, the terminal in which the uplink transmission is configured in the unlicensed spectrum needs to perform the channel sensing operation on the uplink transmission channel before the uplink transmission. If it is determined by the channel sensing operation that the unlicensed spectrum is in the idle state, the configured uplink transmission may be performed. If it is determined by the channel sensing operation that the unlicensed spectrum is not in the idle state, the configured uplink transmission is not performed. The terminal that fails to perform the uplink data transmission as described above may not perform the uplink shared channel transmission before the reception of the reconfiguration for the uplink transmission from the base station. Therefore, when the uplink transmission is performed in the unlicensed spectrum, the uplink transmission may not be performed in the set subframe. Therefore, the present disclosure proposes a method for more smoothing, by a terminal, an uplink transmission in unlicensed spectrum by configuring uplink transmission by a base station valid in at least one subframe.

Hereinafter, in the present specification, a long term evolution (LTE) system and an LTE-advanced (LTE-A) system are described as an example, but the present disclosure may be applied to other communication systems using licensed spectrum and unlicensed spectrum, without being particularly added and omitted.

Figure 4:
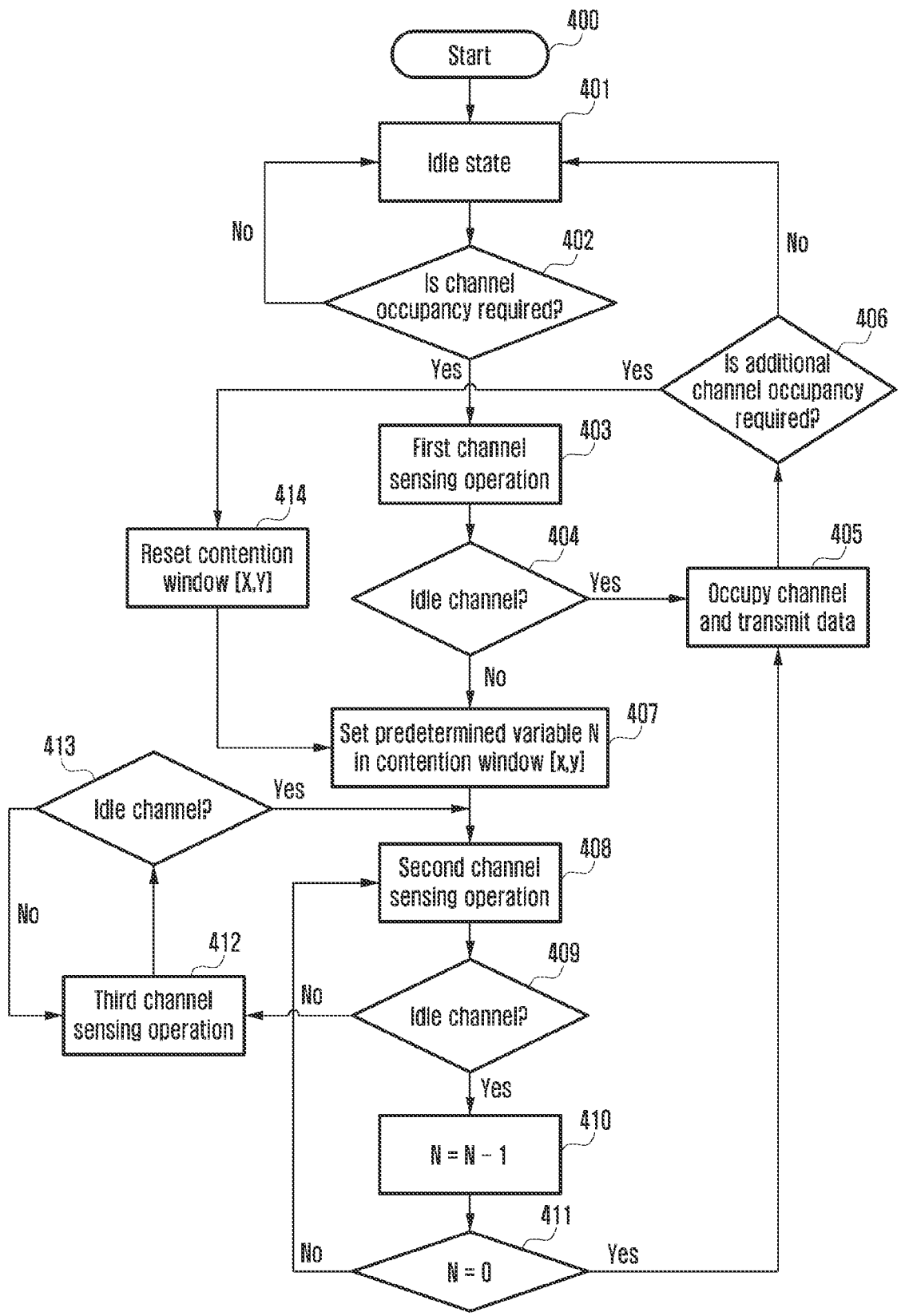
FIG. 4 is a flowchart illustrating a channel access method for unlicensed spectrum of an LAA system.

FIG. 4 is a flowchart illustrating a channel access method for unlicensed spectrum of an LAA system.

A channel occupancy method for using unlicensed spectrum in an LAA system will be described with reference to FIG. 4. The LAA cell (or LAA SCell, LAA Cell, LAA base station) that does not require a data transmission maintains an idle state (operation 401). At this point, the idle state is a state in which the LAA cell does not transmit a data signal in the unlicensed spectrum. For example, the idle state (operation 401) means a state in which the LAA cell in an active state no longer have a data signal to be transmitted to the terminal or has data to be transmitted to the terminal but does not transmit data to the terminal.

In operation 402, the LAA cell in the idle state may determine whether the channel occupancy is required. If it is determined in operation 402 that the LAA cell in the idle state needs to occupy the channel to transmit a data or control signals to the terminal, the process proceeds to operation 403, and if it is determined that the channel occupancy is not required, the process proceeds to operation 401. The LAA cell may perform a first channel sensing operation in operation 403. At this point, the time (for example, 34 µs) to perform the first channel sensing operation may be set differently according to at least one condition of a preset time, a time set from other devices, and a type of data or control signals that the LAA cell intends to transmit. For example, a time to perform the first channel sensing operation when the LAA cell transmits only the control signal without transmitting data to a specific terminal may be set to be different from a time to perform the first channel sensing operation (for example, when only the control signal is transmitted, the first channel sensing operation is performed for a time shorter than that of a case of transmitting a data signal) when the LAA cell transmits data to a specific terminal. At this point, values which can be set for the first channel sensing operation may be previously defined. In this case, at least one of other variables (for example, a received signal strength threshold value for determining whether or not a channel is sensed) as well as the time to perform the first channel sensing operation may be set differently in terms of the first channel sensing operation when the LAA cell transmits only the control signal without transmitting data to the specific terminal and when the LAA cell transmits data to a specific terminal. At this point, the LAA cell may set a contention window used in the second channel sensing operation as an initial value. At this point, the first channel sensing operation is an operation of determining the state in which other devices occupy the corresponding channel using various methods, including at least one of received signal strength measurement, a previously defined signal detection and the like for the time set for the first channel sensing operation. At this point, variables required for the first channel sensing operation including the first channel sensing time may be set using the preset value or may be set from other devices.

In operation 404, the LAA cell may determine whether the channel is in the idle state. If it is determined that the channel is in the idle state, the process proceeds to operation 405 and if it is determined that the channel is not in the idle state, the process proceeds to operation 407.

If it is determined that the channel is in the idle state in operation 404, in operation 405, the LAA cell may occupy the channel to transmit a signal. If it is determined in operation 404 that the channel is occupied by other devices, a random variable N may be selected in a contention window [x, y] set in operation 407. At this point, a first contention window may be preset or may be (re) set from the base station. Further, the set contention window may be set using various values including the number of attempts for occupying the channel, an occupancy rate for the channel (e.g. traffic load), and a reception result (e.g. ACK/NACK) of the terminal for the data signal transmitted at the time of occupying the channel. For example, if it is determined in operation 405 that the LAA cell occupying the channel requires the additional occupancy of the channel in operation 406, in operation 414, the contention window may be set using the data transmission result performed in operation 405 or at least one of the above-mentioned various methods. At this point, the method for setting a contention window using a data transmission result in operation 405 is only one example and therefore the contention window may be set by the previous channel occupancy and data transmission operation or the preset value. For example, if the LAA cell transmits data to the terminal in the channel occupancy interval and receives NACK from the terminal according to the reception result of the data transmission, the LAA cell may increase or maintain the contention window. If the LAA cell occupying the channel using the increased or maintained contention window transmits data to the terminal in the channel occupancy interval and decreases or maintains the contention window or set the contention window as the initial contention window when receiving the ACK from the terminal according to the reception result of the data transmission. At this point, the method for setting the contention window using the ACK/NACK is only one example and therefore may set the contention window using the above-mentioned different criteria.

When the random variable N is set in the preset contention window in operation 407, in operation 408, a second channel sensing operation may be performed using the set N. At this point, the second channel sensing operation is an operation of determining the channel occupancy state, including at least one of the received signal strength measurement, the previously defined signal detection, or the like for the set time, in which the determination criteria different from the first channel sensing operation may be established. That is, the second channel sensing operation reference time may be equal to the first channel sensing operation or may be set to be shorter than the first channel sensing time. For example, the first channel sensing time may be set to be 34 μs and the second channel sensing time may be set to be 9 μs. Further, a second channel sensing operation reference threshold value may be set to be different from a first channel sensing operation reference threshold value.

In operation 409, the LAA cell may determine whether the channel is in the idle state. If it is determined that the channel is in the idle state, the process proceeds to operation 410 and if it is determined that the channel is not in the idle state, the process proceeds to operation 412.

If it is determined in operation 409 that the channel sensed in operation 408 is the idle channel, in operation 410, the set variable N is subtracted by 1. At this time, the subtraction by 1 is only one example, and therefore the subtraction may be differently made depending on the set value or may be set differently according to the type or characteristics of signals that the LAA cell intends to transmit. If it is determined in operation 411 that the value of the subtracted variable N is 0, in operation 405, the LAA cell may perform the channel occupancy and data transmission. If it is determined in operation 411 that the value of the variable N is not 0, in operation 408, the LAA cell may perform the second channel sensing operation again. If it is determined in operation 409 that the channel is not in the idle channel based on the second channel sensing operation in operation 408, in operation 412, the LAA cell may perform a third channel sensing operation. At this point, the third channel sensing operation may be set to be the same as the first channel sensing operation or the second channel sensing operation. For example, the first channel sensing operation reference time and a third channel sensing operation reference time can be equally set to be 34 μs. At this point, the first channel sensing reference threshold value and a third channel sensing reference threshold value may be set differently. The channel sensing operation reference time and threshold value are only one example, and the variables or criteria required for the third channel sensing operation may be set to be the same as the first channel sensing operation or at least one of the variables or criteria required for the third channel sensing operation may be set differently from the first channel sensing operation.

Further, the third channel sensing operation may be configured to perform an operation of generating a time delay without the channel sensing or the channel occupancy operation. Further, the third channel sensing time may be set to be the same as or different from at least one of the first channel sensing time and the second channel sensing time. In operation 413, the LAA cell determines whether the channel is occupied by other devices using the reference value set for the third channel sensing operation. When the determined channel occupancy state is the idle state, in operation 408, the second channel sensing operation may be performed again. If the channel determined in operation 413 is not in the idle state, in operation 412, the LAA cell performs the configured third channel sensing operation. At this point, at least one of the first channel sensing operation, the second channel sensing operation, and the third channel sensing operation may be omitted according to the type or characteristics of data or control signals that the LAA cell intends to transmit. For example, when the LAA cell transmits only the control signal (for example, discovery reference signal (DRS)), only the first channel sensing operation may be performed and then the channel may be immediately occupied according to the channel sensing operation result. In this case, the DRS is merely an example in which at least one of the first channel sensing operation, the second channel sensing operation, and the third channel sensing operation may be omitted, and may also be applied even at the time of transmitting other control signal. In addition, the terminal may perform the uplink channel sensing operation for uplink channel occupancy and the uplink signal transmission in the channel sensing and channel occupancy manner as described above.

Figure 5:
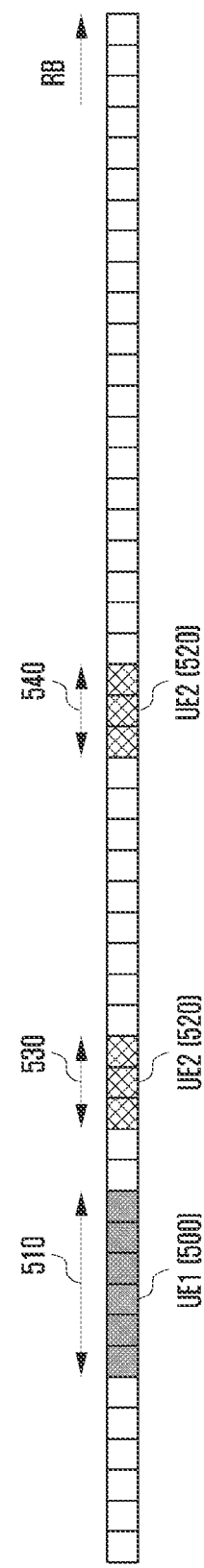
FIG. 5 is a diagram illustrating the existing uplink transmission resource allocation method.

When the uplink signal is transmitted in the unlicensed spectrum, the maximum transmittable power per unit frequency may be limited according to regulations defined by frequency spectrum for the corresponding unlicensed spectrum or an area. For example, in the case of Korea, when a system bandwidth of 20 MHz is used in frequency spectrum ranging from 5.1 to 5.2 GHz, the maximum transmittable power per 1 MHz is limited to 2.5 mW. However, in the current LTE standard, in the case of the uplink transmission, one continuous frequency spectrum or a RB may always be allocated (510 of FIG. 5), or up to two discontinuous frequency spectrums or RBs may always be allocated (530 and 540 of FIG. 5). Therefore, if the terminal 500 is allocated one continuous 6 RBs 510, the maximum transmission power is about 2.5 mW due to the transmission power limitation per unit frequency, but if the terminal 520 is allocated the same 6 RBs but allocated two discontinuous frequency spectrums 530 and 540, a signal may be transmitted at 2.5 mW in each continuous frequency spectrum 530 and 540. In this case, in the 6RBs, if only one RB per unit frequency is allocated, that is, the uplink frequency is allocated to use only one RB per 1 MHz, the terminal may use power of 2.5 mW per RB to perform the uplink transmission.

The base station uses DCI format 0 or format 4 or a format for transmission of new uplink control information in the downlink control channel of the licensed spectrum or the unlicensed spectrum or configures information on at least one of an uplink transmission resource region, an uplink HARQ process, and uplink redundancy, an uplink channel sensing method, and related variables in a plurality of terminals, thereby configuring the uplink transmission of the terminal. If the uplink transmission of the terminal is configured as the uplink signal transmission in the unlicensed spectrum cell, the terminal may predefine the unlicensed spectrum in which the uplink transmission is configured or perform the configured channel sensing operation configuration through the higher layer signaling or the uplink signal configuration information and then transmit the configured uplink signal according to the configuration when the unlicensed spectrum cell is determined to be the idle channel. At this point, the uplink channel sensing operation may be configured differently according to the cell for configuring the uplink transmission. For example, when the uplink transmission is configured from the licensed spectrum cell or an unlicensed spectrum cell different from the unlicensed spectrum cell in which the uplink transmission is configured and when the uplink transmission is configured from the same unlicensed spectrum cell as the unlicensed spectrum cell in which the uplink transmission is configured, different channel sensing operations may be performed. For example, since a channel sensing operation is not performed on the unlicensed spectrum cell in which the uplink transmission is configured, it is previously defined to perform the uplink channel sensing operation for a longer time on average, it may be previously defined to perform the uplink channel sensing operation for a long time on average or may be configured in the terminal based on the uplink transmission configuration in the case in which the uplink transmission is configured from the licensed spectrum cell or an unlicensed spectrum cell different from the unlicensed spectrum cell in which the uplink transmission is configured than in the case in which the uplink transmission is configured from the same unlicensed spectrum cell as the unlicensed spectrum cell in which the uplink transmission is configured.

Hereinafter, even if there is no description in the embodiment of the present disclosure, the unlicensed spectrum cell in which the base station transmits the uplink transmission configuration information of the terminal may be another unlicensed spectrum cell operated in different spectrum from the cell in which the uplink transmission of the terminal is performed as well as a cell operated in the same unlicensed spectrum as a cell in which the uplink transmission of the terminal is performed.

If the channel sensing operation is performed on the unlicensed spectrum and then it is determined that the channel is not the idle channel or is occupied by other devices, the terminal may not transmit the configured uplink signal. At this point, the terminal that does not transmit the configured uplink signal may attempt the uplink signal transmission again when the base station reconfigures the uplink transmission. In other words, in the current LTE system, the uplink transmission of the general terminal is valid only in one subframe in which the base station configures the uplink transmission in the terminal. Accordingly, the performance of the terminal performing the uplink signal transmission using the unlicensed spectrum according to whether other devices occupy the channel in the unlicensed spectrum in which the uplink transmission is performed at the uplink transmission start time of the terminal may be degraded. Therefore, in the embodiment of the present disclosure, the terminal transmits an uplink shared channel in at least one uplink subframe using one or more uplink transmission configuration information received from the base station, thereby increasing the uplink transmission opportunity of the terminal Alternatively, in an embodiment of the present disclosure, there may be provided a method for configuring, by a terminal, one or more uplink transmission configuration information received from a base station to be valid in at least one uplink subframe to increase an uplink transmission opportunity of the terminal.

The valid uplink subframe described in the present disclosure means a subframe in which the terminal may transmit the uplink signal according to the uplink transmission configuration received from the base station. In other words, among at least one uplink subframe in which the base station configures the uplink transmission in the terminal, the uplink subframe determined as the idle channel after performing the channel sensing operation or the uplink subframe in which the uplink transmission can be performed without performing the channel sensing operation is referred to as the valid uplink subframe. In other words, DCI format 0 or format 4 in the downlink control channel (PDCCH or EPDCCH) transmitted from the base station through the licensed spectrum or the unlicensed spectrum cell in subframe n or a format for transmission of new uplink control information is received. The terminal determining that the uplink transmission is configured is configured to transmit the uplink shared channel in one or more uplink subframes (for example, four uplink subframes), including subframe n+4 through the received uplink transmission configuration information. When the configured uplink shared channel transmission is a transmission for an unlicensed spectrum cell, the terminal may perform the configured channel sensing operation for the unlicensed spectrum in which the uplink transmission is configured before the configured uplink transmission starts. If it is determined that some (for example, subframe n+4) of the configured uplink transmission subframes are not the idle channel after the channel sensing operation is performed but it is determined that the unlicensed spectrum is in the idle state in subframe n+5, the subframe n+5 is referred to as the valid uplink subframe. At this point, if the uplink transmission is defined or configured not to perform the channel sensing operation within one or more uplink subframe in which the base station configures the uplink transmission in the terminal, all of the subframe (n+5 in the case of the above example) determined as the valid uplink subframe to the last subframe (n+7 in the case of the above example) in which the uplink transmission is configured by the base station may be referred to as the valid uplink subframe. In other words, one or more subframe may be determined as the valid uplink subframe according to the uplink transmission configuration of the base station and the channel sensing result of the terminal.

For example, the control information for the uplink shared channel transmission may be received from the base station in a downlink control channel of at least one cell of the licensed spectrum cell or another unlicensed spectrum cell different from the uplink transmission cell or the same unlicensed spectrum cell as the uplink transmission cell in the subframe n. The control information for the uplink shared channel transmission may be transmitted using DCI format 0 or format 4 for the unlicensed spectrum transmission or modified or newly defined DCI format for the uplink control information transmission in the unlicensed spectrum. In the terminal configured to perform the uplink shared channel transmission in four uplink subframes including the subframe n+4 through the control information, when the terminal is previously defined to perform the channel sensing operation immediately before each uplink subframe transmission or is configured through the uplink transmission configuration, the terminal may determine that the subframes determined as the idle state after the channel sensing operation is performed among the subframes n+4, n+5, n+6, and n+7 in which the uplink transmission is configured are a valid subframe. In the above example, in the terminal that does not determine the subframe n+4 to be the idle channel but determines the subframe n+5 to be the valid subframe before the uplink transmission, if a channel sensing operation performance is not configured by the base station in subframes n+6 and n+7, the subframes n+5, n+6, and n+7 may be determined to be valid subframes. At this point, the terminal can determine that the uplink subframes (in the above example, n+5, n+6, n+7, and n+8) set by the base station are valid subframes from the subframe n+5 first determined to be a valid subframe.

In the embodiment of the present disclosure, for convenience of description, the time relation between the uplink transmission configuration time of the base station and the uplink channel transmission time of the terminal in which the uplink transmission is configured is assumed to be 4 ms, but the present disclosure is not limited thereto. The time relation may be previously defined between the base station and the terminal as a value (for example, Kms or K subframe) including 4 ms, or the base station may set the time relation K value in the terminal via the higher layer or the base station may set the time relation information K included in the uplink transmission configuration information in the terminal. At this point, if K is less than 1 ms, for example, slot may also be applied.

In other words, the terminal may receive the control information for the uplink transmission from the base station in the unlicensed spectrum in the downlink control channel of at least one cell of the licensed spectrum cell or another unlicensed spectrum cell different from the uplink transmission cell or the same unlicensed spectrum cell as the uplink transmission cell in the subframe n. The control information may be received using the DCI format 0 or the format 4 for the unlicensed spectrum transmission or the modified or newly defined DCI format for the uplink control information transmission in the unlicensed spectrum. The terminal may be configured to perform the uplink shared channel transmission in N uplink subframes, including subframe n+K. The terminal may predefine whether to perform the channel sensing operation in the subframe intervals (subframes n+K to n+K+N) in which the uplink transmission is configured, including a subframe just before uplink transmission start subframe (n+K) or perform the channel sensing operation on the unlicensed spectrum in the subframe set by the uplink transmission configuration. The terminal may determine the subframes determined to be the idle state after performing the channel sensing operation among the subframes n+K to N+K+N in which the uplink transmission to be a valid subframe and transmit the uplink signal configured in the valid subframe. At this point, even if the valid uplink subframe is determined to be the uplink subframe in which the unlicensed spectrum is valid according to a maximum channel occupancy time for the unlicensed spectrum, the uplink signal transmission of the terminal may be restricted.

For example, the base station may transmit or configure at least one information of the maximum channel occupancy time for the unlicensed spectrum, the remaining time (or the available time) from the time to transmit the uplink transmission configuration information to the maximum channel occupancy time, and the remaining time (or available time) from the uplink transmission start time of the terminal receiving the uplink transmission configuration information to the maximum channel occupancy time to or in the terminal through the uplink transmission configuration information. The uplink transmission of the terminal can be restricted even if it is determined that the uplink subframe is a valid uplink subframe because the uplink transmission of the terminal may be ended within the set maximum channel occupation time or the available time.

At this time, the time relation K may mean a time to start the performance of the configured uplink shared channel transmission through the uplink transmission configuration of the terminal. In other words, the base station sets K=4 and N=4 in the terminal in the subframe n but if the actual channel occupancy time of the terminal is greater than K>4 (for example, K=6), the terminal assumes K=6 and may also perform the uplink transmission from K=6 to N subframes.

The base station may set N by various methods as follows.

Method F-1: Determine N using received signal strength indication (RSSI) information received from the terminal Method F-2: Determine N by using the size or strength of the received signal through the channel sensing operation of the base station Method F-3: Determine N by using a buffer status report (BSR) report of the terminal Method F-4: Determine N by using the PHR report of the terminal Method F-5: Determine N by using statistics for the UL transmission of the terminal The method F-1 will be described in more detail as follows. In the base station and the terminal that communicate with each other using the unlicensed spectrum, the base station can configure the RSSI report in the terminal to acquire information on the communication environment (or intensity of interference) around the terminal. The terminal in which the RSSI report is configured having the RSSI report periodically reports to the base station the information on the strength of the average received signal in a frequency spectrum in which the RSSI report is configured, the time ratio in which the strength of the received signal is larger than a previously defined threshold, and the like. At this time, the base station that has reported the RSSI from the terminal can determine the communication environment, the interference environment or the like around the terminal through the RSSI information reported from the terminal, thereby setting the N of the terminal. For example, the base station compares a threshold value for the previously defined RSSI with the RSSI reported by the terminal to select the N to determine that the interference around the terminal or the number of surrounding nodes using the unlicensed spectrum is small and set N=1 and N to be the small number when the RSSI value reported by the terminal is lower than the threshold value for the RSSI defined for the base station to select the N. On the contrary, if the RSSI value reported by the terminal is greater than the threshold value for the RSSI defined for the base station to select the N, it is determined that the interference around the terminal is large and a plurality of subframes may be allocated (N>1) or N may be set to be the large number. At this time, selecting the N by comparing the RSSI threshold value previously defined by the base station with the RSSI reported by the terminal is only one example, and it is possible to set N=1 or N to be the small number even when the RSSI value reported by the terminal is greater than the threshold value for the RSSI defined for the base station to select the N.

The method F-2 will be described in more detail as follows. The base station performing communication using the unlicensed spectrum needs to perform the channel sensing operation for the unlicensed spectrum, for example, the received signal strength measurement for the downlink signal transmission. At this point, the result of the received signal strength measurement for the unlicensed spectrum is compared with a threshold value for the previously defined size of the received signal to select the N, thereby determining the N. For example, the base station may compare the threshold value for the previously defined size of the received signal to select the N with the size of the received signal measured in the channel sensing operation performed to occupy the unlicensed spectrum occupancy or an average value of the size of the received signal measured in one or more channel sensing operation to determine that the interference to the unlicensed spectrum or the number of neighboring nodes is small and set N to be 1 or the small number when the size of the measured signal is lower than the threshold value for the received signal size defined for the base station to select the N. On the contrary, if the size of the measured signal is greater than the threshold value for the size of the received signal defined for the base station to select the N, it may be determined that the interference to the unlicensed spectrum or the number of neighboring nodes is small, and a plurality of subframes may be allocated (N>1) or N may be set to be the large number. In this case, selecting the N by comparing the threshold value for the received signal size previously defined by the base station to select the N with the received signal size measured by the base station during the channel sensing operation to select N is only one example, and even if the measured signal size is larger than the threshold value for the received signal size defined for the base station to select the N, it is also possible to set N to be 1 or N to be the small number.

The method F-3 will be described in more detail as follows. The base station may receive the buffer status report (BSR) from the terminal to determine the amount of uplink data to be transmitted by the terminal and configure the uplink transmission in the terminal according to the determined result. Accordingly, the base station may determine the N by using the BSR information that the terminal reports. For example, the base station may compare the BSR value reported from the terminal with the threshold value for the previously defined BSR to select the N, and if the received BSR size is lower than the threshold value for the BSR size defined for the base station to select the N, it may be determined that the amount of uplink transmission data required by the terminal is small and N may be set to be 1 or the small number. On the contrary, the base station may compare the BSR value reported from the terminal with the threshold value for the previously defined BSR to select the N, and if the received BSR size is larger than the threshold value for the BSR size defined for the base station to select the N, it may be determined that the amount of uplink transmission data required by the terminal is large and N may be set to be plural (N>1) or the large number.

The method F-4 will be described in more detail as follows. The base station may receive a power headroom report (PHR) from the terminal to determine the magnitude of power available for the terminal and configure the uplink transmission and the uplink transmission power in the terminal according to the determined result. Accordingly, the base station may determine the N by using the PHR information that the terminal reports. For example, the base station may compare the PHR value reported from the terminal with the threshold value for the previously defined BSR to select the N, and if the received PHR size is lower than the threshold value for the PHR size defined for the base station to select the N, it may be determined that the power available for the terminal is small and N may be set to be 1 or the small number. On the contrary, the base station may compare the BSR value reported from the terminal with the threshold value for the previously defined BSR to select the N, and if the received BSR size is larger than the threshold value for the BSR size defined for the base station to select the N, it may be determined that the amount of uplink transmission data required by the terminal is large and N may be set to be plural (N>1) or the large number.

The method F-5 will be described in more detail as follows. The base station performing communication using the unlicensed spectrum needs to perform the channel sensing operation for the unlicensed spectrum, for example, the received signal strength measurement for the downlink signal transmission. In this case, if the result of the received signal strength measurement for the unlicensed spectrum is greater than the previously defined threshold, the unlicensed spectrum cannot be used. Therefore, if the base station configures the uplink transmission in the terminal but the terminal performs the channel sensing operation for the configured uplink transmission, but if the size of the measured signal is greater than the previously defined threshold value, the configured uplink transmission cannot be performed. Therefore, the base station may infer the interference situation around the terminal based on the statistical information on whether to perform the uplink transmission of the terminal and may select the N according to the inferred result. For example, the base station may infer the interference environment or the number of neighboring nodes around the terminal based on the statistical information, the ratio or the like on whether to perform the uplink transmission of the terminal for a specific time interval, and may select the N according to the result of the inferred result.

At this point, even if the base station configures at least one uplink transmission in the terminal, the terminal may not transmit the uplink signals in some of the plurality of uplink subframes. For example, the terminal may determine whether to perform the plurality of uplink subframe transmissions based on the amount of power available for the terminal. That is, if new transmission is configured in a plurality of uplink subframes, respectively, or if the amount of available power of the terminal in which the repeated transmission is configured using the plurality of uplink subframes is lower than a specific threshold value, the uplink transmission for at least one of the plurality of configured uplink subframes may not be performed. At this point, the base station determines that the terminal does not perform the configured uplink transmission due to the failure of the channel sensing operation, and may configure a retransmission for the uplink transmission.

Figure 6:
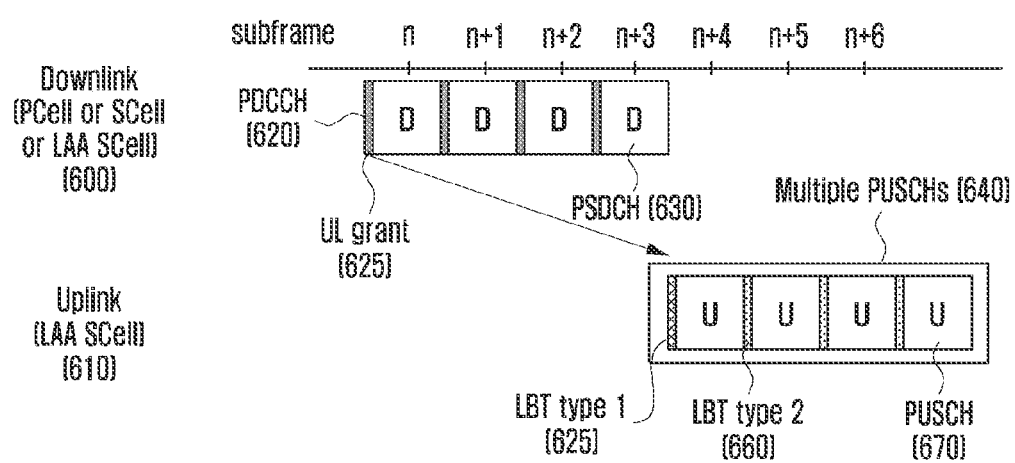
FIG. 6 is a diagram illustrating a method for configuring an uplink transmission in a plurality of uplink subframes.

FIG. 6 is a diagram illustrating a method for configuring uplink transmissions in a plurality of uplink subframes.

This will be described in more detail with reference to FIG. 6. At this point, for convenience of explanation, the present disclosure will be described under the assumption that the time relation (for example, the terminal in which the uplink transmission is configured by the base station in the subframe n performs the uplink transmission configuration in the subframe n+4) between the uplink transmission configuration between the base station and the terminal and the uplink shared channel transmission and the HARQ time relation are the same as FDD. However, the embodiments of the present disclosure may apply not only the FDD time relation, but also the time relation between the uplink transmission configuration and the uplink shared channel transmission defined in the TDD and the HARQ time relation or the time relation (for example, the performance of the uplink transmission configuration in subframe n+K using the above K) between the uplink transmission configuration newly defined for the LAA or frame structure 3 and the uplink shared channel transmission and the HARQ time relation, and the like.

The base station may allow one uplink transmission configuration (UL grant) to configure only the uplink transmission in the terminal in one uplink subframe through a higher layer signaling or allow one uplink transmission configuration to configure the uplink transmission in the terminal in one or more uplink subframe. At this point, the higher layer signaling for allowing the base station to configure one uplink transmission configuration in the terminal so as to perform the uplink transmission in one or more uplink subframe divides the configuration into {ON} and (OFF), so that the terminal may be configured (set a higher layer signaling field value to be OFF or 0) to allow one uplink transmission configuration to perform the uplink transmission only in one uplink subframe or configured (set the higher layer signaling field value to be ON or 1) to allow one uplink transmission configuration to perform the uplink transmission in one or more uplink subframe.

In addition, the higher layer signaling for allowing the base station to configure one uplink transmission configuration in the terminal to perform the uplink transmission in one or more uplink subframe designates one or more value (one value of N={1, 2, 4, 8}), so that the terminal may be configured (set N=1) to allow one uplink transmission configuration to perform the uplink transmission only in one uplink subframe or configured to allow one uplink transmission configuration to perform the uplink transmission in the uplink subframe corresponding to the set value (one value of N={2, 4, 8}). In addition, the base station may be configured (for example, N=2 and 4) to include one or more N value in the higher layer signaling to configure a candidate or a set or a combination of the uplink subframes, in which one uplink transmission configuration is valid, in the terminal. For example, if the higher layer signaling field is set to be N=2, 4, the terminal may determine that one uplink transmission configuration is valid in two uplink subframes or four uplink subframes. The information on the number of subframes received through the higher signaling may be the maximum number of subframes in which the terminal can be configured through one uplink transmission configuration information. For example, if N is 4, up to 4 subframes can be scheduled through one configuration. The number of subframes scheduled from the actual one configuration may be determined from the value included in the uplink transmission configuration information received through the control information.

As described above, the base station may set the valid uplink subframe (either of N=2 or N=4) for the corresponding uplink transmission configuration in the terminal, in which a plurality of valid uplink subframe candidates are configured, through the uplink transmission configuration information. Hereinafter, in the embodiment of the present disclosure, the configuration, allocation, or scheduling of the uplink shared channel (PUSCH) transmission in the terminal by the base station is represented by the uplink transmission configuration.

At this point, the uplink transmission in the at least one uplink subframe may be configured or may not be configured depending on capabilities of the base station and the terminal. Further, even if the base station configures one uplink transmission configuration in the terminal in one or more uplink subframe through the higher layer signaling, the base station may configure one uplink transmission configuration in the terminal to perform the uplink transmission in one uplink subframe using the DCI or the like.

The base station may configure an uplink transmission for an uplink cell 610 of the terminal in a downlink control channel (PDCCH) 620 of a licensed spectrum cell or an unlicensed spectrum cell 600 in the terminal by using DCI format 0 or DCI format 4 or a new uplink control information transmission format. If the base station configures the uplink transmission configuration in the terminal through the higher layer signaling to perform the uplink transmission in one or more uplink subframe, the base station may configure the information on the uplink cell 610 of the terminal on the downlink control channel (PDCCH) 620 of the cell 600 in the terminal using DCI format 0, DCI format 4, or a newly defined uplink control information transmission format. At this time, the base station may add a new field informing in how many uplink subframes the uplink transmission configuration in the terminal through the downlink control channel of the cell is valid or applied, and may be informed to the terminal by including the added new field in the DCI format 0, the DCI format 4, or the new uplink control information transmission format. Further, the base station may transmit or configure at least one of the time (or the uplink transmission configuration and the uplink shared channel transmission start time relation information K) when the uplink transmission starts and the time when the uplink transmission ends to or in the terminal through the downlink control channel of the cell. At this time, the base station may further transmit or configure at least one information of the maximum channel occupancy time information of the cell, the maximum channel occupancy time information available from the downlink control channel transmission time, or the time information when the configured uplink transmission may be performed to or in the terminal through the downlink control channel of the cell.

For example, the base station may inform that the uplink transmission configuration is applied in N uplink subframes by adding a new filed to DCI format 0, DCI format 4, or new uplink control information transmission format of the downlink control channel (PDCCH) 620 of the cell 600. Further, the base station may inform that the uplink transmission configuration is applied in N uplink subframes by allowing the terminal configured to perform a transmission in a plurality of uplink subframes by the uplink transmission configuration of one of the terminals in which the uplink transmission is configured in the unlicensed spectrum to re-interpret the existing field.

For example, it may be informed through a field of 2 bits in how many uplink subframe the uplink transmission configuration is valid. For example, bit 00 means N=1, 01 means N=2, 10 means N=3, and 11 means N=4, which may be set to be one of the values. At this point, the interpretation of N is merely an example, and it may be informed that a different number of uplink subframes than the number of other bitmaps may also be applied and a larger number of uplink subframes using bits larger than 2 bits may be used.

Further, in the case of N=1, even if the base station configures the uplink transmission configuration in the terminal through the higher layer signaling to perform the uplink transmission in one or more uplink subframe through one uplink transmission configuration, the terminal may determine that the uplink transmission configuration is valid only in one uplink subframe. That is, the uplink transmission configuration information configured through the downlink control channel is previously defined or takes precedence over the information configured as the higher layer signaling.

At this point, the number of valid uplink subframes corresponding to the field may be set through the higher layer signaling. In other words, the number of valid uplink subframes corresponding to each bit string may be set through the higher layer signaling so that 00, 01, 10, and 11 bits are each matched with N=1, 2, 3, 4 or N=1, 2, 4, 8.

FIG. 6 illustrates the case in which K=4 and N=4. In other words, the base station configures (625) the uplink transmission 640 for four uplink subframes in the terminal through the downlink control channel 620 of the licensed spectrum or unlicensed spectrum cell 600 in the subframe n. If the uplink transmission is the uplink transmission in the unlicensed spectrum, the terminal performs the channel sensing operation 650 for the unlicensed spectrum before the configured uplink transmission starts. If the unlicensed spectrum in which the uplink transmission is configured through the channel sensing operation 650 is determined to be the idle state, the terminal may perform the uplink transmission from the base station during the set uplink subframe 640. At this point, the terminal may re-perform (660) the channel sensing operation within the uplink transmission interval 640, or maintain the uplink signal transmission through the remaining resources other than a resource 660 in which other terminals perform the channel sensing operation within the uplink transmission interval 640 for the channel sensing operation in the unlicensed spectrum of other terminals in which the uplink transmission is configured in the subframes n+4, n+5 and the like. At this point, the uplink transmission interval 640 may be a consecutive uplink subframe or a discontinuous uplink subframe.

Further, the base station may configure, in the terminal, whether to perform the channel sensing operation 660 within the configured uplink transmission interval 640. In other words, the base station may configure, in the terminal, the uplink transmission 640 for at least one uplink subframe, including the subframe n+4, as one uplink transmission configuration information by using the uplink control information transmission format in the downlink control channel 620 of the licensed spectrum or the licensed spectrum cell 600 in the subframe n. In this case, the uplink transmission configuration information 640 may include the configuration information on whether to perform the channel sensing operation 660 within the configured uplink transmission interval 640. For example, when the base station configures the uplink transmission to perform the channel sensing operation 660 within the uplink transmission interval 640 and transmits the configured uplink transmission configuration information to the terminal, the terminal receiving it performs the configured channel sensing operation 660 within the configured uplink transmission interval 640.

At this point, the channel sensing operation 660 may be configured to be performed in each subframe within the configured uplink transmission interval 640 or to be performed only in some subframes. If the channel sensing operation 660 is performed only in some subframes within the configured uplink transmission interval 640, the information on the subframe in which the channel sensing operation 660 is performed may be configured by being included in the uplink transmission configuration information or may be configured according to a previously defined manner between the base station and the terminal. For example, when four consecutive uplink subframes are set to be the uplink transmission interval 640, it may be defined to perform the channel sensing operation 660 in a subframe located at the middle of the set uplink transmission interval or even subframes. As another example, the subframe in which the channel sensing operation 660 is performed may be set according to the length of the set uplink transmission interval 640. For example, when four consecutive uplink subframes are set to be the uplink transmission interval 640, the channel sensing operation 660 is performed in a unit of two subframes, and when six consecutive uplink subframes are set to be the uplink transmission interval 640, the channel sensing operation 660 may be defined in a unit of three subframes. At this time, the channel sensing operation 660 may not be performed in the last subframe of the configured uplink transmission interval 640.

If the base station configures the uplink transmission not to perform the channel sensing operation in the uplink transmission configuration information or there is no field for the configured channel sensing operation 660 within the configured uplink transmission interval 640 in the uplink transmission configuration information, the terminal receiving this may consecutively perform the uplink signal transmission in the configured uplink subframe without performing the channel sensing operation 660 in the configured uplink transmission interval 640. At this point, the channel sensing operation 650 performed by the terminal before the uplink transmission in the unlicensed spectrum set by the base station and the channel sensing operation 660 within the configured uplink transmission interval 640 from the base station or the minimum required time may be different. For example, the channel sensing operation 660 interval within the uplink transmission interval 640 may be set to be shorter than the channel sensing operation 650 interval performed before the uplink transmission. As another example, the channel sensing operation 660 interval within the uplink transmission interval 640 may be performed using only some of the resources in which the uplink transmission is configured. The operation of performing the channel sensing operation in the uplink subframe may be applied to all of the cases of the present embodiment.

In the case of the terminal in which the uplink transmission in a plurality of uplink subframes as one uplink configuration information is configured by the base station, the terminal may configure some of the information included in the uplink configuration information so that the configuration information is equally applied in the plurality of uplink subframes to transmit the uplink signal For example, at least one field of a carrier indicator, a frequency hopping flag, a resource block assignment, a resource block assignment and a hopping resource allocation, a demodulation and coding scheme, a cyclic shift for DMRS and OCC index, a resource allocation type, precoding information, and the number of layers may be equally applied to the plurality of uplink subframes.

At this point, when one uplink configuration information configures the uplink transmission in a plurality of uplink subframes, the terminal may differently apply a transmit power control (TPC) command of the information included in the uplink configuration information according to a TPC command analysis method. If the TPC command for the uplink signal transmission is set to accumulate the TPC command, the terminal may apply the same TPC value without accumulating the TPC command in the plurality of uplink subframes configured from one uplink configuration information. That is, the TPC values is not accumulated within a plurality of uplink subframes transmitted through one uplink transmission configuration, and a TPC may be accumulated among a plurality of uplink subframes transmitted through another uplink transmission configuration. In other words, the same uplink transmission power may be set and transmitted without changing the transmission power by the TPC command within a plurality of uplink transmissions transmitted in one uplink transmission configuration. The terminal may confirm the TPC information from the uplink configuration information. When the plurality of subframes are scheduled through one uplink configuration information, the terminal may equally apply the TPC information included in the one uplink configuration information to the plurality of subframes. The terminal may transmit the uplink signal by applying the same transmit power to the plurality of subframes.

The terminal may set the uplink transmission power by changing the transmission power by the TPC command in all or some subframes of a plurality of uplink subframe transmission intervals set through the uplink transmission configuration. For example, the terminal may accumulate or change the TPC command within the subframe determined as the valid uplink subframe to set the uplink signal transmission power for each uplink transmission subframe. At this point, the terminal can sequentially accumulate the TPC command among a plurality of uplink subframes set through the uplink transmission configuration as many as the set uplink subframe regardless of whether the uplink subframe is valid (regardless of the actual uplink transmission) to set the uplink signal transmission power for the uplink transmission. If the TPC command for the uplink signal transmission is set to use a value (absolute value) set in the TPC command, the terminal may equally apply a TPC command included in the uplink signal configuration to each of the plurality of set uplink subframes. The method for applying a TPC command may also be applied to all cases of the present embodiments.

When the terminal configured to perform the uplink transmission in the plurality of uplink subframes with one uplink configuration information from the base station is configured to transmit channel state information (CSI) in the uplink configuration information for the terminal received from the base station in the subframe n to the base station, the terminal may transmit the CSI to the base station using at least one of the following methods in one of a plurality of uplink subframes. At this point, the CSI may not be transmitted in another uplink subframe other than the uplink subframe in which the CSI is transmitted.

Method A-1: CSI Transmission in Subframe n+4

Describing in more detail the method A-1, the terminal configured to transmit CSI through the uplink configuration information in the subframe n transmits the CSI in the subframe n+4 if it is determined that the unlicensed spectrum in which the uplink signal transmission is configured in the subframe n+4 is the idle channel. If it is determined that the unlicensed spectrum in which the uplink signal transmission is configured in the subframe n+4 is not the idle channel, but if it is determined that the unlicensed spectrum in which the uplink signal transmission is configured in any one of the plurality of set uplink subframes is the idle channel, the terminal does not transmit the CSI. At this point, the time relation of n+4 is described with reference to the time relation of transmitting the CSI through the uplink transmission configuration or the CSI report request setting time and the configured uplink channel based on the FDD, in which n+4 as well as the time relation of n+4 may be changed according to the uplink transmission configuration or the CSI information report request setting time defined in the TDD, and the time relation of the CSI transmission through the configured uplink channel, the uplink transmission configuration or the CSI information report request setting time defined in the LAA or the third frame structure, and the time relation of the CSI transmission through the configured uplink channel.

Method A-2: CSI Transmission in a First Subframe in which the Uplink Transmission May be Performed, Among the Plurality of Set Uplink Subframes Describing in more detail the method A-2, a plurality of uplink subframe transmissions are configured by the plurality of uplink configuration information in the subframe n, and the terminal configured to transmit or report the CSI information to the base station transmits the CSI in the subframe transmission start time n+4 if it is determined that the unlicensed spectrum in which the uplink signal transmission is configured just before the subframe transmission start time n+4 is the idle channel. Even if it is determined that the unlicensed spectrum in which the uplink signal transmission is configured in the subframe n+4 is not the idle channel, the terminal transmits the CSI in the first valid subframe determined that the unlicensed spectrum in which the uplink signal transmission is configured among the plurality of set uplink subframes is the idle channel. For example, when the number of plural subframes is 2, the CSI may be transmitted in the second subframe.

Method A-3: CSI Transmission in the Last Subframe in which Uplink Transmission May be Performed, in the Subframe n+4 or Among a Plurality of Set Uplink Subframes Describing in more detail the method A-3, the plurality of uplink subframe transmissions are configured by the plurality of uplink configuration information in the subframe n, and the terminal configured to transmit or report the CSI information to the base station transmits the CSI in the subframe n+4 if it is determined that the unlicensed spectrum in which the uplink signal transmission is configured in the subframe n+4 is the idle channel. Even if it is determined that the unlicensed spectrum in which the uplink signal transmission is configured in the subframe n+4 is not the idle channel, the terminal transmits the CSI in the last valid subframe among the subframes determined that the unlicensed spectrum in which the uplink signal transmission is configured among the plurality of set uplink subframes is the idle channel. For example, the set CSI is transmitted in a last subframe 670 of the plurality of set uplink subframes in FIG. 6. In the case of the opposite analysis, when a plurality of subframes are set, it can be interpreted that the CSI is not transmitted in the first subframe. For example, when the number of plural subframes is 2, 3, or 4, the CSI is not transmitted in the first subframe of the plurality of set subframes.

The base station can instruct the terminal to report the CSI through the uplink configuration information. If the CSI report is set, the terminal can report the CSI to the base station. The terminal can report the CSI in a subframe, in which the uplink transmission can be performed, among n subframes. The terminal can report the CSI in the last subframe among n subframes. In addition, the terminal can report the CSI in subframes other than the first subframe among n subframes.

If the terminal configured to perform the uplink transmission in the plurality of uplink subframes with one uplink configuration information from the base station through the higher layer signaling is configured to transmit, to the uplink configuration information for the terminal received from the base station in the subframe n, the uplink in the plurality of uplink subframes and is configured to transmit the SRS to the base station in the uplink transmission configuration information, the terminal may perform the SRS transmission in the uplink subframe when there is the uplink subframe in which the SRS transmission is configured among the uplink subframes determined that the uplink signal transmission is valid among the plurality of set uplink subframes. At this point, according to the SRS transmission configuration, the SRS may be transmitted in one or more uplink subframe. At this point, the base station and the terminal may set the SRS transmission subframe to be the same using at least one of the CSI transmission subframe setting methods A-1, A-2, A-3, and A-4.

When one uplink configuration information is configured to perform the uplink transmission in the plurality of uplink subframes, the base station may be configured to repeatedly transmit the same information or transmit different information to the terminal in the plurality of uplink subframes. More specifically, when one uplink configuration information is configured to perform the uplink transmission in the plurality of uplink subframes, the base station may be configured to repeatedly transmit data for the corresponding HARQ process in the uplink subframes, in which the terminal determines that the uplink transmission is valid, among the plurality of uplink subframes, including at least one of one HARQ process and redundancy version information in the uplink configuration information. In other words, in the terminal configured to perform the uplink transmission in the plurality of uplink subframes in which one uplink configuration information is configured, when only one HARQ process information is included in the uplink configuration information received from the base station, the terminal may repeatedly transmit data for the HARQ process in the valid uplink subframe after the channel sensing operation among the plurality of uplink subframes. In addition, the base station may add, to the uplink configuration information, an indication field differentiating whether the uplink transmission is an uplink transmission in a partial subframe (for example, PUSCH transmission only in a first or second slot) or an uplink transmission in a general subframe (PUSCH transmission using 1 ms or two slots). In other words, the terminal includes the indication field differentiating whether the uplink transmission is an uplink transmission in a partial subframe (for example, PUSCH transmission in a first or second slot) or an uplink transmission in a general subframe (PUSCH transmission using 1 ms or two slots) in the uplink configuration information for the subframe n+4 received from the base station in the subframe n and may perform the uplink transmission according to the setting of the indication field. At this point, the information on whether to set the partial uplink subframe {ON, OFF}, true setting, or the partial subframe start or end position information of the uplink may be configured in the terminal through the higher layer signaling. At this point, the partial uplink subframe may be set to support only one of the first slot or the second slot or to support both partial uplink subframes.

In the terminal configured to perform the uplink transmission in the plurality of uplink subframes using one uplink configuration information using at least one signal of the higher layer signaling or the uplink configuration information from the base station, when the uplink transmission is indicated in the received uplink configuration information as the uplink transmission in the partial subframe (e.g., PUSCH transmission only in the second slot), the partial subframe may be considered as one of the plurality of subframes and the uplink transmission may be performed. For example, the terminal configured to perform the uplink transmission in up to four uplink subframes using one uplink configuration information using at least one of the higher layer signaling and the uplink configuration information from the base station may be determined that the uplink subframe that can be transmitted using the actual uplink transmission configuration is a second slot of the subframe n+4 and subframes n+5, n+6, and n+7, when the uplink transmission is indicated in the subframe configuration information received in the subframe n as the uplink in the partial subframe (e.g., PUSCH transmission only in the second slot).

If the terminal performs the channel sensing operation to perform the configured uplink transmission in the second slot of the subframe n+4, but if it is determined that the channel is not in the idle state, the terminal may perform the channel sensing operation and the uplink signal transmission under the assumption that the general subframe having a length of 1 ms is used from the subframe n+5. That is, when the uplink transmission is indicated in the uplink configuration information received by the terminal in the subframe n as the uplink in the partial uplink subframe (for example, PUSCH transmission only in the second slot), the partial subframe is applied only to the subframe n+4. Further, at this point, the partial subframe transmission structure may reuse the second slot structure (for example, DMRS structure and sequence) of the general subframe structure as it is.

Here, the example in which the partial subframe performs the PUSCH transmission by allowing the terminal to use only the second slot is described, but it is also possible to perform the PUSCH transmission using only the first slot. If the PUSCH transmission using only the first slot or the second slot is possible, an indication field for differentiating the PUSCH transmission in the first slot, the PUSCH transmission in the second slot, and the PUSCH transmission in the subframe may be included in the uplink scheduling information (UL grant). In the case of supporting two or more uplink subframe structures, a bit for setting whether the partial uplink subframe corresponds to the first slot or the second slot is additionally included or may be transmitted to the terminal by being included in the field indicating the partial uplink subframe or the general subframe. The method for using a partial uplink subframe and indicating a partial uplink subframe may be applied to all the cases of the present embodiment.

Figure 7:
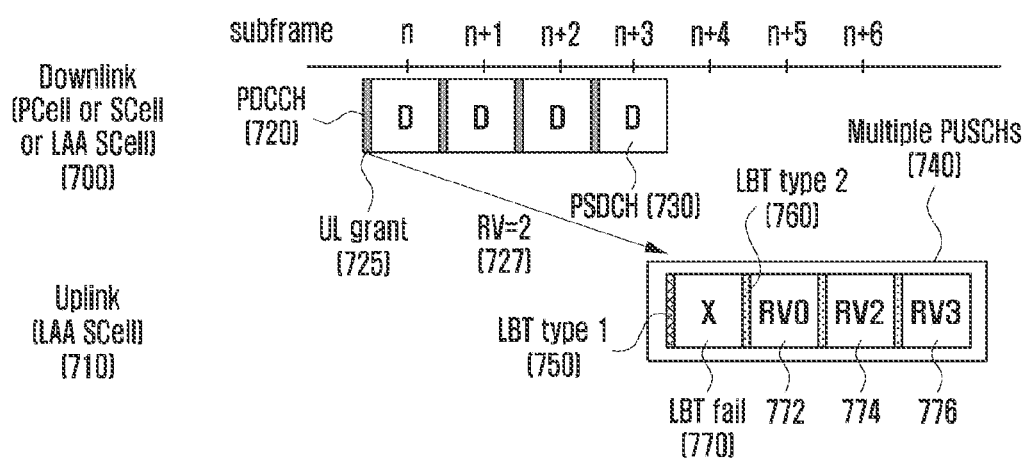
FIG. 7 is a diagram illustrating a method for an uplink repeated transmission by applying different RV values in the plurality of uplink subframes.

FIG. 7 is a diagram illustrating a method for repeatedly transmitting an uplink by applying different redundancy version (RV) values in the plurality of uplink subframes.

When K=4 and N=4, the operation will be described by way of example. The terminal configured to perform the uplink signal transmission in the plurality of uplink subframes from the base station through one uplink transmission configuration receives uplink transmission configuration information 725 from the base station in the subframe n. At this point, according to the information included in the uplink transmission configuration information 725, the terminal determines that the uplink transmission configuration is valid from the subframe n+4 to the subframe n+7. Further, the terminal confirms that the redundancy version (RV) for the uplink transmission is set to be 2 from the base station through the uplink transmission configuration information 725. At this point, the RV value for the uplink transmission may be determined based on MCS information, HARQ process information, new data indicator (NDI) information, or previously defined information (for example, assumed that RV=0 in the case of initial transmission), or the like as the uplink transmission configuration information without the redundancy version (RV) field.

The terminal that has performed the channel sensing operation 750 for the unlicensed spectrum cell 710 in which the uplink transmission is configured does not perform the uplink signal transmission in the subframe n+4 if it is determined that the unlicensed spectrum is occupied by other devices. Thereafter, if it is determined that the unlicensed spectrum cell 710 is the idle state in the terminal that has performed the channel sensing operation 760 for the subframe n+5, the terminal may transmit the uplink signal to the unlicensed spectrum cell 710 from subframe n+5 to subframe n+7. At this point, if the number of HARQ processes set by the base station and the number of valid uplink subframes in which the uplink transmission may be performed are different according to the channel sensing operation, the base station and the terminal need a data transmission reference in the valid uplink subframe. At this point, the base station and the terminal may use one of the following methods.

Method C-1: The terminal transmits the uplink signal using the redundancy version configured in the first valid uplink subframe after the channel sensing operation among a plurality of uplink subframes The method C-1 will be described in more detail. The terminal determining that the RV value for the uplink signal transmission is set to be 2 from the base station through the uplink transmission configuration 725 performs the uplink signal transmission using the RV value of 2 in the first uplink subframe 772 among valid uplink subframes 772, 774, and 776 in which the uplink signal transmission may be performed after the channel sensing operation for the unlicensed spectrum. At this point, the terminal may not perform the uplink transmission in the remaining valid uplink subframes 774 and 776.

Method C-2: The terminal repeatedly transmits the uplink signal using the redundancy version set in the valid uplink subframe after the channel sensing operation among the plurality of uplink subframes The method C-2 will be described in more detail. The terminal determining that the RV value for the uplink signal transmission is set to be 2 from the base station through the uplink transmission configuration 725 performs the configured uplink signal transmission using the RV value of 2 in each of the valid uplink subframes in which the uplink signal transmission may be performed after the channel sensing operation for the unlicensed spectrum. That is, the same uplink transmission may be repeatedly performed by setting the RV value to be 2 in the uplink subframe 772, the uplink subframe 774, and the uplink subframe 776

Method C-3. Terminal sequentially repeatedly transmits uplink according to redundancy version application sequence from redundancy version configured in uplink configuration information in previously defined redundancy version application sequence in valid uplink subframe after channel sensing operation among a plurality of uplink subframes.

The method C-3 will be described in more detail. The terminal determining that the RV value for the uplink signal transmission is set to be 2 from the base station through the uplink transmission configuration 725 may repeatedly perform the uplink transmission by sequentially applying the RV according to the RV application sequence in the valid uplink subframes in which the uplink signal transmission can be performed after the channel sensing operation for the unlicensed spectrum. For example, if the RV application sequence is previously defined as RV=0, RV=2, RV=3, and RV=1, the terminal repeats the uplink transmission by sequentially applying RVs different from the RV 2 set from the base station. That is, the uplink transmission may be repeatedly performed by setting the RV value to be 2 in the uplink subframe 772, the RV value to be 3 the uplink subframe 774, and the RV value to be 1 in the uplink subframe 776.

Method C-4: The terminal sequentially and repeatedly transmits the uplink signal according to redundancy version application sequence previously defined in the valid uplink subframe after the channel sensing operation among the plurality of uplink subframes The method C-4 will be described in more detail. The terminal determining that the RV value for the uplink signal transmission is set to be 2 from the base station through the uplink transmission configuration 725 may repeatedly perform the uplink transmission by sequentially applying the RV according to the RV application sequence in the valid uplink subframes in which the uplink signal transmission may be performed after the channel sensing operation for the unlicensed spectrum. At this point, even if the base station sets the RV value, the terminal may ignore the set RV value and sequentially repeat the uplink transmission according to the previously defined RV application sequence. For example, when the RV application sequence is previously defined as RV=0, RV=2, RV=3, and RV=1, even if the RV value is set to be 2 from the base station, the terminal may sequentially repeat the uplink transmission according to the defined RV sequence. That is, the uplink transmission may be repeatedly performed by setting the RV value to be 0 in the uplink subframe 772, the RV value to be 2 the uplink subframe 774, and the RV value to be 3 in the uplink subframe 776. In other words, when the above method C-4 is applied, the RV value set by the base station is not used by the terminal.

Therefore, in the case of the above method C-4, the RV field may be used for other purposes. In other words, if the RV values and sequence applied to the plurality of uplink subframes are previously defined in the base station that is configured to perform the uplink signal transmission in the plurality of uplink subframes to the terminal through one uplink transmission and the terminal performs the uplink transmission according to a previously defined RV sequence in the valid uplink subframe determined as the idle channel after the channel sensing operation among the plurality of uplink subframes set by the terminal, the base station may use the RV field to inform in how many uplink subframe the uplink transmission is valid or applied. That is, the base station may reuse the RV field without adding a new field and inform the terminal of the number of uplink subframes in which the uplink transmission configuration is valid or applied. If the number of subframes in which the uplink transmission configuration is valid or applied by using the RV field is informed to the terminal, when the number of subframes is 1, the base station may be previously defined so that the terminal uses RV 0. In other words, in the terminal in which one uplink transmission configuration from the base station is configured to be valid in or applied to the uplink signal transmission in the plurality of uplink subframes, if the RV value and sequence applied to the plurality of uplink subframes are previously defined, the terminal may use the RV field among the uplink transmission configuration information received from the base station to determine the number of uplink subframes in which the received uplink transmission configuration is valid or applied. In the terminal determining the number of uplink subframes in which the received uplink transmission configuration is valid or applied using the field, when the number of valid subframes is 1, the terminal may use RV 0 to transmit the uplink signal. For example, when the uplink transmission configuration information is the uplink transmission configuration information for one subframe, RV=0, when the uplink transmission configuration information is the uplink transmission configuration information for two subframes, RV=1, when the uplink transmission configuration information is the uplink transmission configuration information for three subframes, RV=2, and when the uplink transmission configuration information is the uplink transmission configuration information for four subframe, RV=3, thus the base station predefines them with the terminal or set them in the terminal through the higher layer signaling, such that the number of uplink subframes to which the uplink transmission configuration is applied may be transmitted to or set in the terminal using the RV field. The method for transmitting or setting the number of uplink subframes to which the uplink transmission configuration is applied by using the RV field to or in the terminal may be applied to all the cases of the present disclosure as well as the method C-4. Further, as described above, it may be interpreted that transmitting or setting the number of uplink subframes to which the uplink transmission configuration is applied using the RV field to or in the terminal adds a field informing the number of uplink subframes to which the uplink transmission configuration is applied without the RV field, but the method is the same.

Method C-5: The terminal repeatedly transmits the uplink signal according to fixed redundancy version for the plurality of uplink subframes The method C-5 will be described in more detail. The terminal determining that the RV value for the uplink signal transmission is set to be 2 from the base station through the uplink transmission configuration 725 may repeatedly perform the uplink transmission according to the RV value defined for the valid uplink subframes in which the uplink signal transmission may be performed after the channel sensing operation for the unlicensed spectrum. At this point, the terminal may ignore the RV value set by the base station and sequentially repeat the uplink transmission according to the RV defined for the subframe. For example, when the RV application sequence is previously defined as RV=0, RV=2, RV=3, and RV=1, even if the RV value is set to be 2 from the base station, the terminal may sequentially repeat the uplink transmission according to the defined RV sequence. That is, in method C-5, among the plurality of uplink subframes, the RV value in the first uplink subframe 770 is always fixed to be 0, the RV value in the second subframe 772 is always fixed to be 2, the RV value in the third uplink subframe 774 is always fixed to be 3, and the RV value in the fourth uplink subframe 776 is always fixed to be 1, and thus the uplink transmission may be repeatedly performed. At this point, if the uplink transmission is valid in four or more subframes, the RV value may be sequentially set again from RV=0. That is, in the case of the above example, the terminal may repeatedly perform the uplink transmission by setting the RV value to be 2 in the uplink subframe 772 in which the channel can be occupied, the RV value to be 3 the uplink subframe 774, and the RV value to be 1 in the uplink subframe 776 after the channel sensing operation of the unlicensed spectrum.

When the above method C-5 is applied, the RV value set by the base station is not used by the terminal. Therefore, in the case of the above method C-5, the RV field may be used for other purposes. In other words, when the RV value and sequence applied to a plurality of uplink subframes are previously defined in a base station configured to perform the uplink signal transmission to the terminal in the plurality of uplink subframes through the uplink transmission configuration, the base station may use the RV field without adding a new field informing in how many uplink subframes the uplink transmission is valid or applied to inform the terminal of the number of subframes in which the uplink transmission configuration is valid or applied. If the number of subframes in which the uplink transmission configuration is valid or applied by using the RV field is informed to the terminal, when the number of subframes is 1, the base station may be previously defined so that the terminal uses RV=0.

In other words, in the terminal in which one uplink transmission configuration from the base station is configured to be valid in or applied to uplink signal transmission in a plurality of uplink subframes, if the RV value and sequence applied to the plurality of uplink subframes are previously defined, the terminal may use the RV field among the uplink transmission configuration information received from the base station to determine the number of uplink subframes in which the received uplink transmission configuration is valid or applied. In the terminal determining the number of uplink subframes in which the received uplink transmission configuration is valid or applied using the RV field, when the number of valid subframes is 1, the terminal may use RV=0 to transmit the uplink signal.

When the one uplink configuration information is configured in the terminal to perform the uplink transmission in the plurality of uplink subframe, the base station may be configured to repeatedly transmit the same information or different information to the terminal in the plurality of uplink subframes. More specifically, when one uplink configuration information is configured to perform the uplink transmission in the plurality of uplink subframes, the base station may be configured so that the terminal transmits data for the plurality of HARQ processes in the valid uplink subframe among the plurality of uplink subframes, including the plurality of HARQ processes and the redundancy version information for each HARQ process in the uplink configuration information. At this point, the RV information for each HARQ process is not included, or the RV information less than the HARQ process included in the uplink configuration information may be included.

In the terminal configured to allow one uplink configuration information to perform the uplink transmission in the plurality of uplink subframes, when it may be determined that the plurality of HARQ process information and at least one HARQ process information among the redundancy information for the corresponding process are included in the uplink configuration information received from the base station or only one HARQ process information is included in the uplink configuration information but at least one HARQ process is configured, the terminal may each transmit data for the HARQ process in the valid uplink subframe among the plurality of uplink subframes after the channel sensing operation.

Figure 8:
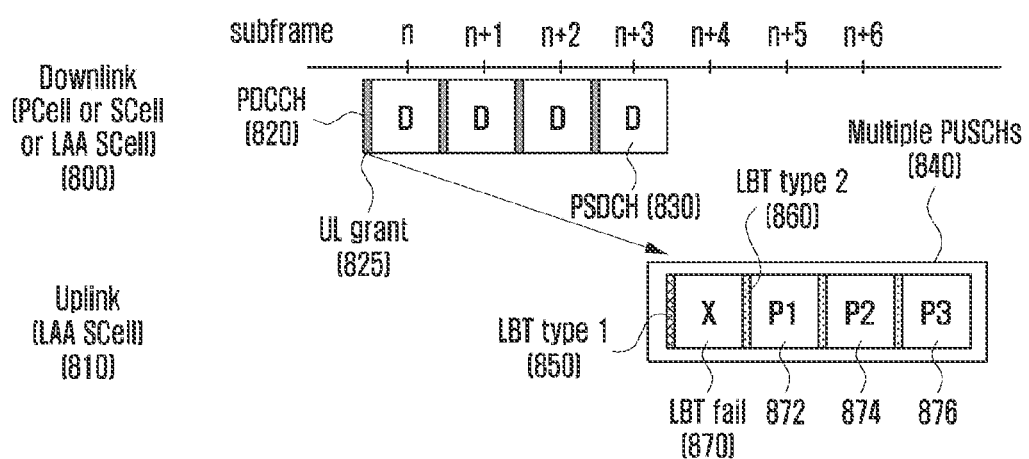
FIG. 8 is a diagram illustrating a method for an uplink transmission for different HARQ processes in the plurality of uplink subframes.

FIG. 8 is a diagram illustrating a method for uplink transmission for different HARQ processes in a plurality of uplink subframes.

When K=4 and N=4, the operation will be described by way of example. The terminal configured to perform the uplink signal transmission in the plurality of uplink subframes from the base station through one uplink transmission configuration receives uplink transmission configuration information 825 from the base station in the subframe n. At this point, according to at least one information of the K and N included in uplink transmission configuration information 825, the terminal may determine that the uplink transmission configuration is valid from the subframe n+4 to the subframe n+7. Further, the terminal confirms that at least one HARQ process for the uplink transmission and the redundancy version for the corresponding HARQ process are configured from the base station through the uplink transmission configuration information 825.

The terminal that has performed the channel sensing operation 850 for the unlicensed spectrum cell 810 in which the uplink transmission is configured does not perform the uplink signal transmission in the subframe n+4 if it is determined that the unlicensed spectrum is occupied by other devices. Thereafter, if it is determined that the unlicensed spectrum cell 810 is the idle state in the terminal that has performed the channel sensing operation 860 for the subframe n+5, the terminal may transmit the uplink signal to the unlicensed spectrum cell from subframe n+5 to subframe n+7.

At this point, the terminal may transmit data for the set HARQ process in the valid uplink subframes in which the uplink signal transmission may be performed among the plurality of uplink subframes after the channel sensing operation. At this point, if the number of HARQ processes set by the base station and the number of valid uplink subframes in which the uplink transmission may be performed according to according to the channel sensing operation are different, the criteria on which signal for the HARQ process is transmitted in the uplink subframe determined that the base station and the terminal are valid are required. At this point, the base station and the terminal may use one of the following methods.

Method D-1: The terminal transmits the uplink signal according to the previously defined HARQ process application sequence (for example, sequentially applied in order from most significant bit (MSB) to least significant bit (LSB) of HARQ process field) in the valid uplink subframe among the plurality of uplink subframes after the channel sensing operation The method D-1 will be described in more detail. The terminal applying the uplink transmission configuration to the plurality of uplink subframes from base station through the uplink transmission configuration 825 and determining that the plurality of HARQ processes are included in the uplink transmission configuration may perform the uplink signal transmission in the valid uplink subframe according to the HARQ process sequence set from the HARQ process of the MSB to the LSB of the set HARQ process field in the valid uplink subframe in which the uplink signal transmission may be performed after the channel sensing operation for the unlicensed spectrum prior to starting the configured signal transmission.

For example, if HARQ process #0, HARQ process #2, HARQ process #3, and HARQ process #1 are set in order from the MSB to the LSB in the HARQ process field, the HARQ process in order of LSB from the MSB of the set HARQ process field may perform the transmission in the sequentially valid uplink subframe. That is, the uplink transmission for HARQ process #0 in the uplink subframe 872, HARQ process #2 in the uplink subframe 874, and HARQ process #3 in the uplink subframe 876 may be performed. At this point, if the unlicensed spectrum determined prior to the transmission of the uplink subframe 870 is not the idle state, the terminal does not perform the transmission for the HARQ process #0 set in the uplink subframe 870. If the unlicensed spectrum determined before the transmission of the uplink subframe 872 is the idle state, the terminal performs the transmission for the HARQ process #0 corresponding to the MSB of the HARQ process field set in the uplink subframe 872 and if both of the uplink subframe 874 and the uplink subframe 876 are the valid uplink subframe, the uplink transmission for the HARQ process #2 and the HARQ process #3 is performed in the uplink subframe 874 and the uplink subframe 876, respectively.

At this point, the base station may add a new field informing in how many uplink subframe the uplink transmission is valid or applied to inform whether the uplink transmission configuration is applicable to N uplink subframes or may use the number of HARQ process fields included without adding the new field to inform the terminal of the number of uplink subframes in which the corresponding uplink transmission configuration is valid or applied. For example, when the value of the HARQ process number in the HARQ process field is set to be 000 or 111 or a previously defined value, the base station may be previously defined with the terminal so as to determine that the corresponding HARQ process is not valid. That is, the base station sets the HARQ process fields other than the number of uplink subframes in which the one uplink transmission configuration is valid or applied to be a value for the previously defined invalid HARQ process as described above, and thus may inform the terminal of the number of uplink subframes in which the one uplink transmission configuration is valid or applied can be informed without the signal transmission.

In other words, in the terminal in which one uplink transmission configuration from the base station is valid or applied for the uplink signal transmission in the plurality of HARQ process information, when the received uplink transmission configuration includes the plurality of HARQ process information, the uplink subframe as many as the remaining number of valid HARQ processes other than the HARQ process previously defined to be invalid among the HARQ process information may be determined as the number of uplink subframes in which one uplink transmission configuration is valid or applied. The method for setting to how many uplink subframes the one uplink transmission configuration is applicable using the HARQ process field may be applied to the present disclosure as well as the method D-1.

Method D-2: The terminal transmits the uplink signal according to the HARQ process allocated to each subframe for the plurality of uplink subframes The method D-2 will be described in more detail. The terminal determining that a plurality of HARQ processes are included in the uplink signal transmission from the base station through the uplink transmission configuration 825 may perform the uplink signal transmission on HARQ processes set for a plurality of subframes For example, HARQ process #0, HARQ process #2, HARQ process #3, and HARQ process #3 are sequentially set in LSB order from the MSB of the HARQ process field from the first subframe among the plurality of subframes to which the one uplink transmission configuration is applied and the terminal may perform the transmission for each set HARQ process for the uplink subframe in which the uplink signal may be transmitted after the channel sensing operation. That is, the HARQ processes is connected to the uplink subframes, and the uplink transmission for the HARQ process connected to the subframe is performed in a valid uplink subframe.

In other words, the uplink transmission for HARQ process #0 in the uplink subframe 870, HARQ process #2 in the uplink subframe 872, HARQ process #3 in the uplink subframe 874, uplink subframe 876 in the uplink subframe 876 is set to be performed and if it is determined that there is no idle channel in the uplink subframe 870 as shown in FIG. 8, the terminal performs the uplink transmission for the HARQ process #2 in the uplink subframe 872, the HARQ process #3 in the uplink subframe 874, and the HARQ process #1 in the uplink subframe 876 to be able to perform the uplink signal transmission after the channel sensing operation.

At this point, the base station may inform the terminal of the number of uplink subframes in which the corresponding uplink transmission configuration is valid or applied using the HARQ process field without adding a new field informing in how many uplink subframes the uplink transmission is valid or applied. For example, when the value of the HARQ process number in the HARQ process field is set to be 000 or 111 or a previously defined value, the base station may be previously defined with the terminal so that the corresponding HARQ process is not valid. That is, the base station sets the HARQ process fields other than the number of uplink subframes in which the one uplink transmission configuration is valid or applied to a value for a previously defined invalid HARQ process as described above, and thus may inform the terminal of the number of uplink subframes in which the one uplink transmission configuration is valid or applied can be informed without the signal transmission.

In other words, in the terminal in which one uplink transmission configuration from the base station is valid or applied for the uplink signal transmission in the plurality of HARQ process information, when the received uplink transmission configuration includes the plurality of HARQ process information, the uplink subframe as many as the remaining number of valid HARQ processes other than the HARQ process previously defined as not valid among the HARQ process may be determined as the number of uplink subframes in which one uplink transmission configuration is valid or applied.

Method D-3: Terminal transmits uplink signal having precedence over HARQ process for retransmission or HARQ process for signal having high QoS among set HARQ processes for a plurality of uplink subframes The method D-3 will be described in more detail. The terminal determining that a plurality of HARQ processes are included in the uplink signal transmission from the base station through the uplink transmission setting 825 may perform the uplink signal transmission in the valid uplink subframe according to the HARQ process sequence set from the HARQ process to the LSB in the MSB of the set HARQ process field like the method D-1 or perform the uplink transmission for the corresponding HARQ process in the valid uplink subframe by setting up the HARQ process for each uplink subframe like the method D-2, in the uplink subframe determined that the uplink signal transmission is valid after the channel sensing operation for the unlicensed spectrum.

Referring to the method D-1 as an example, if HARQ process #0, HARQ process #2, HARQ process #3, and HARQ process #1 are set in order from the MSB to the LSB in the HARQ process field, the transmission may be performed in the sequentially valid uplink subframe according to the set HARQ process field. That is, the uplink transmission for HARQ process #0 in the uplink subframe 872, HARQ process #2 in the uplink subframe 874, and HARQ process #3 in the uplink subframe 876 may be performed. For example, if the transmission priority of the HARQ process #3 is high, for example, in the case of the retransmission or the transmission having high QoS class, the uplink transmission for HARQ process #3 in the uplink subframe 872, HARQ process #0 in the uplink subframe 874, and the HARQ process #2 in the uplink subframe 876 may be performed. That is, HARQ processes having the high priority among the HARQ processes set for the uplink transmission among the valid uplink subframes may be transmitted first. At this point, if priorities of a plurality of HARQ processes are the same, the priority may be reset in order of LSB from the MSB of the HARQ process field included in the uplink transmission configuration.

As described above, when the channel sensing operation for the uplink signal transmission is required, the base station may set a specific time (e.g., one or more uplink transmission symbol) in the uplink transmission subframe configured for the terminal not to transmit any signal for performing the channel sensing operation. At this point, performing the channel sensing operation in the symbol in which the signal is not transmitted is only an example, and other operations than the channel sensing operation can also be performed. In addition, the time during which the signal is not transmitted may be smaller than the length of one uplink transmission symbol.

In addition, informing at least one or more of the number and locations of symbols in which the uplink signal is not transmitted within the uplink transmission subframe configured in the terminal by the base station may be interpreted in the same manner as informing information on the number and positions of symbols in which the uplink signal (for example, uplink shared channel) within the uplink transmission subframe configured in the terminal by the base station is transmitted or at least one of the start symbol and the end symbol. The number and locations of the symbol to which the uplink signal is transmitted may be interpreted as the number and locations of the symbols to which the physical uplink shared channel (PUSCH) is transmitted At this point, the information (for example, subframe structure information transmission in FIG. 9 using 2 bits) on the start symbol, the end symbol and the like in which signals are transmitted in the uplink transmission subframe is transmitted in the uplink transmission configuration information or may be transmitted to the terminals through the control information scrambled with the CC-RNTI in addition to the uplink transmission configuration information.

Figure 9:
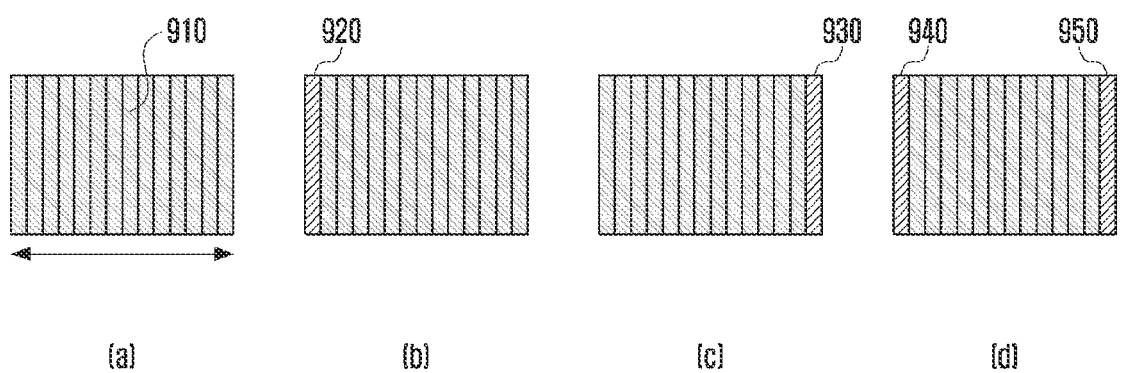
FIG. 9 is a diagram illustrating an uplink signal transmission interval.

FIG. 9 is a diagram illustrating an uplink signal transmission interval.

For example, as shown in FIG. 9B, the base station may configure the terminal to perform the uplink signal transmission using the remaining symbols except for a first symbol 920 of the uplink transmission subframe 900 or configure the start time of the configured uplink transmission as the second symbol of the uplink transmission subframe 900 in which the transmission is configured. At this point, it may be determined that the end time of the configured uplink transmission is the last symbol of the uplink transmission subframe 900 in which the transmission is configured.

As another example, as shown in FIG. 9C, the base station may configure the terminal to perform the uplink signal transmission using the remaining symbols except for the last symbol 930 of the uplink transmission subframe 900 or configure the end time of the configured uplink transmission as a symbol just before the last symbol 930 of the uplink transmission subframe 900 in which the transmission is configured. At this point, it may be determined that the start time of the configured uplink transmission is the first symbol of the uplink transmission subframe 900 in which the transmission is configured.

As another example, as shown in FIG. 9D, the base station may configure the terminal to transmit the uplink signal using the remaining symbols except for the first symbol 940 and the last symbol 950 of the uplink transmission subframe 900, configure the start time of the configured uplink transmission as the second symbol of the uplink transmission subframe 900 in which the transmission is configured, and configure the end time of the uplink transmission as a symbol just before the last symbol 950 of the uplink transmission subframe 900 in which the transmission is configured.

As described above, the base station may inform the terminal of the information on the number and locations of symbols in which the signal is transmitted within the uplink transmission subframe in which the transmission is configured based on the uplink transmission configuration information transmitted through the downlink control channel or the control information scrambled with the CC-RNTI or at least one of the start symbol and the end symbol.

If the uplink transmission configuration is for uplink transmission for one or more subframes, the information on the start symbol and the end symbol for transmitting the uplink signal within the uplink subframe included in the uplink transmission configuration information may be applied as follows. That is, since a plurality of subframes are set through one uplink configuration information, the location at which the uplink signal is transmitted may be changed depending on whether the position information for the uplink transmission is applied to each of the plurality of subframes or is applied under the assumption that the plurality of subframes are one uplink transmission.

Method E-1: The terminal transmits the uplink signal under the assumption that the information on the start symbol and the end symbol, in which the uplink signal is transmitted within the uplink subframe included in the uplink transmission configuration information is applied to each of one or more subframe set by the uplink transmission configuration.

Method E-2: The terminal transmits the uplink signal under the assumption that the information on the start symbol and the end symbol, in which the uplink signal is transmitted within the uplink subframe included in the uplink transmission configuration information is one or more subframe set by the uplink transmission configuration is one uplink transmission.

Figure 10:
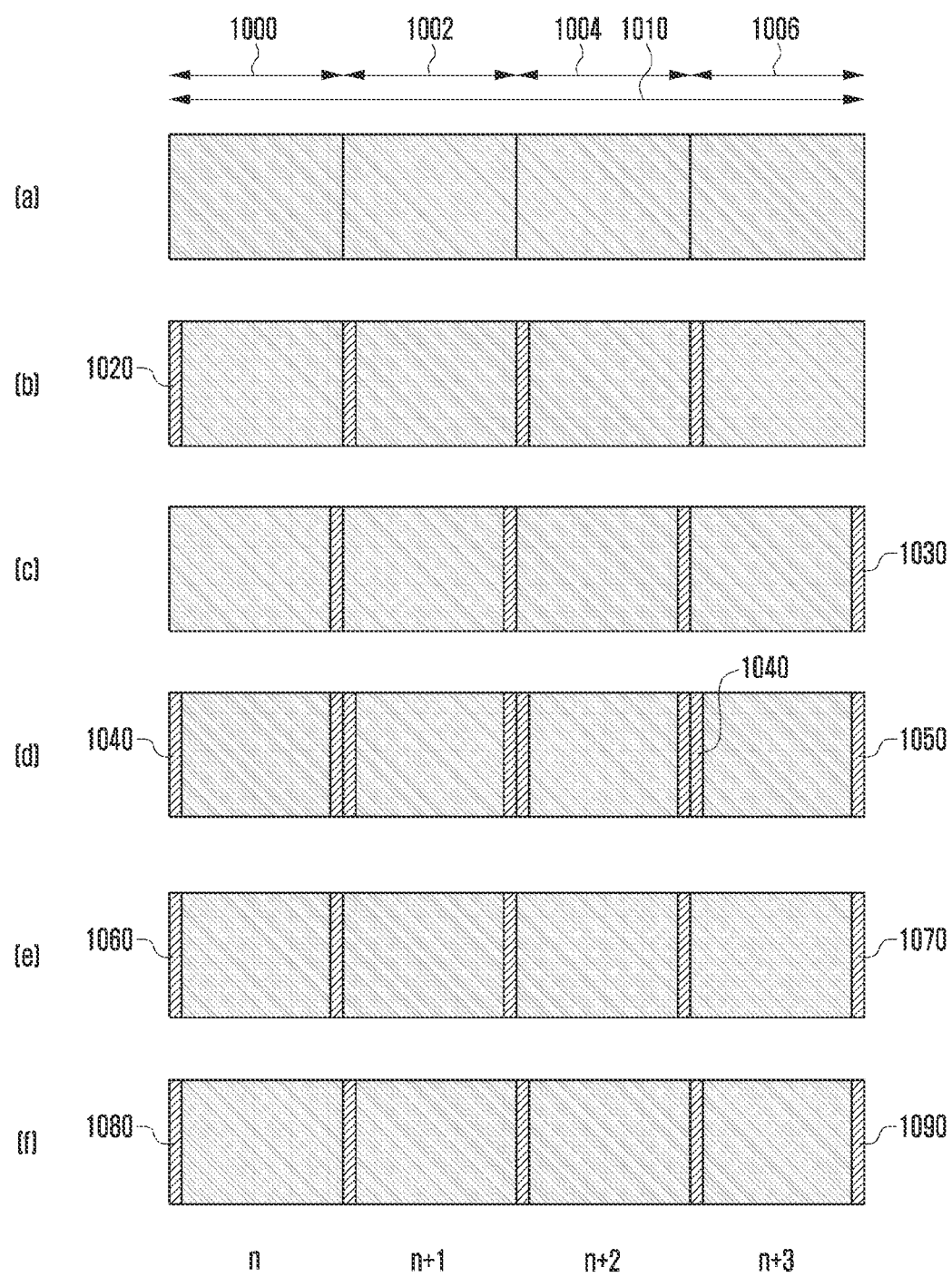
FIG. 10 is a diagram illustrating the uplink signal transmission interval at the time of the transmission configuration of the plurality of uplink subframes.

FIG. 10 is a diagram illustrating an uplink signal transmission interval at the time of configuring transmission of a plurality of uplink subframes.

Referring to FIG. 10, for example, Method E-1 will be described in more detail as follows.

For example, information (e.g., one of (a), (b), (c), and (d) of FIG. 9) on a start symbol and an end symbol in which an actual uplink signal is transmitted within an uplink subframe included in the uplink transmission configuration information may be applied to each of the uplink subframes configured through the uplink transmission configuration information, for example, respective subframes 1000, 1002, 1004, and 1006 of FIG. 10.

For example, when the uplink transmission configuration information is a configuration for uplink transmission for one or more subframes in a terminal in which the information on the start symbol and the end symbol in which the actual uplink signal is transmitted within the uplink subframe included in the uplink transmission configuration information is configured as illustrated in (b) of FIG. 9, the terminal may perform the configured uplink signal transmission from a second symbol in each of the configured uplink transmission subframes as illustrated in (b) of FIG. 10.

As another example, when the uplink transmission configuration information is a configuration for uplink transmission for one or more subframes in a terminal in which the information on the start symbol and the end symbol in which the actual uplink signal is transmitted within the uplink subframe included in the uplink transmission configuration information is configured as illustrated in (d) of FIG. 9 (uplink signal transmission immediately up to the last symbol from the second symbol), the terminal may perform the configured uplink signal transmission just up to a last symbol from the second symbol in each of the configured uplink transmission subframes as illustrated in (d) of FIG. 10. In this case, the terminal is assumed, in which the information on the start symbol and the end symbol in which the actual uplink signal is transmitted in the uplink subframe included in the uplink transmission configuration information is configured as illustrated in (d) of FIG. 9 (uplink signal transmission from the second symbol immediately up to the last symbol in the subframe). Among the one or more configured uplink transmission subframes, in the remaining subframes except for the first and last subframes capable of transmitting an uplink signal, only one previously defined symbol may be excluded from the uplink transmission as illustrated in (e) or (f) of FIG. 10.

Figure 11:
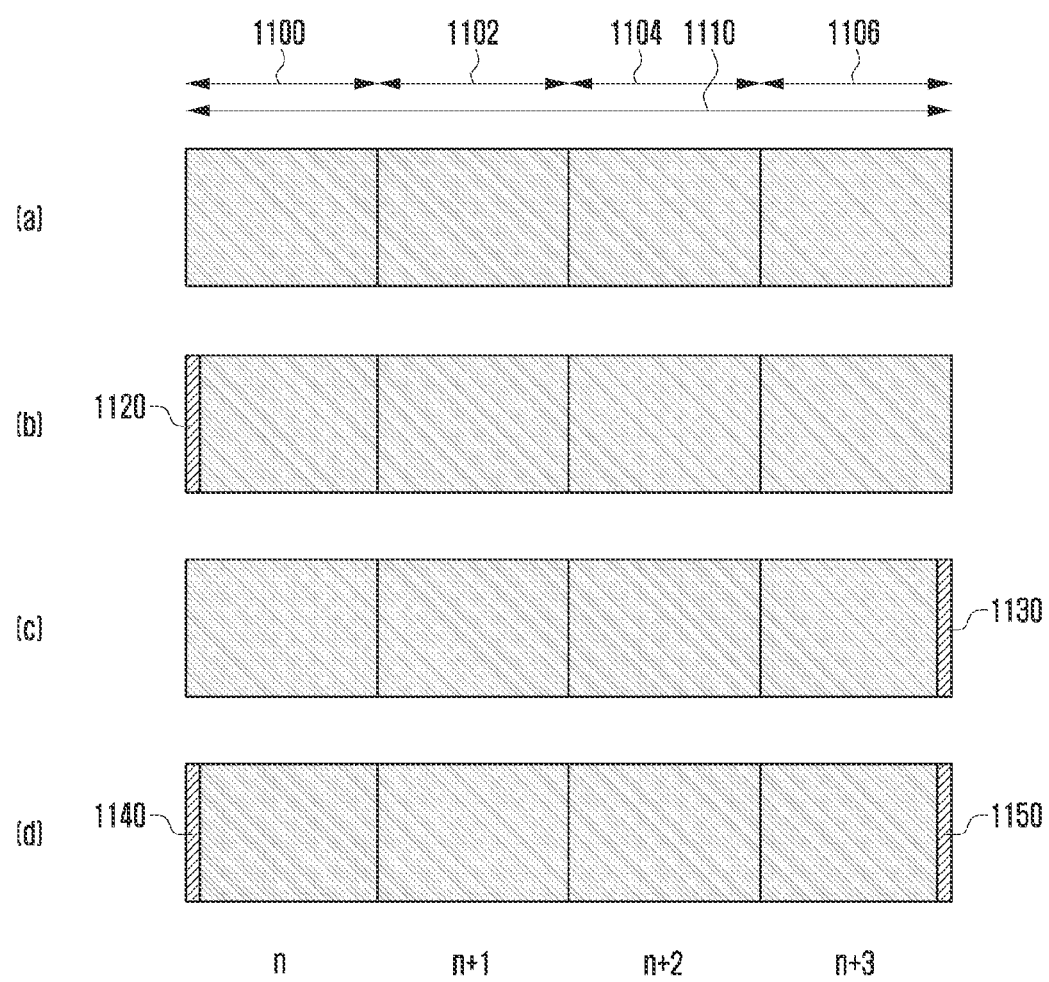
FIG. 11 is a diagram illustrating another uplink signal transmission interval at the time of a transmission configuration of the plurality of uplink subframes.

FIG. 11 is another diagram illustrating the uplink signal transmission interval at the time of configuring transmission of the plurality of uplink subframes.

Referring to FIG. 11, for example, Method E-2 will be described in more detail as follows. In FIG. 11, a plurality of subframes is interpreted as one uplink transmission interval. Therefore, instead of applying positional information to each of the subframes, information on an uplink transmission start position may be applied to the first subframe among the plurality of subframes and information on an uplink transmission end position may be applied to the last subframe.

For example, uplink subframes (1110 of FIG. 11) in which the information (e.g., one of (a), (b), (c), and (d) of FIG. 9) on the start symbol and the end symbol in which the actual uplink signal is transmitted within the uplink subframe included in the uplink transmission configuration information is configured through the uplink transmission configuration information may be determined as one uplink transmission unit and configurations for the start symbol and the end symbol in which the uplink signal is transmitted may be applied to the uplink subframes.

For example, when the uplink transmission configuration information is the configuration for uplink transmission for one or more subframes in the terminal in which the information on the start symbol and the end symbol in which the actual uplink signal is transmitted within the uplink subframe included in the uplink transmission configuration information is configured as illustrated in (b) of FIG. 9 (uplink signal transmission from the second symbol up to the last symbol in the subframe), the terminal determines the configured uplink signal transmission subframes as one uplink transmission unit as illustrated in (b) of FIG. 11. The terminal applies the above configuration only in the first subframe in which the uplink transmission is possible among the uplink transmission units to transmit the uplink signal from the second symbol up to the last symbol in the subframe and transmit the uplink signal by using all symbols in the remaining configured uplink transmission subframes.

As another example, when the uplink transmission configuration information is the configuration for uplink transmission for one or more subframes in the terminal in which the information on the start symbol and the end symbol in which the actual uplink signal is transmitted within the uplink subframe included in the uplink transmission configuration information is configured as illustrated in (d) of FIG. 9 (uplink signal transmission from the second symbol up to the last symbol in the subframe), the terminal determines the configured uplink signal transmission subframes as one uplink transmission unit as illustrated in (d) of FIG. 11. The terminal may transmit the uplink signal from the second symbol up to the last symbol in the first subframe 1100 in which the uplink signal may be transmitted within the configured uplink transmission unit and transmit the uplink signal in the last subframe 1106 of the configured uplink transmission unit. In this case, in the remaining subframes 1102 and 1104 except for the first subframe 1100 in which the uplink signal may be transmitted and the last subframe 1106 of the uplink transmission unit among the uplink transmission units 1110, the uplink signal may be transmitted using all of the symbols.

In this case, the base station may perform the configuration for the start symbol or the end symbol of the uplink signal transmission in at least one subframe of the subframes 1102 and 1104 in which the information on the start symbol and the end symbol in which the uplink signal is transmitted is not configured among actual uplink transmission subframes configured through the uplink transmission configuration with respect to the terminal. When one example is described with reference to (d) of FIG. 11, the base station may be configured to use all symbols of the subframes 1102 and 1104 for the uplink transmission. In other words, in the remaining subframes 1102 and 1104 except for the first subframe 1100 in which the uplink signal may be transmitted and the last subframe 1106 of the uplink transmission unit among the uplink transmission units 1110 configured as above, the uplink signal may be transmitted using all of the symbols.

When another example is described with reference to (d) of FIG. 11, the base station may be configured to perform the configured uplink signal transmission except for at least symbol (e.g., the first symbol or the last symbol) in each of the subframes 1102 and 1104.

In this case, the base station may configure to the terminal the transmission of the uplink signal including the configuration information for the start symbol or the end symbol of the uplink signal transmission in at least one subframe of the subframes 1102 and 1104 in which the information on the start symbol and the end symbol in which the uplink signal is transmitted is not configured among actual uplink transmission subframes in the uplink transmission configuration transmitted to the terminal. In this case, the base station may configure the transmission so as to perform the uplink signal transmission except for at least one symbol in a subframe which is previously defined or configured as a higher layer signaling among the subframes 1102 and 1104.

In this case, the configuration for the start symbol or the end symbol of the uplink signal transmission in at least one subframe of the subframes 1102 and 1104 in which the information on the start symbol and the end symbol in which the uplink signal is transmitted is not configured among the uplink transmission subframes as described above may be changed according to a result of a channel sensing operation in the configured uplink transmission subframes.

Figure 12:
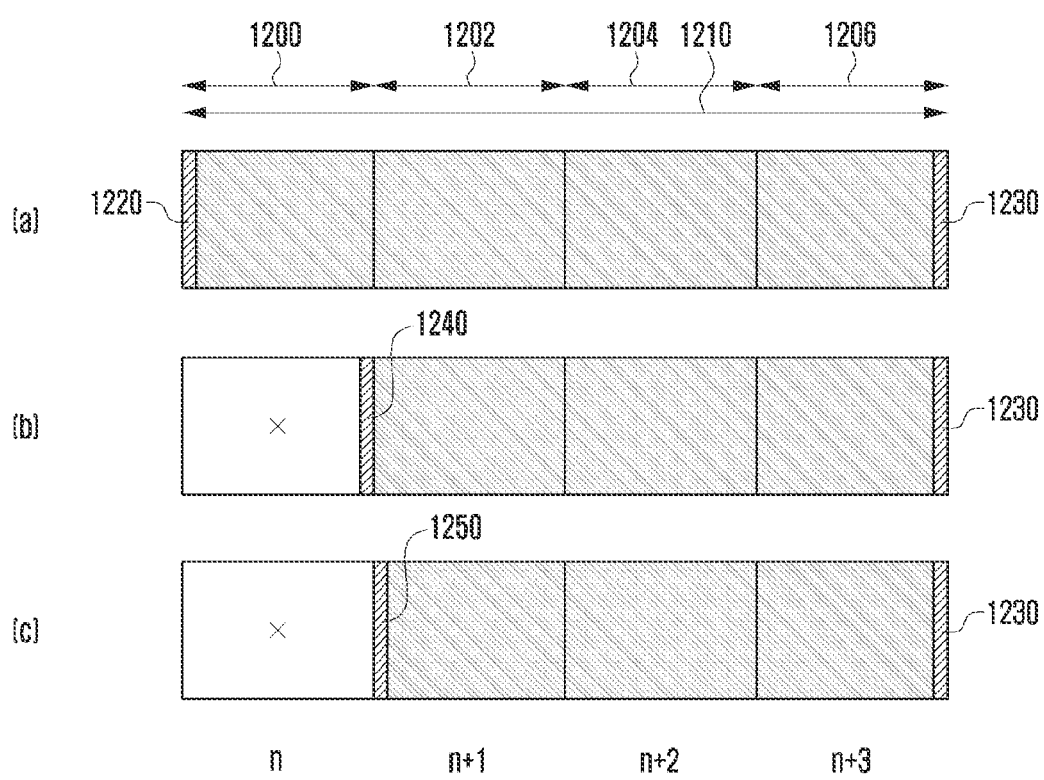
FIG. 12 is a diagram illustrating another uplink signal transmission interval at the time of the transmission configuration of the plurality of uplink subframes.

FIG. 12 is yet another diagram illustrating the uplink signal transmission interval at the time of configuring transmission of the plurality of uplink subframes.

FIG. 12 will be described in more detail with an example as follows. In FIG. 12, a plurality of subframes is interpreted as one uplink transmission interval. Therefore, instead of applying positional information to each of the subframes, information on an uplink transmission start position may be applied to the first subframe among the plurality of subframes and information on an uplink transmission end position may be applied to the last subframe. In FIG. 12, a start point of the first subframe, a specific position of the first subframe, or the start point of the second subframe may be indicated as a start position for the uplink transmission. Further, a last boundary of the last subframe or a symbol just before the last boundary may be adopted as an uplink transmission end position.

The information on the start symbol and the end symbol in which the actual uplink signal is transmitted in the uplink subframe is configured in the uplink transmission configuration information which the base station transmits to the terminal station as illustrated in (d) of FIG. 9 (uplink signal transmission from the second symbol to the last symbol in the subframe) and the configured uplink transmission subframes are determined as one uplink transmission unit as illustrated in (d) of FIG. 11 through the configured information. The uplink signal is configured to be transmitted from the second symbol up to the last symbol in the first subframe 1200 in which the uplink signal may be transmitted within the configured uplink transmission unit and the uplink signal is configured to be transmitted from the first symbol immediately up to the last symbol in the last subframe 1206 of the configured uplink transmission unit, and the uplink signal is configured to be transmitted by using all symbols in the remaining subframes 1202 and 1204. A terminal that may not transmit the uplink signal by occupying the channel in the uplink subframe 1200 after the channel sensing operation may perform the channel sensing operation for the uplink subframe 1202.

In this case, for the information on the start symbol and the end symbol in which the uplink signal in the uplink subframe 1202 is transmitted, the uplink signal may be transmitted according to an initial uplink transmission symbol configuration for a subframe that intends to perform the uplink signal transmission as illustrated in (a) of FIG. 12. That is, in the case of the subframe 1202 in (a) of FIG. 12, since the uplink signal is configured to be transmitted by using all symbols, the terminal performs the channel sensing operation before the start of the subframe 1202 and when the terminal determines that the uplink signal may be transmitted through the channel, the terminal may transmit the uplink signal to the subframe according to the initially configured uplink transmission symbol configuration.

As another method, for the information on the start symbol and the end symbol in which the uplink signal in the uplink subframe 1202 is transmitted, the uplink signal may be transmitted according to the initial uplink transmission symbol configuration configured for the first subframe in an interval 1210 in which the uplink signal transmission is configured as illustrated in (b) of FIG. 12. That is, in the case of the first subframe 1200 of the uplink transmission interval 1210 in (a) of FIG. 12, since the uplink signal is configured to be transmitted by using the last symbol from the second symbol, the terminal performs the channel sensing operation before the start of the second symbol and when the terminal determines that the uplink signal may be transmitted through the channel, the terminal may transmit the uplink signal in the first subframe of the set uplink transmission symbol configuration by using the second symbol to the last symbol according to the initially set uplink transmission symbol configuration.

In this case, the information on the start symbol and the end symbol in which the uplink signal in the uplink subframe 1202 is transmitted may be previously defined to consecutively transmit the uplink signal by using the second symbol to the last symbol of the subframe. In this case, in the case of the first subframe 1206 of the uplink transmission configuration interval 1210, the uplink signal may be transmitted by using the second symbol to the last symbol of the subframe according to the configuration information for the start symbol and the end symbol in which the uplink signal is transmitted or the uplink signal may be transmitted by using the symbols immediately before the last symbol from the second symbol of the subframe.

In FIG. 12, the base station configures the MS to perform the uplink signal transmission from a first symbol start boundary of the first subframe among the plurality of subframes configured as the uplink transmission subframe, to perform the uplink signal transmission configured from a second symbol start boundary of the first subframe, to perform the uplink signal transmission configured after a predetermined time x (for example, x=25 microseconds) at the first symbol start symbol boundary of the first subframe, or to perform the uplink signal transmission configured at a predetermined time x at the first symbol start boundary of the first subframe and after a timing advanced (TA) time (x+TA time) set by the base station and estimated by the terminal. When the start time is divided as described above, an uplink transmission start time may be indicated by using 2-bit information and set in the terminal. For example, 00 may indicate the start position of the first symbol, 01 may indicate x after the start boundary of the first symbol, 10 may indicate x+TA after the start boundary of the first symbol, 11 may indicate the start boundary of the second symbol as the uplink signal transmission time in the order of the time.

The base station instructs the terminal to terminate the uplink signal transmission at the last boundary of the last subframe among the plurality of subframes configured as the uplink transmission subframe or to terminate the uplink signal transmission at the last symbol start boundary of the last subframe. In this case, a position of a point whether the uplink transmission ends may be indicated by using the 2-bit information.

The terminal performs the channel sensing operation in the unlicensed spectrum or the LAA cell in which the uplink transmission is configured prior to the uplink transmission configured by the base station, and may perform or may not perform the configured uplink transmission according to the result of the performed channel sensing operation. At this point, the terminal may receive the channel sensing operation method prior to performing the configured uplink transmission. At this point, the base station may not transmit the downlink control signal or the data signal in the period in which the corresponding channel sensing operation is performed in order to correctly perform the channel sensing operation for the uplink transmission of the terminal. In order to secure the period, the base station can set the number of symbols to which the actual uplink information is transmitted in the subframe n in which the uplink transmission is configured in the terminal.

For example, the base station may be configured to allow the terminal to perform the uplink transmission using all of the first symbol to the last symbol in the uplink transmission subframe n, perform the uplink transmission using the second symbol to the last symbol in the uplink transmission subframe n using the second symbol, perform the uplink transmission using the first symbol to a symbol before the last symbol in the uplink transmission subframe n, or perform the uplink transmission using the second symbol to the symbol before the last symbol in the uplink transmission subframe n.

The base station may transmit the configured information to the terminal by including the configured information in the uplink transmission configuration control information or the scheduling information (UL grant) transmitted through the downlink control channel. In addition, the base station may set the actual transmission start time in the subframe n in which the uplink transmission is configured, including the configuration information in the uplink transmission configuration control information or the scheduling information (UL grant) transmitted to the terminal by the base station through the downlink control channel.

The base station may be configured to allow the terminal to perform the uplink signal transmission from the first symbol start boundary in the uplink transmission subframe n, perform the uplink signal transmission from the second symbol start boundary in the uplink transmission subframe n, perform the configured uplink signal transmission after a predetermined time x (for example, x=25 microseconds) at the first symbol start boundary in the uplink transmission subframe n, or perform the uplink signal transmission configured from a predetermined time x and configured from (x+TA time) after timing advanced (TA) time set by the base station and estimated by the terminal at the first symbol start boundary in the uplink transmission subframe n. When the start time is divided as described above, the uplink transmission start time may be indicated by using 2-bit information and set in the terminal. For example, 00 may indicate the start position of the first symbol, 01 may indicate x after the start boundary of the first symbol, 10 may indicate x+TA after the start boundary of the first symbol, 11 may indicate the start boundary of the second symbol as the uplink signal transmission time in the order of the time.

The base station selects one of the time that may be set as the uplink transmission start time and makes information on the time be included in uplink transmission configuration control information or scheduling information (UL grant) which the base station transmits to the terminal through a downlink control channel to set an actual uplink transmission start time in subframe n in which the uplink transmission is configured.

If the uplink configuration information received from the base station is configured to perform the uplink transmission in a plurality of uplink subframes in the terminal in which one uplink configuration information is configured to perform the uplink transmission in the plurality of uplink subframes, the terminal receiving it may determine, as follows, the position and number (or the start symbol position and the ending start position where the uplink transmission is performed in the uplink subframe) of symbols in which the uplink transmission is performed for each of the plurality of uplink subframes and the uplink transmission start time. At this point, the case in which at least one information of the position and number of the symbols in which the uplink transmission is performed and the uplink transmission start time are included in the uplink transmission configuration control information (or UL grant or PDCCH) configured to perform the uplink transmission in the plurality of uplink subframes and is configured in the terminal will be described.

As described above, the position of symbol in which the uplink transmission is performed in the plurality of uplink subframe may be determined as follows.

The terminal may perform the uplink transmission by applying the position of symbol in which the uplink transmission included in the uplink transmission configuration control information is performed to a start subframe and a last subframe of a plurality of set uplink subframes. For example, the terminal may be configured to perform the uplink transmission in the plurality of uplink subframes through the uplink transmission configuration control information from the base station and configured to perform the uplink transmission by using the symbols immediately before the last symbol from the second symbol in addition to the control information. In this case, the first subframe among the plurality of configured uplink transmission subframes may perform the uplink transmission using the second symbol to the last symbol, the last subframe among the plurality of configured uplink transmission subframes may perform the uplink transmission configured by using the symbols immediately before the last symbol from the first symbol, and the remaining subframes may perform the uplink transmission configured by using the first symbol to the last symbol.

As another example, the terminal may perform the uplink transmission by applying the position of symbol in which the uplink transmission included in the uplink transmission configuration control information is performed to each subframe of a plurality of set uplink subframes. For example, the terminal may be configured to perform the uplink transmission in the plurality of uplink subframes through the uplink transmission configuration control information from the base station and configured to perform the uplink transmission by using the second symbol to the last symbol in addition to the control information. In this case, the configured uplink transmission may be performed by using the second symbol to the last symbol in each uplink transmission subframe.

As another example, the terminal may perform the uplink transmission by applying the position of symbol in which the uplink transmission included in the uplink transmission configuration control information is performed to at least one of the first subframe and the last subframe among the plurality of set uplink subframes and a specific subframe. At this point, the specific subframe may be set or previously defined using the higher layer signaling from the base station. For example, an intermediate subframe among the plurality of set transmission subframes may be a specific subframe. If the number of set transmission subframes is odd, the specific subframe may be determined using ascending, descending (or ceiling, floor), or the like. For example, the terminal may be configured to perform the uplink transmission in four uplink subframes through the uplink transmission configuration control information from the base station and configured to perform the uplink transmission by using the second symbol to the last symbol in addition to the control information. In this case, the configured uplink transmission may be performed by using the second symbol to the last symbol in the first and third subframes among the uplink transmission subframes and the configured uplink transmission may be performed by using the first symbol and the last symbol in the remaining subframes.

At this point, as described above, the start time when the uplink transmission is performed in the plurality of uplink subframe may be determined as follows.

The terminal may apply the time when the uplink transmission included in the uplink transmission configuration control information starts to the time when the continuous uplink transmission among the plurality of uplink subframes starts. For example, the terminal may be configured to perform the uplink transmission in the plurality of (e.g., four subframes) uplink subframes through the uplink transmission configuration control information from the base station and configured so that the uplink transmission starts from 25 us after the start point of the first symbol in addition to the control information. In addition, the uplink transmission may be configured using the second symbol to the last symbol of the first and third subframes of the configured four subframes through a method for deciding the number of symbols in which the uplink transmission is performed. In this case, in other words, when the channel sensing operation is required between the second subframe and the third subframe during transmission in the four uplink subframes, the uplink transmission start time of the third subframe is set to start the uplink transmission from 25 us after the first symbol start time set through the uplink transmission configuration control information, thereby performing the uplink transmission. In this case, the uplink transmission start time may be transmitted to the terminal by using at least one of the uplink control information which the base station transmits for each terminal or common control information which the base station transmits to a plurality of terminals.

As another example, the terminal applies the uplink transmission start time included in the uplink transmission configuration control information to the first continuous uplink transmission start time among the plurality of uplink subframes among the plurality of set uplink subframes, and the start point of other continuous uplink transmissions other than the first continuous uplink transmission among the plurality of set uplink subframes may perform the uplink transmission according to the start time set by the higher layer signaling or the start time (for example, start the uplink transmission after 25 µs at the first symbol start point) previously defined by the base station and the terminal.

For example, the terminal may be configured to perform the uplink transmission in the plurality of (e.g., four subframes) uplink subframes through the uplink transmission configuration control information from the base station and configured so that the uplink transmission starts from 25 us after the start point of the first symbol in addition to the control information. In addition, the uplink transmission may be configured using the second symbol to the last symbol of the first and third subframes of the configured four subframes through the method for deciding the number of symbols in which the uplink transmission is performed. In this case, in other words, when the channel sensing operation is required between the second subframe and the third subframe during transmission in the four uplink subframes, the uplink transmission start time of the third subframe is set to an uplink transmission start time set through the higher layer signaling from the base station or set to start the uplink transmission at a previously defined start point, for example, from 25 us after the first symbol start time set through the uplink transmission configuration control information, thereby performing the uplink transmission.

In this case, at least one of a position (or the position of the start symbol and the end symbol of the uplink transmission) of the symbol for which the uplink transmission is performed and the uplink transmission start time set based on the plurality of configured uplink subframes may be set differently depending on the result of the channel sensing operation performed before the configured uplink transmission.

For example, it is assumed that in a terminal that is configured to perform the uplink transmissions in four consecutive uplink subframes from the base station, by using at least one of method for the examples, the uplink transmission start symbols in the first and third subframes among the four consecutive uplink subframes are configured as the second symbol, the uplink transmission end symbols in the corresponding subframes are configured as the last symbol, and the uplink transmission is configured to be performed by using all symbols of the subframes in the remaining subframes (second and fourth subframes). In this case, when the terminal determines that the corresponding channel is not in an idle state in the channel sensing operation performed before the first subframe in which the uplink transmission is configured, but then determines that the corresponding channel is in the idle state in the channel sensing operation performed before the second subframe, the terminal may apply the uplink transmission start symbol in the second subframe based on the plurality of configured uplink subframes. That is, regardless of the result of the channel sensing operation, the uplink transmission is performed based on the plurality of configured uplink subframes.

As another method, in the above example, the uplink transmission symbol and the transmission start time of the first subframe in the consecutively configured uplink transmission interval may be used. That is, in the above example, the terminal determining that the corresponding channel is not idle before the first subframe determines that the uplink transmission start symbol and the start time of the second subframe are the same as the setting for the first subframe, in other words, in the case of the above example, it is assumed that the uplink transmission is performed using the second symbol to the last symbol according to the uplink transmission configuration of the first subframe in the second subframe and the channel sensing operation and the uplink transmission may be performed.

Figure 13:
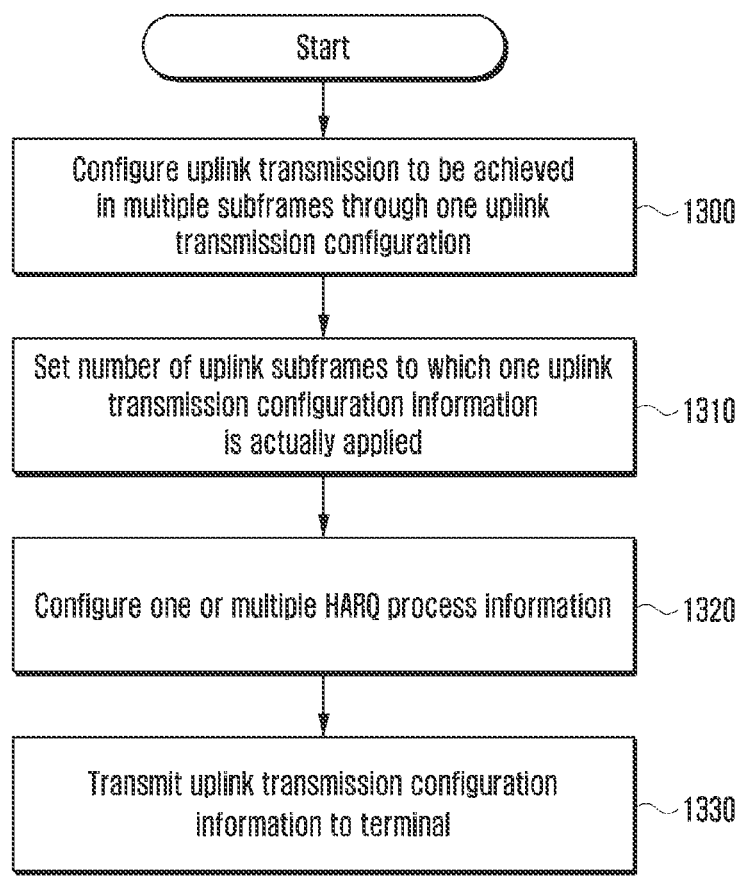
FIG. 13 is a flowchart illustrating a method for configuring a plurality of uplink subframe transmissions of a base station.

A method for the uplink transmission configuration of the base station according to the embodiment of the present disclosure will be described with reference to FIG. 13.

In operation 1300, the base station is configured to perform the uplink transmission to the terminal in a plurality of uplink subframes through one uplink transmission configuration. The uplink transmission configuration is one configuration, but may be a configuration for the uplink transmission in the plurality of subframes.

In operation 1310, the base station sets the number of uplink subframes to which one uplink transmission configuration is actually applied to the UE. At this point, the information is configured in the terminal by adding a new field to the uplink transmission configuration information or the already present field is interpreted again like the redundancy version (RV) field or the DAI field in the UL transmission configuration information, such that the number of uplink subframes to which the one uplink transmission configuration is actually applied may be configured in the terminal. When the number of subframes is plural, the number of subframes may be 2, 3, or 4. For example, when the maximum number of subframes applicable to the terminal through higher signaling is set to be 2, the field included in one uplink configuration information may be 1 bit. When the maximum number of subframes applicable to the terminal through the higher signaling is set to be a value (e.g., 3 or 4) other than 2, the field included in the uplink configuration information may be 2 bits.

Meanwhile the number of multiple subframes is not limited thereto. On the other hand, the maximum number of subframes set by one configuration may be predetermined and may be informed to the terminal in advance using the higher signaling (for example, RRC message). The field indicating the number of subframes may be 1-bit or 2-bit information.

In operation 1320, when the terminal transmits the uplink signal in the plurality of uplink subframes through one uplink transmission configuration, the base station may decide/configure information to be applied in the uplink transmission. For example, the base station may decide information on an HARQ process, TPC configurations for the plurality of subframes, CSI transmission configurations for the plurality of subframes, and a configuration for a time or a symbol used for PUSCH transmission.

The base station may decide the TPC to be applied when the terminal performs the uplink transmission. Deciding the TPC may be interpreted as deciding the TPC value. The base station may decide the TPC information which the terminal is to apply to the plurality of subframes. When the UE confirms the TPC information, the TPC information may be identically applied to each of the plurality of subframes and the TPC information may be accumulated and applied to the plurality of subframes. For example, when n uplink subframes are scheduled through one uplink configuration information, the terminal may decide to apply the same transmission power to n subframes.

The base station may instruct the terminal to report the CSI through the uplink configuration information. When CSI reporting is configured, the terminal may report the CSI to the base station. The terminal may report the CSI in the subframe in which the uplink transmission is possible among n subframes. The terminal may report the CSI in the last subframe among n subframes. Further, the terminal may report the CSI in another subframe other than the first subframe among n subframes.

The base station may make information on a position for the terminal to transmit the PUSCH among the plurality of subframes be included in the uplink configuration information. The information on the position may include at least one of information on a position to start PUSCH transmission and information on a position to end the PUSCH transmission. The information on the position to start the PUSCH transmission may be 4 bits. The information on the start position may indicate the first symbol or the second symbol of the first subframe among the plurality of subframes or a specific position of the first symbol. The information on the position to end the PUSCH transmission may be 1 bit. The information on the end position may indicate the last symbol of the last subframe among the plurality of subframes or a symbol before the last symbol.

When the terminal transmits the uplink signal in a plurality of uplink subframes through one uplink transmission configuration, the base station may allow the terminal to set whether the terminal repeatedly transmits the transmission for one HARQ process using at least one of methods C-1, C-2, C-3, C-4, and C-5 in the uplink subframe in which the uplink transmission is valid or whether the terminal transmits the transmission for the plurality of HARQ processes using at least one of the methods D-1, D-2, and D-3 in the valid uplink subframe.

In operation 1330, the configuration information for the uplink transmission may be transmitted to the terminal through the downlink control channel including the information configured in the operations 1310 and/or 1320. That is, the base station may transmit the control information including the configuration information on the uplink transmission to the terminal. The control information may be the DCI and the format of the DCI may be DCI format 0, DCI format 4, or a newly defined DCI format.

The base station may then receive the uplink channel, information, and signals transmitted by the terminal based on the uplink transmission configuration information.

Figure 14:
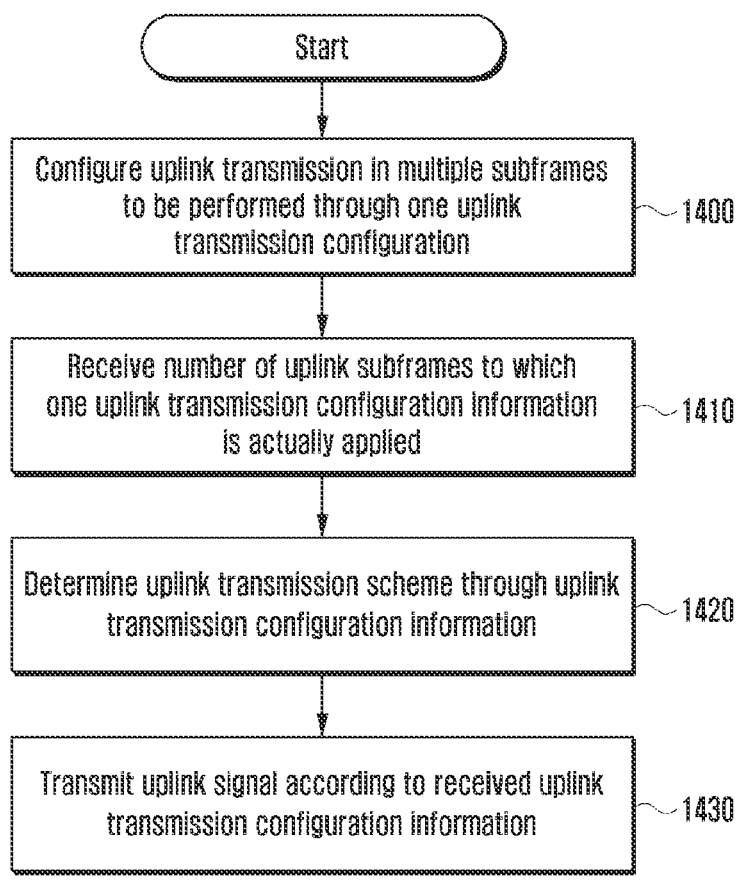
FIG. 14 is a flowchart illustrating a method for performing an uplink transmission in a plurality of uplink subframes of a terminal.

The method for configuring the uplink transmission resources by the terminal according to the embodiment of the present disclosure will be described below with reference to FIG. 14.

In operation 1400, the terminal may receive control information including the uplink transmission configuration information from the base station. The control information may be the DCI and the format of the DCI may be DCI format 0, DCI format 4, or a newly defined DCI format. The uplink transmission configuration is one configuration, but may be a configuration for the plurality of uplink subframes. That is, in the embodiment of the present disclosure, the uplink signal transmission is configured to be performed in the plurality of uplink subframes through one uplink transmission configuration. For example, when the number of multiple subframes may be 2, 3, or 4. Meanwhile the number of multiple subframes is not limited thereto. Meanwhile, before operation 1400, the base station may provide the information on the maximum number of subframes applicable to the terminal through one uplink transmission configuration to the terminal capable of using the plurality of subframes by using the higher signaling (for example, RRC message).

In operation 1410, the terminal confirms and/or sets the number of uplink subframes to which one uplink transmission configuration is actually applied. The terminal may confirm the number of subframes based on the received uplink configuration information. In this case, the information on the number of subframes is added as a new field to the UL transmission configuration information or existing fields such as a redundancy version field or a DAI field in the UL transmission configuration information is re-interpreted, and as a result, the terminal may determine the number of uplink subframes to which one uplink transmission configuration is actually applied. The field indicating the number of subframes may be 1-bit or 2-bit information. For example, when the maximum number of subframes applicable to the terminal is set to be 2 through higher signaling, the field included in one uplink configuration information may be 1 bit. When the maximum number of subframes applicable to the terminal through the higher signaling is set to be a value (e.g., 3 or 4) other than 2, the field included in the uplink configuration information may be 2 bits.

In operation 1420, the terminal may confirm information for transmitting the uplink for the plurality of subframes based on the uplink configuration information. For example, the terminal may determine information on an HARQ process, TPC configurations for the plurality of subframes, CSI transmission configurations for the plurality of subframes, and a configuration for a time or a symbol used for PUSCH transmission.

The terminal may confirm the TPC information from the uplink configuration information. When the terminal confirms the TPC information, the terminal may decide whether the TPC information is identically applied to each of the plurality of subframes or whether the TPC information is accumulated and applied to the plurality of subframes. When n uplink subframes are scheduled through one uplink configuration information, the terminal may decide to apply the same transmission power to n subframes. That is, when the plurality of subframes is scheduled through one uplink configuration information, the terminal may identically apply the TPC information included in the one uplink configuration information to the plurality of subframes. The terminal may transmit the uplink signals by applying the same transmission power to the plurality of subframes.

The terminal may be instructed to schedule the n uplink subframes through one uplink configuration information and to report the CSI. The terminal may report the CSI in the subframe in which the uplink transmission is possible among n subframes. The terminal may report the CSI in the last subframe among n subframes. Further, the terminal may report the CSI in another subframe other than the first subframe among n subframes.

The terminal may confirm information on the position for the terminal to transmit the PUSCH among the plurality of subframes from the uplink configuration information. The information on the position may include at least one of information on a position to start PUSCH transmission and information on a position to end the PUSCH transmission. The information on the position to start the PUSCH transmission may be 4 bits. The information on the start position may indicate the first symbol or the second symbol of the first subframe among the plurality of subframes or a specific position of the first symbol. The information on the position to end the PUSCH transmission may be 1 bit. The information on the end position may indicate the last symbol of the last subframe among the plurality of subframes or a symbol before the last symbol.

When the terminal transmits the uplink signal in the plurality of uplink subframes through the HARQ process field in the uplink transmission configuration information received from the base station, the terminal may determine whether transmission for one HARQ process is repeatedly transmitted in the uplink subframe in which the uplink transmission is valid by using at least one method for Methods C-1, C-2, C-3, C-4, and C-5. Further, it may be determined whether the plurality of HARQ processes is to be transmitted in each valid UL subframe using at least one of Methods D-1, D-2, and D-3.

In operation 1430, the uplink signal may be transmitted to the base station by using the configuration information of the uplink transmission received from the base station through the downlink control channel, including the information received in the operation. The terminal may transmit the uplink signal based on the number of subframes, the information on the HARQ process, the TPC configurations for the plurality of subframes, the CSI transmission configurations for the plurality of subframes, and the configuration for the time or symbol used for PUSCH transmission.

Figure 15:
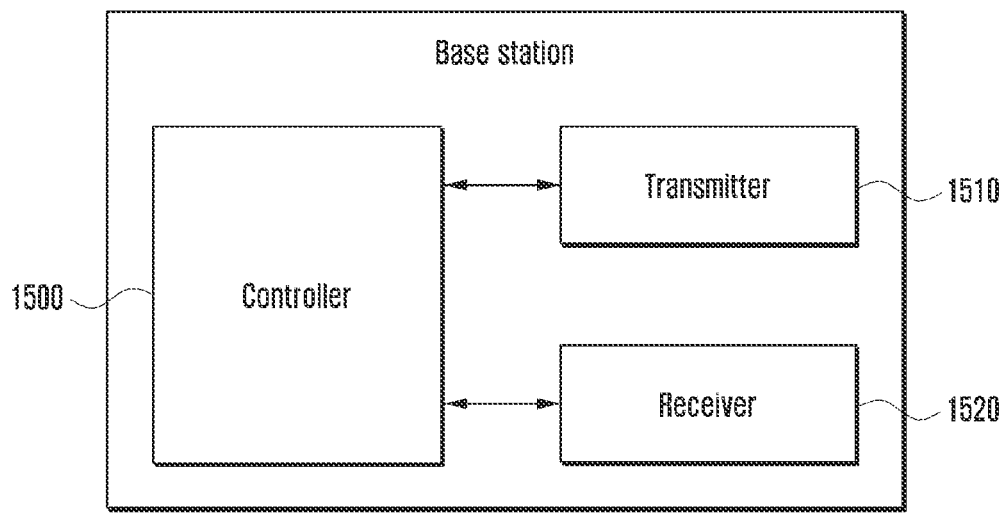
FIG. 15 is a diagram illustrating a base station apparatus according to embodiments of the present disclosure.

FIG. 15 is a block diagram of a base station for setting a contention window and a channel sensing period of a terminal in a base station using an unlicensed spectrum according to an embodiment of the present disclosure.

The base station may include a transmitter 1510 transmitting signals, a receiver 1520 for receiving signals, and a controller 1500 for controlling the overall operation of the base station. The transmitter 1510 and the receiver 1520 may be referred to collectively as the term transceiver. The controller 1500 may include at least one processor.

A receiver 1520 of the base station may perform an operation for sensing an unlicensed spectrum channel using a set value for a channel sensing operation configured through a controller 1500 of the base station, as well as a function of receiving a signal from the base station or the terminal, or measuring a channel from the base station or the terminal.

Further, the controller 1500 of the base station may determine a reception result of the signal received from the terminal through the receiver 1520 of the base station, set a contention window required for a channel sensing operation of the terminal according to the determination result, and set a channel sensing period value of the terminal by selecting a random variable within the set contention window. In addition, the controller 1500 of the base station transmits a control signal for configuring the uplink signal transmission of the terminal to a transmitter 1510 of the base station through the downlink control channel, including a channel sensing period value of the configured terminal, an uplink transmission resource region, an uplink transmission resource setting method, or the like.

Further, the controller 1500 of the base station may configure the uplink transmission configuration information so that the uplink transmission of the terminal may be applied to a plurality of uplink subframes through the uplink transmission configuration information of the terminal. Further, the controller 1500 of the base station may not only configure the uplink transmission configuration information so that uplink transmission of the terminal may be applied to a plurality of uplink subframes, but also configure so that the terminal repeatedly transmits one signal in the plurality of uplink subframes or transmit a plurality of signals.

The controller 1600 may transmit the control information including the uplink configuration information for the plurality of subframes of the terminal and transmit the uplink control information including the uplink configuration information for the uplink signal.

The information for the uplink transmission may include information indicating the number of multiple subframes. Further, the length of the information indicating the number of multiple subframes may be 1 bit or 2 bits.

The information for the uplink transmission may include information on the start position and the end position for physical uplink shared channel (PUSCH) transmission. The start position may indicate a position at which the PUSCH transmission starts in the first subframe of the plurality of subframes and the end position may indicate a position at which the PUSCH transmission ends in the last subframe of the plurality of subframes.

The information for the uplink transmission may include transmit power control (TPC) information. The same transmission power identified from the TPC information may be identically applied to each of the plurality of subframes.

The information for the uplink transmission may include information indicating a channel state information (CSI) measurement report. The CSI may be received in a subframe excluding the first subframe among the plurality of subframes.

The controller 1500 may control to transmit information on the maximum number of subframes that may be set from one uplink configuration through a radio resource control (RRC) message.

Meanwhile, the operations of the base station and the controller 1500 are not limited to the operations described with reference to FIG. 15 and the controller 1500 may perform the operations of the base station described with reference to FIGS. 1 to 14.

Figure 16:
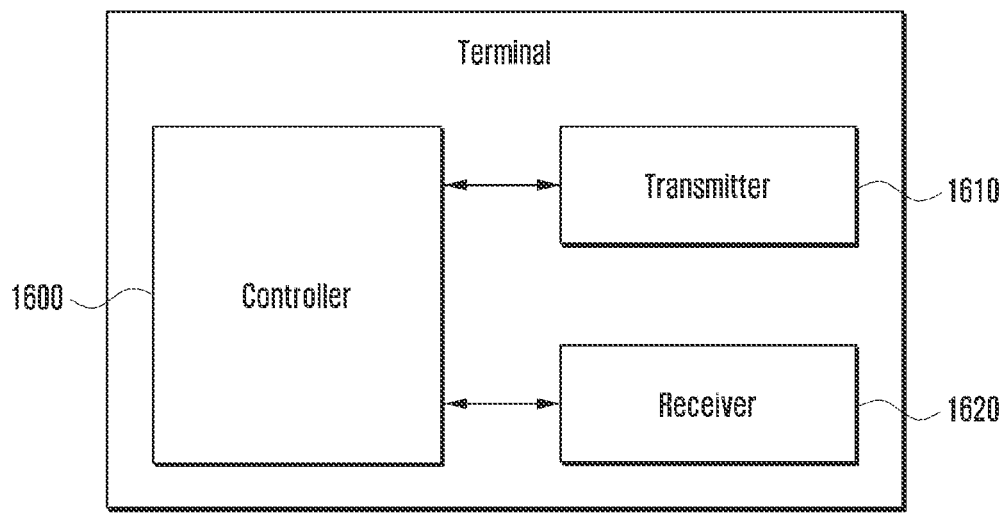
FIG. 16 is a diagram illustrating a terminal apparatus according to embodiments of the present disclosure.

FIG. 16 is a device diagram of the terminal using the unlicensed spectrum according to the embodiment of the present disclosure.

The terminal may include a transmitter 1610 transmitting signals, a receiver 1620 receiving signals, and a controller 1600 controlling the overall operation of the terminal. The transmitter 1610 and the receiver 1620 may be referred to collectively as the term transceiver. The controller 1600 may include at least one processor.

A controller 1600 of the terminal may configure a channel sensing operation so that the terminal performs the channel sensing operation during a channel sensing period required for uplink signal transmission in an unlicensed spectrum that is set by the base station using a receiver 1620. Further, the receiver 1620 may receive the uplink transmission information configured in the terminal by the base station through the downlink control channel. The controller 1600 may configure uplink transmission in time and frequency resources set according to uplink signal transmission configured by the base station and received through the receiver 1620. The receiver 1620 senses a channel for the channel during the set channel sensing period when the uplink transmission configuration by the controller 1600 is the transmission in the unlicensed spectrum, and when it is determined by the controller 1600 that the channel is in an idle state based on intensity of a signal received by the receiver during the set channel sensing period, a transmitter 1610 may configure uplink transmission in time and frequency resources set according to the uplink signal transmission configured by the base station. Further, the receiver 1620 receives the uplink transmission configuration from the base station and the controller 1600 may determine whether the uplink transmission configuration information received by the receiver 1620 is valid in the plurality of subframes through the uplink configuration information and may repeatedly transmit one signal in the plurality of subframes or transmit the plurality of signals in each subframe.

The controller 1600 may perform a control to receive the control information including uplink configuration information for the plurality of subframes from the base station, confirm the information for the uplink transmission from the uplink configuration information, and transmit the uplink signal based on the information for the uplink transmission. Before receiving the control information, the terminal may receive the information on whether the plurality of subframes for the uplink transmission are set through one uplink configuration information through the higher signaling and/or the maximum number of subframes for the uplink transmission.

At this time, the control information may include the information indicating the number of the plurality of subframes. The length of the information indicating the number of subframes may be 1 bit or 2 bits.

Further, the controller 1600 may confirm the information on the start position and the end position for the PUSCH transmission from the information for the uplink transmission. The start position may indicate a position at which the PUSCH transmission starts in the first subframe of the plurality of subframes and the end position may indicate a position at which the PUSCH transmission ends in the last subframe of the plurality of subframes.

The controller 1600 may confirm the TPC information from the information for the uplink transmission. The controller 1600 may control to identically apply the same transmission power identified from the TPC information to each of the plurality of subframes.

The controller 1600 may confirm the information on the CSI measurement report from the information for the uplink transmission. The controller 1600 may control the CSI to be transmitted in a subframe excluding the first subframe among the plurality of subframes.

Meanwhile, the operations of the terminal and the controller 1600 are not limited to the operations described with reference to FIG. 16 and the controller 1600 may perform the operations of the terminal described with reference to FIGS. 1 to 14.

Embodiment 2

The second embodiment of the present disclosure relates to a transceiving method and a transceiving apparatus for reducing a transmission time interval in a wireless cellular communication system.

The embodiment of the present disclosure relates to a method and an apparatus for controlling power transmitted in an unlicensed spectrum in a mobile communication system operating in the unlicensed spectrum, and more particularly, to a method and an apparatus for setting, by a transmission node, transmission power for each frequency spectrum according to a channel bandwidth occupied in the unlicensed spectrum and transferring the set power value to a reception node and a method for receiving, by the reception node, the transferred power value. The embodiment of the present disclosure relates to a wireless communication system, and more particularly, to a method and a system of data transmission/reception for reducing a transmission time interval in an existing LTE or LTE-Advanced system in which physical channels are transmitted in units of subframes. The wireless communication system is not limited to providing initial voice-oriented services and is developed to a wideband wireless communication system that provides a high-quality packet data service like communication standards including, for example, High Speed Packet Access (HSPA), Long Term Evolution (LTE) or Evolved Universal Terrestrial Radio Access (E-UTRA), and LTE-Advanced (LTE-A) of 3GPP, High Rate Packet Data (HRPD) and Ultra Mobile Broadband (UMB) of 3GPP2, and IEEE 802.16e.

As a representative example of the wideband wireless communication system, an Orthogonal Frequency Division Multiplexing (OFDM) scheme is adopted in a downlink (DL) and a Single Carrier Frequency Division Multiplexing (SC-FDMA) scheme is adopted in an uplink in the LTE system. The uplink refers to a radio link in which a terminal (User Equipment (UE)) or a Mobile Station (MS) transmits data or control signals to a base station (eNode B or base station (BS)) and the downlink refers to a radio link in which the base station transmits data or control signals to the terminal. In the above multiple access scheme, in general, time and frequency resources to load and send data or control information are allocated and operated so as not to overlap with each other, that is, so as to establish orthogonality for each user to distinguish the data or control information of each user.

The LTE system employs a Hybrid Automatic Repeat reQuest (HARQ) scheme in which a physical layer retransmits corresponding data when a decoding failure occurs in initial transmission. In the HARQ scheme, when a receiver fails to correctly decode data, the receiver transmits information (Negative Acknowledgment (NACK)) indicating the decoding failure to a transmitter so that the transmitter may retransmit the corresponding data in the physical layer. The receiver combines the data retransmitted by the transmitter with data which is previously unsuccessfully decoded to enhance data reception performance. In addition, when the receiver correctly decodes the data, the receiver transmits information an acknowledgment (ACK) indicating successful decoding to the transmitter so that the transmitter may transmit new data.

Figure 17:
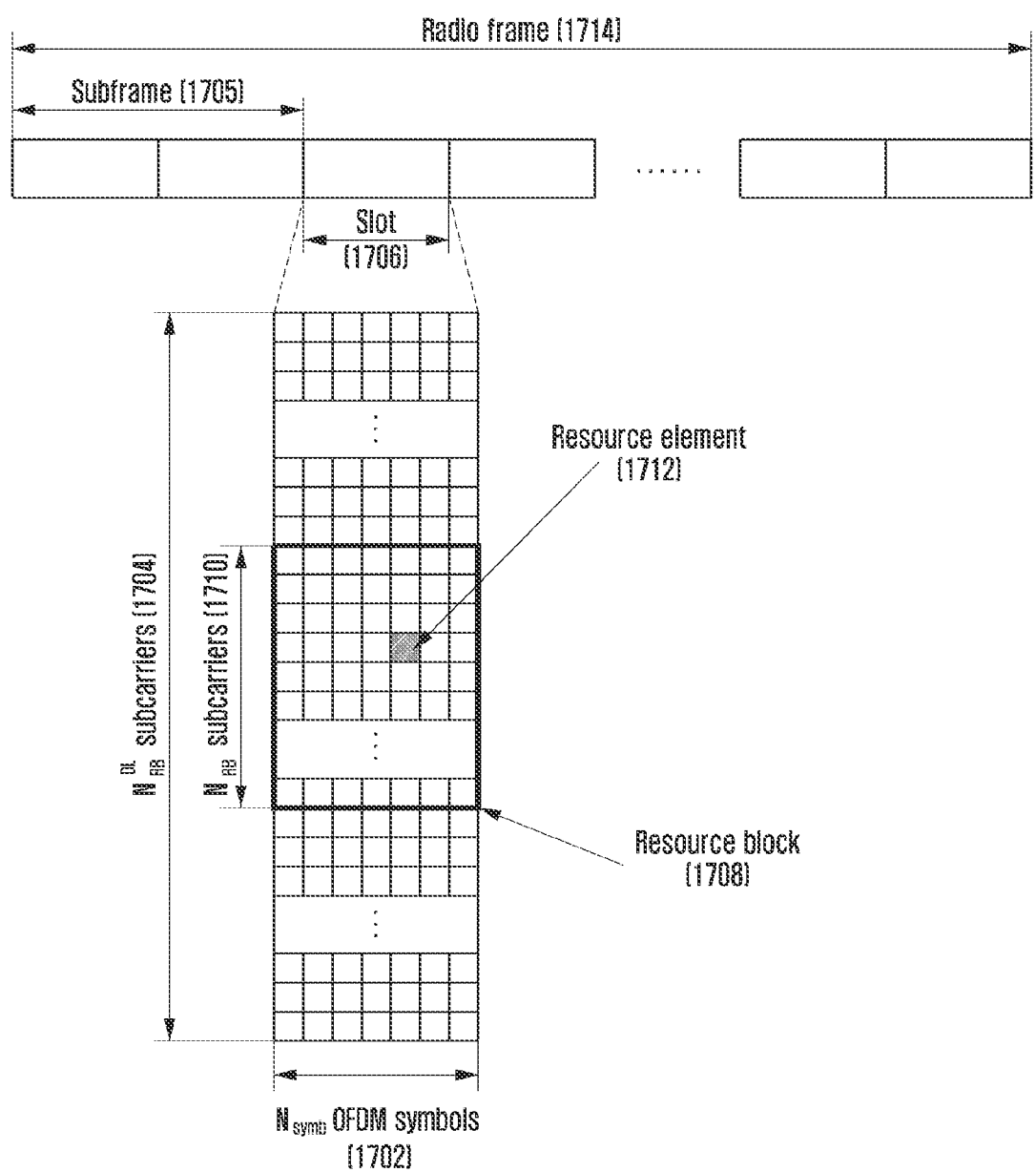
FIG. 17 is a diagram illustrating a transport structure of a downlink time-frequency domain of an LTE or an LTE-A system.

FIG. 17 is a diagram illustrating a basic structure of a time-frequency domain, which is a radio resource region in which the data or control channel is transmitted in the downlink in the LTE system.

In FIG. 17, a horizontal axis represents the time domain and a vertical axis represents a frequency domain. A minimum transmission unit in the time domain is an OFDM symbol, $N_{symb}$ (1702) OFDM symbols are gathered to constitute one slot 1706 and two slots are gathered to constitute one subframe 1705. The length of the slot is 0.5 ms and the length of the subframe is 1.0 ms. In addition, a radio frame 1714 is a time domain interval including 10 subframes. The minimum transmission unit in the frequency domain is a subcarrier and the bandwidth of a total system transmission bandwidth is constituted by a total of NBW (1704) subcarriers.

A basic unit of resources in the time-frequency domain is a resource element (RE) 1712 and may be represented by an OFDM symbol index and a sub-carrier index. A resource block (RB) 1708 (or physical resource block (PRB)) is defined by the $N_{symb}$ continued OFDM symbols 1302 in the time domain and $N_{RB}$ continued sub-carriers 1310 in the frequency domain. Therefore, one RB 1708 consists of $N_{symb} \times N_{RB}$ REs 1712. In general, a minimum transmission unit of the data is the RB unit. In the LTE system, generally, $N_{symb}=7$ and $N_{RB}=12$ and $N_{BW}$ and $N_{RB}$ are proportional to the system transmission bandwidth. A data rate is increased in proportion to the number of RBs scheduled for the terminal. The LTE system is operated by defining six transmission bandwidths. In an FDD system operated by dividing the downlink and the uplink based on a frequency, a downlink transmission bandwidth and an uplink transmission bandwidth may be different from each other. A channel bandwidth represents an RF bandwidth corresponding to the system transmission bandwidth. [Table 1] shows a correspondence relationship between the system transmission bandwidth and the channel bandwidth that are defined in the LTE system. For example, the LTE system having the channel bandwidth of 10 MHz is configured of a transmission bandwidth including 50 RBs.

TABLE I

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The downlink control information is transmitted within first N OFDM symbols within the subframe. In general, N={1, 2, 3}. Therefore, the N value varies in each subframe depending on the amount of control information to be transmitted at the current subframe. The control information may include a control channel transmission section indicator representing over how many OFDM symbols the control information is transmitted, scheduling information on downlink data or uplink data, HARQ ACK/NACK signals, or the like.

In the LTE system, the scheduling information on the downlink data or the uplink data is transmitted from a base station to a terminal through downlink control information (DCI). The DCI defines various formats, and thus applies and operates a DCI format defined depending on whether the DCI is the scheduling information (uplink (UL) grant) on the uplink data and the scheduling information (downlink (DL) grant) on the downlink data, whether the DCI is compact DCI having a small size of control information, whether the DCI applies spatial multiplexing using a multiple antenna, whether the DCI is DCI for a power control, or the like. For example, DCI format 1 that is the scheduling control information (DL grant) on the downlink data is configured to include at least following control information.

Resource allocation type 0/1 flag. Notify whether the resource allocation type is type 0 or type 1. The type 0 applies a bitmap scheme to assign a resource in a resource block group (RBG) unit. In the LTE system, a basic unit of the scheduling is the resource block (RB) represented by a time-frequency domain resource and the RBG consists of a plurality of RBs and thus becomes a basic unit of the scheduling in the type 0 scheme. The type 1 assigns a specific RB within the RBG.

Resource block assignment: Notifies an RB assigned to data transmission. The resources to be represented are decided according to the system bandwidth and the resource assignment method.

Modulation and coding scheme (MCS). Notifies the modulation scheme used for data transmission and the size of the transport block, which is the data to be transmitted.

HARQ process number: Notifies the process number of the HARQ.

New data indicator: Notifies initial transmission or retransmission of the HARQ.

Redundancy version: Notifies a redundancy version of the HARQ.

Transmit Power Control (TPC) command for Physical Uplink Control Channel (PUCCH): Notifies a transmission power control command for the uplink control channel PUCCH.

The DCI is subjected to a channel coding and modulation process and then may be transmitted through a physical downlink control channel (PDCCH) (or control information, which is interchangeably used below) or an enhanced PDCCH (EPDCCH) (or enhanced control information, which is interchangeably used below).

Generally, the DCI is independently scrambled with a specific radio network temporary identifier (RNTI) (or a terminal identifier) for each terminal to be added with a cyclic redundant check (CRC), subjected to channel coding, and then configured of independent PDCCH to be transmitted. In the time domain, the PDCCH is transmitted while being mapped during the control channel transmission section. A mapping position in the frequency domain of the PDCCH is determined by identifiers IDs of each terminal and is spread over the entire system transmission bandwidth.

The downlink data are transmitted through a physical downlink shared channel (PDSCH) that is a physical channel for downlink data transmission. The PDSCH is transmitted after the control channel transmission section and the DCI transmitted through the PDCCH informs the scheduling information on the detailed mapping location in the frequency domain, the modulation scheme, or the like.

By the MCS consisting of 5 bits among the control information configuring the DCI, the base station notifies the modulation scheme applied to the PDSCH to be transmitted to the terminal and a data size (transport block size (TBS)) to be transmitted. The TBS corresponds to a size before channel coding for error correction is applied to data (transport block (TB)) to be transmitted by a base station.

The modulation scheme supported in the LTE system is quadrature phase shift keying (QPSK), 16 quadrature amplitude modulation (16 QAM), and 64QAM, in which each modulation order $Q_m$ corresponds to 2, 4, and 6. That is, in the case of the QPSK modulation, 2 bits per symbol may be transmitted, in the case of the 16QAM modulation, 4 bits per symbol may be transmitted, and in the case of the 64QAM modulation, 6 bits per symbol may be transmitted.

Figure 18:
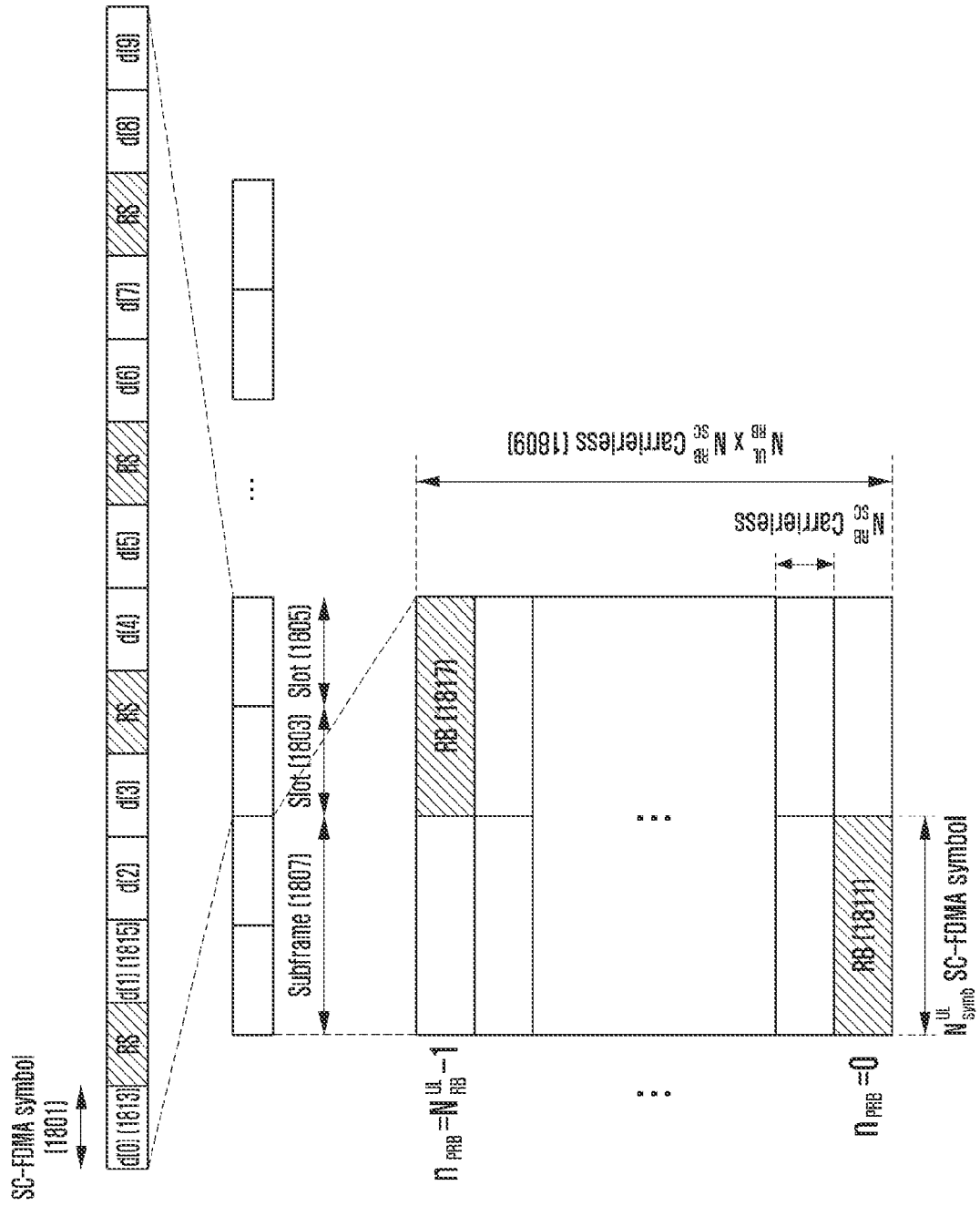
FIG. 18 is a diagram illustrating an uplink resource allocation structure of the LTE or the LTE-A system, and specifically a subframe structure of a control channel.

FIG. 18 is a diagram illustrating an example of a time-frequency domain transmission structure of a PUCCH in an LTE-A system according to the related art. In other words, FIG. 18 illustrates a time-frequency domain transmission structure of the physical uplink control channel (PUCCH) which is a physical control channel through which the terminal transmits uplink control information (UCI) to the base station in the LTE-A system. The UCI includes at least one of the following control information.

HARQ-ACK: The terminal feedbacks acknowledgment (ACK) from the base station if there is no error about a downlink data which is received through the physical downlink shared channel (PDSCH) which is a downlink data channel to which a hybrid automatic repeat request (HARQ) is applied and feedbacks negative acknowledgment if there is an error in reception.

It includes a signal indicating a channel quality indicator (CQI), a precoding matrix indicator (PMI), a rank indicator (RI), or a downlink channel coefficient. The base station sets a modulation and coding scheme (MCS) or the like for data which is to be transmitted to the terminal from the CSI obtained from the terminal to an appropriate value and satisfies predetermined reception performance for the data. The CQI represents a signal to interference and noise ratio (SINR) for a system wideband or a subband. In general, the CQI is represented in a form of the MCS for satisfying predetermined data reception performance. The PMI/RI provides precoding and rank information necessary for a base station to transmit data through multiple antennas in a system supporting multiple input multiple output (MIMO). The signal indicating the downlink channel coefficient provides relatively detailed channel status information than the CSI signal, but has a problem of increasing an uplink overhead. Here, the terminal is specifically notified in advance CSI configuration information on a reporting mode indicating which information is to be fed back, resource information on which resource is used, a transmission interval, and the like from the base station through higher layer signaling. Then, the terminal transmits the CSI to the base station using the CSI configuration information notified in advance.

Referring to FIG. 18, an abscissa represents a time domain and an ordinate represents a frequency domain. The minimum transmission unit in the time domain is an SC-FDMA symbol 201, and the $N_{symb}^{UL}$ SC-FDMA symbols are gathered to form one slot 1803 and 1805. Two slots are gathered to form one subframe 1807. The minimum transmission unit in the frequency domain is a subcarrier, in which the entire system transmission bandwidth 1809 includes a total of $N_{BW}$ subcarriers. The $N_{BW}$ has a value in proportion to the system transmission bandwidth.

A basic unit of resources in the time-frequency domain is a resource element (RE) and may be defined as an SC-FDMA symbol index and a sub-carrier index. Resource blocks (RBs) 1811 and 1817 are defined as $N_{symb}^{UL}$ but continued SC-FDMA symbols in the time domain and $N_{sc}^{RB}$ continued subcarriers in the frequency domain. Accordingly, one RB consists of $N_{symb}UL \times N_{sc}RB$ REs. In general, the minimum transmission unit of the data or the control information is the RB unit. The PUCCH is mapped to a frequency domain corresponding to 1 RB and transmitted for one subframe.

FIG. 18 illustrates an example in which $N_{symb}^{UL}=7$, $N_{sc}^{RB}=12$, and the number $N_{RS}^{PUCCH}$ of reference signals (RS) for channel estimation within one slot is 2. The RS uses a constant amplitude zero auto-correlation (CAZAC) sequence. The CAZAC sequence has a feature that signal intensity is constant and an autocorrelation coefficient is zero. A newly configured CAZAC sequence is maintained in mutual orthogonality to an original CAZAC sequence by cyclically shifting a predetermined CAZAC sequence by a value larger than a delay spread of a transmission path. Accordingly, a CS-CAZAC sequence in which up to L orthogonality is maintained may be generated from a CAZAC sequence having length L. The length of the CAZAC sequence applied to the PUCCH is 12 which corresponds to the number of subcarriers configuring one RB.

The UCI is mapped to the SC-FDMA symbol to which the RS is not mapped. FIG. 18 illustrates an example in which a total of 10 UCI modulation symbols 213 and 215 (d (0), d (1), . . . , d (9)) are mapped to each of the SC-FDMA symbols within one subframe. Each UCI modulation symbol is mapped to a SC-FDMA symbol after being multiplied by a CAZAC sequence applied with a predetermined cyclic shift value for multiplexing with UCI of another terminal. The PUCCH is applied with frequency hopped in a slot unit to obtain frequency diversity. The PUCCH is located outside a system transmission band and enables data transmission in the remaining transmission bands. That is, the PUCCH is mapped to the RB 211 located at an outermost of the system transmission band in a first slot in the subframe, and is mapped to the RB 217 which is a frequency domain different from the RB 211 located at another outermost of the system transmission band in a second slot in the subframe. In general, RB locations where the PUCCH for transmitting HARQ-ACK and the PUCCH for transmitting CSI are mapped do not overlap with each other. In the case of the uplink shared channel PUSCH, the RS for channel estimation is located in the fourth SC-FDMA symbol in one slot, and therefore, two SC-FDMA symbols in one subframe are allocated as RSs for uplink data demodulation.

In the LTE system, a timing relationship between a PUCCH or a PUSCH is defined, with the PUCCH or the PUSCH being an uplink physical channel to which an HARQ ACK/NACK corresponding to a PDSCH as a physical channel for downlink data transmission or a PDCCH/EPDDCH including a semi-persistent scheduling release (SPS release) is transmitted. For example, in an LTE system operated by frequency division duplex (FDD), the HARQ ACK/NACK corresponding to the PDSCH transmitted in an n-4-th subframe or the PDCCH/EPDCCH including the SPS release is transmitted to the PUCCH or the PUSCH in an n-th subframe.

In the LTE system, the downlink HARQ has adopted an asynchronous HARQ scheme in which data retransmission time is not fixed. That is, if for initial transmission data transmitted by the base station, the HARQ NACK is fed back from the terminal, the base station freely determines transmission time of retransmission data based on the scheduling operation. The terminal performs buffering on data determined as an error as a result of decoding the received data for an HARQ operation and then performs combining with the next retransmission data.

In the LTE system, unlike the downlink HARQ, the uplink HARQ has adopted a synchronous HARQ scheme in which the data transmission time is fixed. That is, the uplink/downlink timing relationship between the physical uplink shared channel (PUSCH) as the physical channel for the uplink data transmission and the PDCCH as the downlink control channel preceding the PUSCH and a physical hybrid indicator channel (PHICH) as the physical channel to which a downlink HARQ ACK/NACK corresponding to the PUSCH is transmitted is fixed by the following rule.

If in the subframe n, the terminal receives the PDCCH including the uplink scheduling control information transmitted from the base station or the PHICH to which the downlink HARQ ACK/NACK are transmitted, the terminal transmits the uplink data corresponding to the control information on the PUSCH in subframe n+k. At this time, the k is differently defined depending on the FDD or the time division duplex (TDD) of the LTE system and the setting thereof. For example, in the case of the FDD LTE system, the k is fixed as 4.

Further, if the terminal receives the PHICH transporting the downlink HARQ ACK/NACK from the base station in subframe i, the PHICH corresponds to the PUSCH that the terminal transmits in subframe i-k. At this time, the k is differently defined depending on the FDD or the time division duplex (TDD) of the LTE system and the setting thereof. For example, in the case of the FDD LTE system, the k is fixed as 4.

Meanwhile, one of the important criteria of the performance of the cellular wireless communication system is packet data latency. For this purpose, the LTE system transmits and receives signals in a subframe unit having the transmission time interval (TTI) of 1 ms. In the LTE system operating as described above, a terminal (shortened-TTI/shorter-TTI UE) having a transmission time interval shorter than 1 ms may be supported. The shortened-TTI terminal is expected to be suitable for services such as Voice over LTE (VoLTE) service and remote control where latency is important. Further, the shortened-TTI terminal is expected to be a means to realize mission critical Internet of Things (IoT) on a cellular basis.

In the current LTE and LTE-A systems, the base station and the terminal are designed to perform transmission and reception in units of subframes with a transmission time interval of 1 ms. In an environment in which the base station and the terminal operating with the transmission time interval of 1 ms exist, in order to support the shortened-TTI terminal operating in a transmission time interval shorter than 1 ms transmission and reception operations differentiated from general LTE and LTE-A terminals need to be defined. Accordingly, the present disclosure proposes a specific method for operating general LTE and LTE-A terminals and the shortened-TTI terminal in the same system.

In the embodiment of the present disclosure, a method for transmitting/receiving a signal by a base station in a wireless communication system includes deciding which type terminal of a first type terminal and a second type terminal a scheduling target terminal is, generating control information based on the control information for the first type terminal when the scheduling target terminal is the first type terminal, and transmitting the generated control information. In this case, the length of the transmission time interval for the first type terminal is shorter than the transmission time interval for the second type terminal.

In the embodiment of the present disclosure, the first type terminal may be referred to as the shortened-TTI terminal or shorter TTI terminal and the second type terminal may be referred to as a normal-TTI terminal or a legacy TTI terminal.

A method for transmitting/receiving a signal by a base station In a wireless communication system according to an embodiment of the present disclosure, includes configuring an OFDM symbol to which a shortened TTI start time or short TTI control information for a first type terminal is mapped and notifying the first type terminal of the configured OFDM symbol, assigning control information or data to the first type terminal from the shortened TTI start time, and transmitting the control information or data to a resource assigned to the first type terminal, in which the first type terminal performs control information decoding for receiving the shortened TTI control information at the set shortened TTI start time. Alternatively, instead of setting and notifying the shortened TTI start time to the terminal in the above embodiment, a time when data for a shortened TTI may end may be notified. Alternatively, the first type terminal performs shortened TTI control information decoding on all OFDM symbols assuming that the shortened TTI starts in all OFDM symbols except the OFDM symbols used in the conventional PDCCH.

In a wireless communication system according to another embodiment of the present disclosure, a base station transmitting and receiving signals decides which type of terminal of a first type terminal and a second type terminal a scheduling target terminal is and when the scheduling type terminal is the first type terminal, informs the terminal of the number of OFDM symbols in which the length of the shortened TTI or the data of the shortened TTI is transmitted in the control information for the first type terminal.

In a wireless communication system according to yet another embodiment of the present disclosure, a first type terminal for transmitting and receiving signals decides a time of transmitting HARQ ACK/NACK feedback information for shortened-TTI downlink data (sPDSCH) in the uplink by a last OFDM symbol in which sPDSCH is transmitted. Alternatively, it may be determined that the time is decided by an OFDM symbol in which the sPDSCH starts to be transmitted or an OFDM symbol in which a shortened TTI control signal is transmitted.

Hereinafter, the base station is a subject performing resource allocation of a terminal and may be at least one of eNode B, Node B, a base station (BS), a wireless access unit, a base station controller, and a node on a network. The UE may include user equipment (UE), a mobile station (MS), a cellular phone, a smart phone, a computer, or a multimedia system performing a communication function. In the present disclosure, a downlink (DL) means a radio transmission path of a signal from a base station to a terminal and an uplink (UL) means a radio transmission path through which the terminal is transmitted to the base station. Further, the embodiment of the present disclosure describes the LTE or LTE-A system by way of example, but the embodiment of the present disclosure may be applied to other communication systems having similar technical background or a channel form. Further, the embodiment of the present disclosure may be applied to other communication systems by partially being changed without greatly departing from the scope of the present disclosure under the decision of those skilled in the art.

The shortened-TTI terminal described below may be referred to as the first type terminal and the normal-TTI terminal may be referred to as the second type terminal. The first type terminal may include a terminal having a transmission time interval shorter than 1 ms and the second type terminal may include a terminal having a transmission time interval of 1 ms. Meanwhile, hereinafter, the shortened-TTI terminal and the first type terminal will be used in combination and the normal-TTI terminal and the second type terminal will be used in combination. Further, in the present disclosure, the shortened-TTI and the shorter-TTI are used in combination. Further, the shortened TTI, the shorter TTI, a short TTI, and sTTI are used in combination.

Shortened-TTI transmission described below may be referred to as first type transmission and the normal-TTI transmission may be referred to as second type transmission. The first type transmission is a scheme in which a control signal, a data signal, or the control signal and the data signal are transmitted in an interval shorter than 1 ms and the second type transmission is a scheme in which the control signal, the data signal, or the control and data signals are transmitted in the interval of 1 ms. Meanwhile, hereinafter, the shortened-TTI transmission and the first type transmission will be used in combination and the normal-TTI terminal and the second type transmission will be used in combination.

In an embodiment of the present disclosure, the transmission time interval in the downlink may means a unit in which the control signal and the data signal are transmitted or the control signal may be omitted. For example, in the existing LTE system, the transmission time interval in the downlink is a subframe of a time unit of 1 ms. Meanwhile, in the present disclosure, the transmission time interval in the uplink means a unit in which the control signal or the data signal is transmitted. The transmission time interval in the uplink of the existing LTE system is the subframe of the time unit of 1 ms which is the same as the downlink.

Further, in an embodiment of the present disclosure, in a shortened-TTI mode, the terminal or the base station transmits/receives the control signal or the data signal in units of shortened TTI and in a normal-TTI mode, the terminal or the base station transmits the control signal or the data signal in units of subframe.

Although the present disclosure has been described on the basis of the LTE system in the present specification, it will be apparent that the contents of the present disclosure may be applied to a 5G or NR system. In the shortened-TTI mode in an embodiment of the present disclosure, an NR or a 5G terminal and the base station transmit/receive the control signal or the data signal in units of mini-slot or sub-slot and in the normal-TTI mode, the terminal or the base station transmits/receives the control signal or the data signal in units of slot.

In addition, in the present disclosure, the shortened-TTI data refers to data transmitted in the PDSCH or the PUSCH transmitted/received in a shortened TTI unit, and the normal-TTI data refers to data transmitted in the PDSCH or the PUSCH transmitted/received in a subframe unit. The PDSCH or PUSCH transmitted/received in units of shortened TTIs may be referred to as sPDSCH or sPUSCH. In the present disclosure, the control signal for the shortened-TTI means a control signal for a shortened-TTI mode operation and is referred to as sPDCCH or sEPDCCH and the control signal for the normal-TTI means a control signal for a normal-TTI mode operation. As an example, the control signal for the normal-TTI may be PCFICH, PHICH, PDCCH, EPDCCH, PUCCH, etc. in the existing LTE system.

In the present disclosure, the terms the physical channel and the signal in the existing LTE or LTE-A system may be used together with the data or the control signal. For example, the PDSCH is the physical channel to which the normal-TTI data is transmitted, but in the present disclosure, the PDSCH may be referred to as the normal-TTI data, and the sPDSCH may be the physical channel to which shortened-TTI data are transmitted. However, in the present disclosure, the sPDSCH may be referred to as the shortened-TTI data. Similarly, in the present disclosure, the shortened-TTI data transmitted in the downlink and the uplink will be referred to as the sPDSCH and the sPUSCH.

As described above, an embodiment of the present disclosure proposes the specific method for defining the transmission/reception operations of the shortened-TTI terminal and the base station and operating the existing terminal and the shortened-TTI terminal together in the same system. In the present disclosure, the normal-TTI terminal refers to a terminal that transmits and receives control information and data information in units of 1 ms or one subframe. The control information for the normal-TTI terminal is transmitted while being loaded on the PDCCH mapped to a maximum of 3 OFDM symbols in one subframe or on the EPDCCH mapped to a specific resource block in one subframe. The shortened-TTI terminal refers to a terminal that may perform transmission/reception in units of subframes like the normal-TTI terminal or may perform transmission/reception in units smaller than the subframes. Alternatively, the shortened-TTI terminal may be a terminal that supports transmission and reception of the unit smaller than the subframe.

Embodiment 2-1

Embodiment 2-1 provides a method for informing, by the base station, the shortened-TTI terminal of the timing at which the sPDCCH may be transmitted and a method for finding, by the terminal, the timing at which the sPDCCH may be transmitted. Hereinafter, the methods will be described with reference to FIG. 19. A method for informing the position of the sTTI and a method for confirming the position of the sTTI are provided through Embodiment 2-1. The information on the position of the sTTI may include information on the sPDCCH or information on the sPDSCH.

The base station assigns the position of the OFDM symbol in which the sPDCCH may be transmitted in one subframe (1903). The terminal decodes the sPDCCH at the position of the sPDCCH to confirm scheduling information for the sPDSCH and receive the sPDSCH. Conversely, the base station may inform the position of the sPDSCH. When the position of the sPDSCH is informed, the terminal may estimate the position of the sPDCCH from the position of the sPDSCH.

Figure 19:
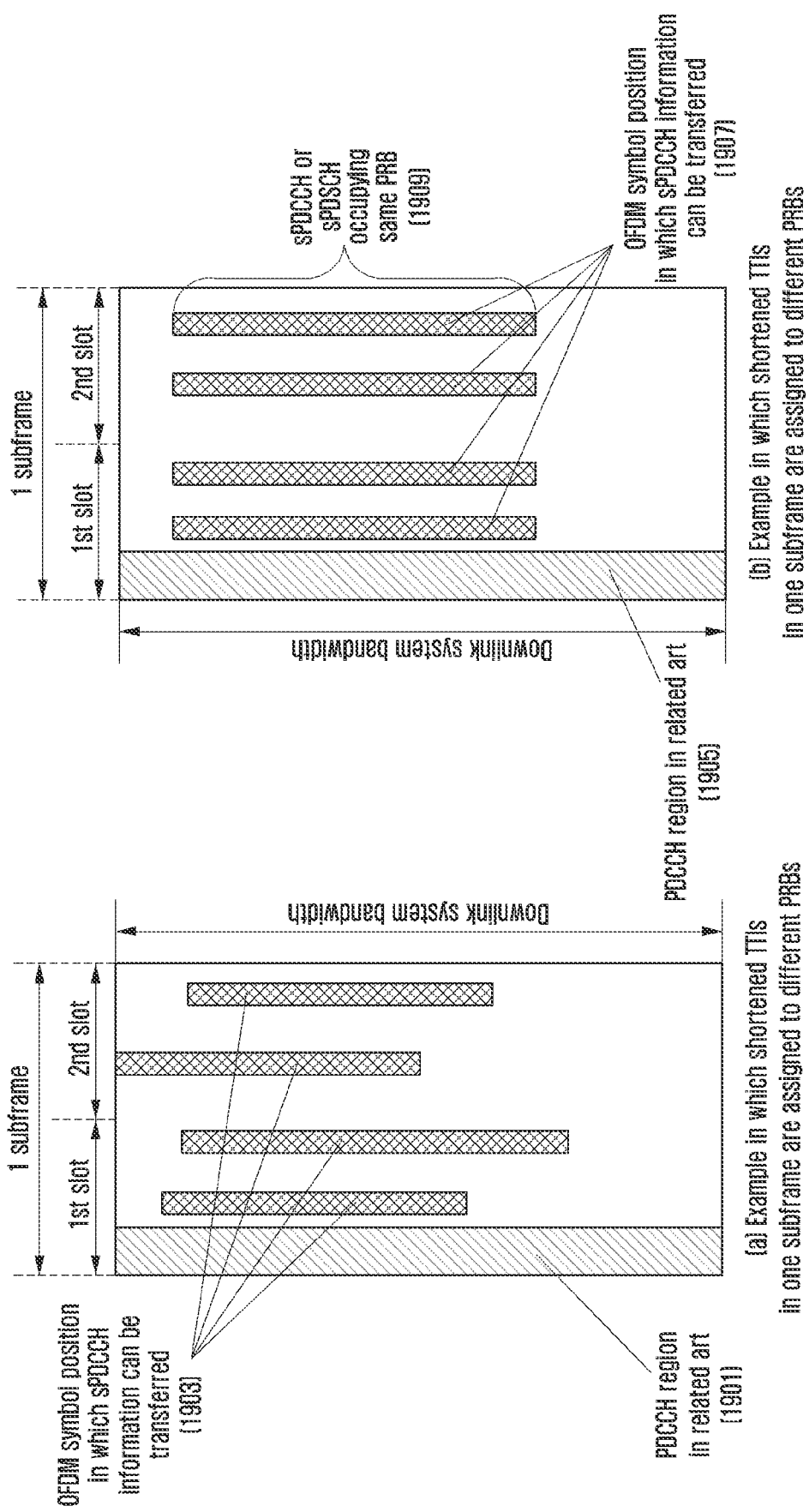
FIG. 19 is a diagram illustrating a method for allocating a location of sPDCCH in one subframe according to an embodiment of the present disclosure.
Figure 20:
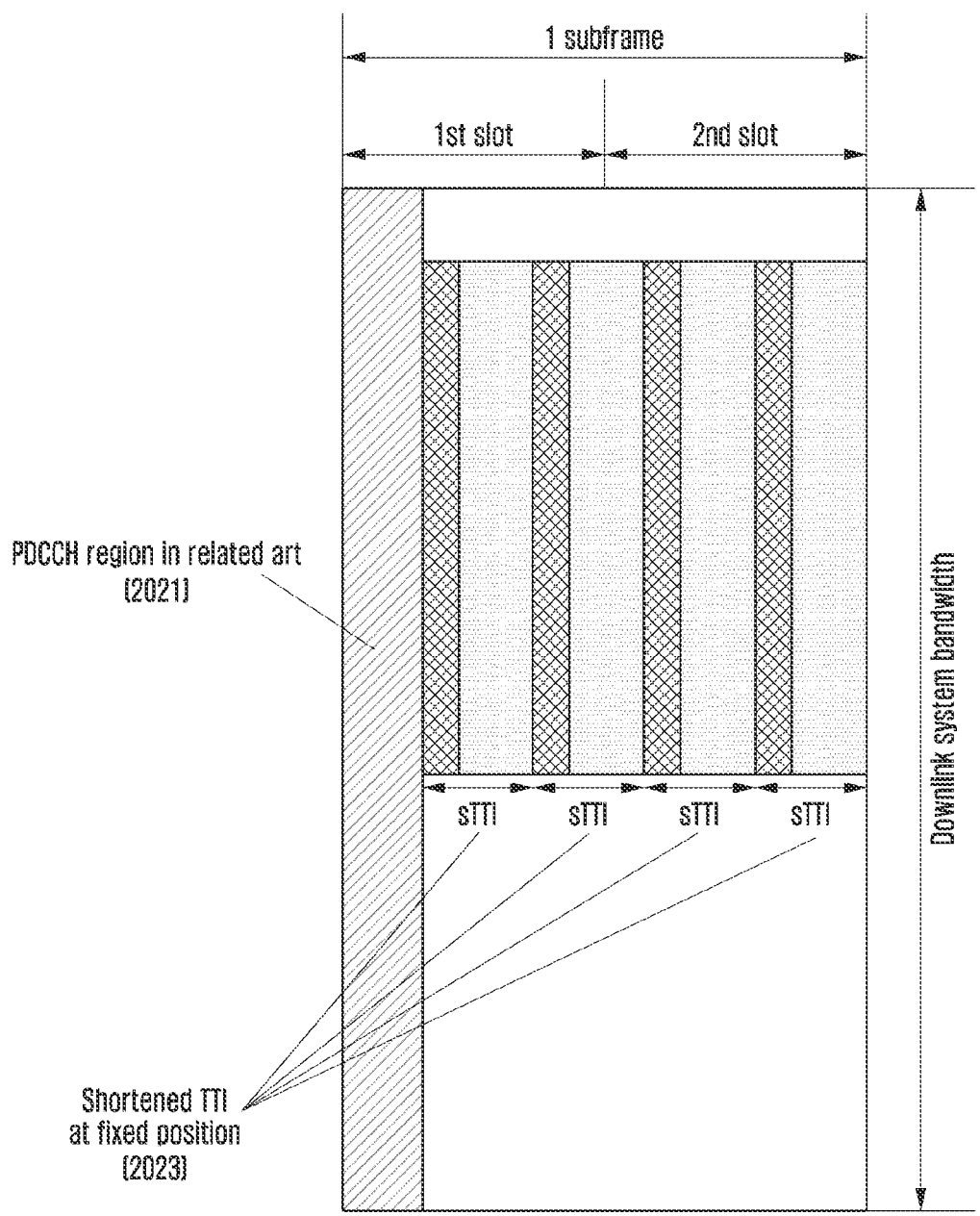
FIG. 20 is a diagram illustrating a method for allocating a location of sPDCCH in one subframe according to an embodiment of the present disclosure.

In this case, a PRB area 1909 in which the sPDCCH is transmitted to a specific terminal or the sPDSCH is transmitted may be changed as illustrated in (a) of FIG. 19 in one subframe or fixed as illustrated in (b) of FIG. 19. The base station informs the shortened-TTI terminal of the position of the OFDM symbol in which the sPDCCH may be transmitted through the higher layer signaling such as the RRC signal. The base station may notify the position where the sPDSCH may be transmitted through the higher layer signaling. The higher layer signaling in this case may be all or several shortened TTI terminal broadcast information of the corresponding cell by using SIB or terminal specific signaling transmitted for each specific terminal. For example, when cross-carrier scheduling is applied as scheduling for the sTTI, the base station may transmit information about the position of the sTTI through the higher layer signaling. The information on the position of the sTTI may include information on the sPDCCH or information on the sPDSCH. The information on the sPDSCH may include the position of the first symbol in which the sPDSCH is transmitted. The information on the sPDCCH may include the position of the first symbol in which the sPDCCH is transmitted.

For example, sPDCCH_symbol_set in the higher signaling is defined and informed to the terminal and sPDCCH_symbol_set as a 13-bit bitmap becomes a variable indicating excludes the first OFDM symbol in each subframe and indicates a variable indicating in which OFDM symbol except for the first OFDM symbol the sPDCCH may be transmitted every subframe. For example, when sPDCCH_symbol_set={0100100100100}, each of 0 and 1 indicates whether sPDCCHs of the 2nd to 14th OFDM symbols of each subframe may be transmitted. Since the first OFDM symbol of the subframe is consecutively used for PDCCH transmission, an example of excluding the first OFDM symbol in the sPDCCH is shown. However, the first OFDM symbol may be used for sPDCCH transmission. Therefore, sPDCCH_symbol_set={0100100100100} will indicate that the sPDCCH may be transmitted in the 3rd, 6th, $9^{th}$, and 12th OFDM symbols. The number of bits of the sPDCCH_symbol_set may be applied as other values such as 4 bits, 5 bits, 6 bits, 7 bits, 8 bits, 9 bits, 10 bits, 11 bits, 12 bits, and 14 other than 13 bits.

In an embodiment of the present disclosure, all positions of the sPDCCH symbol may not be informed, but the first symbol to which the sPDCCH may be transmitted may be informed. The terminal and the base station may use a predetermined sTTI pattern. The terminal may confirm a pattern corresponding to the position of the first symbol of the sPDCCH among a plurality of sTTI patterns. The sTTI pattern may include information on the length and position of the sTTI. The length and position of the sTTI may include information on the length and position of the sPDCCH and the length and position of the sPDSCH.

In an embodiment of the present disclosure, all positions of the sPDSCH symbol may not be informed, but the first symbol to which the sPDSCH may be transmitted may be informed. The terminal and the base station may use a predetermined sTTI pattern. The terminal may confirm a pattern corresponding to the position of the first symbol of the sPDSCH among the plurality of sTTI patterns. The sTTI pattern may include information on the length and position of the sTTI. The length and position of the sTTI may include information on the length and position of the sPDSCH and the length and position of the sPDCCH.

Figure 21:
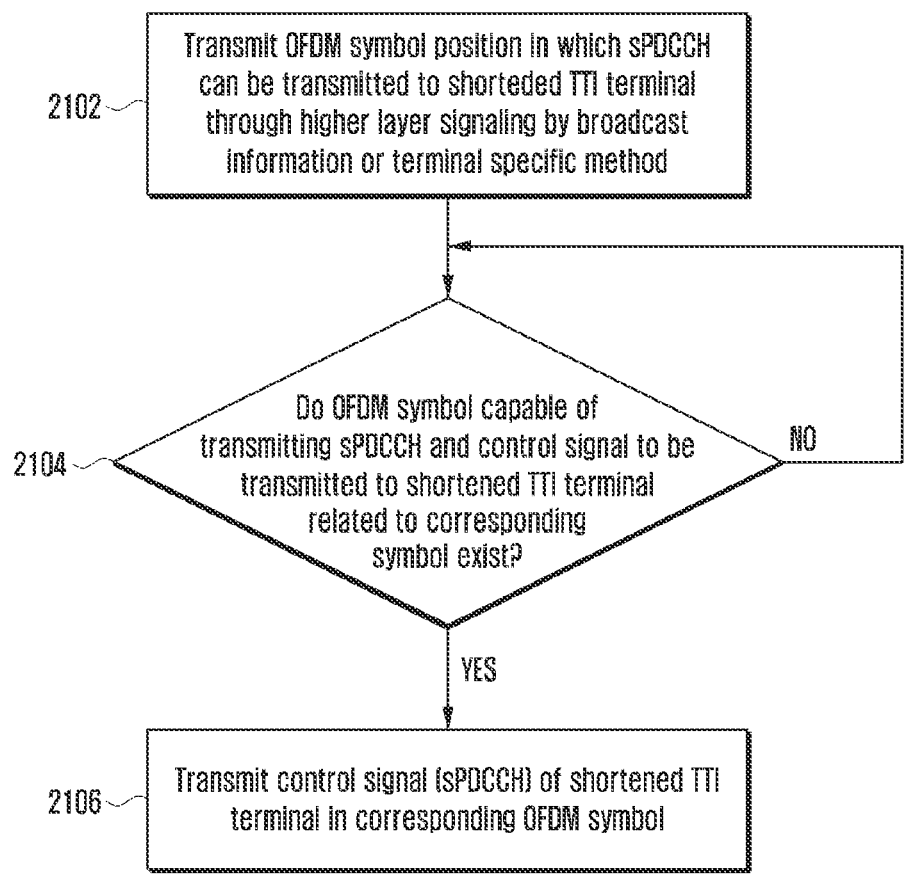
FIG. 21 is a flowchart illustrating a method for allocating, by a base station, a location of sPDCCH in one subframe to transmit the sPDCCH according to an embodiment of the present disclosure.

FIG. 21 illustrates a process of transmitting the sPDCCH to the shortened TTI terminal by the base station in the above example.

First, the base station transfers to the terminal the position of the OFDM symbol in which the sPDCCH may be transmitted to the terminal on by the sPDCCH_symbol_set or information on a start symbol position of the sPDCCH by the higher upper signaling (operation 2102). Thereafter, it is confirmed whether the OFDM symbol is an OFDM symbol capable of transmitting the sPDCCH and the control signal to be transmitted to the shortened TTI terminal exists while transmitting the signal (operation 2104). When there is an OFDM symbol in which the sPDCCH transmission is not possible or there is no signal to be transmitted to the shortened TTI terminal, the next OFDM symbol transmission is awaited. When the corresponding OFDM symbol is the OFDM symbol capable of transmitting the sPDCCH and there is the control signal to be transmitted to the shortened TTI terminal, the sPDCCH is mapped and transmitted in the OFDM symbol (operation 2106).

In operation 2202, the base station may transmit the information of the sPDSCH to the terminal. The sPDSCH_symbol_set or the information on the start symbol position of the sPDSCH may be transferred to the terminal through the higher layer signaling. The operation below is similar to the above operation. The position of the sPDCCH may be estimated from the position of the sPDSCH. In this case, the base station may schedule the sTTI using the cross carrier scheduling for the terminal.

Figure 22:
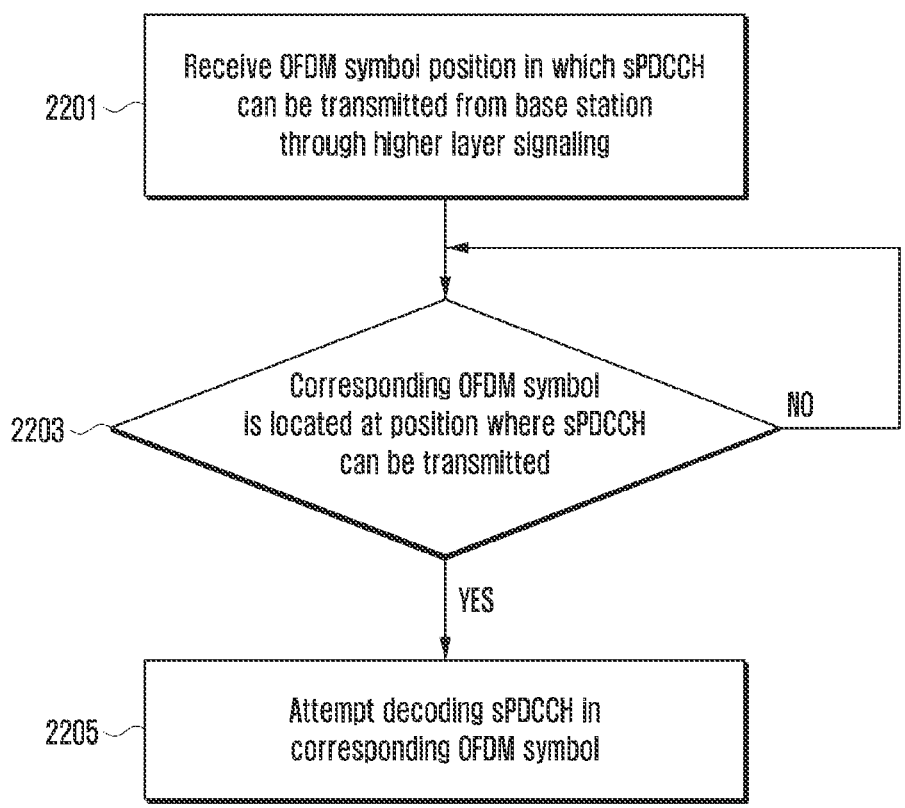
FIG. 22 is a flowchart illustrating a method for finding, by a terminal, a location of sPDCCH in one subframe to receive the sPDCCH according to an embodiment of the present disclosure.

FIG. 22 illustrates a process of receiving the sPDCCH by the shortened TTI terminal in the above example.

First, the terminal receives from the base station the positions of the OFDM symbols in which the sPDCCH may be transmitted to the terminal on by the sPDCCH_symbol_set or information on a start position of the sPDCCH by the higher upper signaling (operation 2201). The shortened TTI terminal attempts sPDCCH decoding in the corresponding OFDM symbol when the corresponding OFDM symbol is located at a position where the sPDCCH may be transmitted (operation 2203) while performing signal reception (operation 2205). When the base station informs the terminal of a PRB range to which the sPDCCH may be mapped in advance, the terminal may perform decoding only in the corresponding PRB range.

Alternatively, the base station may inform the start OFDM symbol position of the shortened TTI in which the sPDSCH may be transmitted. The information may be transferred by the higher layer signaling. Using the information, the shortened-TTI terminal may know the start OFDM symbol position at which the sPDSCH is transmitted. The terminal may determine that the sPDCCH is transmitted before the sPDSCH and may receive the sPDSCH by decoding the sPDCCH in an sPDCCH candidate region.

Alternatively, the base station may notify the shortened-TTI terminal of the OFDM symbol position in which the sPDCCH may be transmitted, instead of indicating the last OFDM symbol position of the shortened TTI in which the sPDSCH may be transmitted. Using the information, the shortened-TTI terminal may know the last OFDM symbol position in which the sPDSCH is transmitted, and determines that the sPDCCH is transmitted after the OFDM symbol or a few OFDM symbols and then attempts sPDCCH decoding.

Alternatively, as illustrated in FIG. 19, the position of the shortened TTI may be fixed (1923), the sPDCCH and the sPDSCH may transmitted in a predetermined OFDM symbol, the base station may transmit the sPDCCH and the sPDSCH in the predetermined OFDM symbol, and the terminal may receive and decode the sPDCCH and sPDSCH at a predetermined position. The terminal and the base station may use a fixed sTTI pattern. The sTTI pattern may be previously configured between the terminal and the base station. When the start position of the sPDCCH or the start position of the sPDSCH is known among the plurality of sTTI patterns, the pattern of the corresponding sTTI may be confirmed.

Alternatively, the terminal may assume that the base station may transmit sPDCCHs in all OFDM symbols or all OFDM symbols except for the PDCCH region in the related art. Therefore, the base station may transmit the sPDCCH in any OFDM symbol without transmitting the signal to the terminal and the terminal needs to attempt sPDCCH decoding in all of the OFDM symbols.

Embodiment 2-2

Embodiment 2-2 provides a method for notifying the shortened-TTI terminal of the length of the shortened TTI and will be described with reference to FIG. 23. The base station and the terminal may know mapping information of the sPDCCH, the sPDSCH, and the sPUSCH using the length information of the shortened TTI.

An example of Embodiment 2-2 is a method in which the position of the OFDM symbol of the shortened TTI is fixed and is predetermined by the base station and the terminal. Predetermining may mean that the position may be determined as one fixed value or that the base station and the terminal may know the position each other through the higher layer signaling. For example, the pattern of the sTTI may be previously set. There may be a plurality of sTTI patterns, for example, two sTTI patterns.

Figure 23:
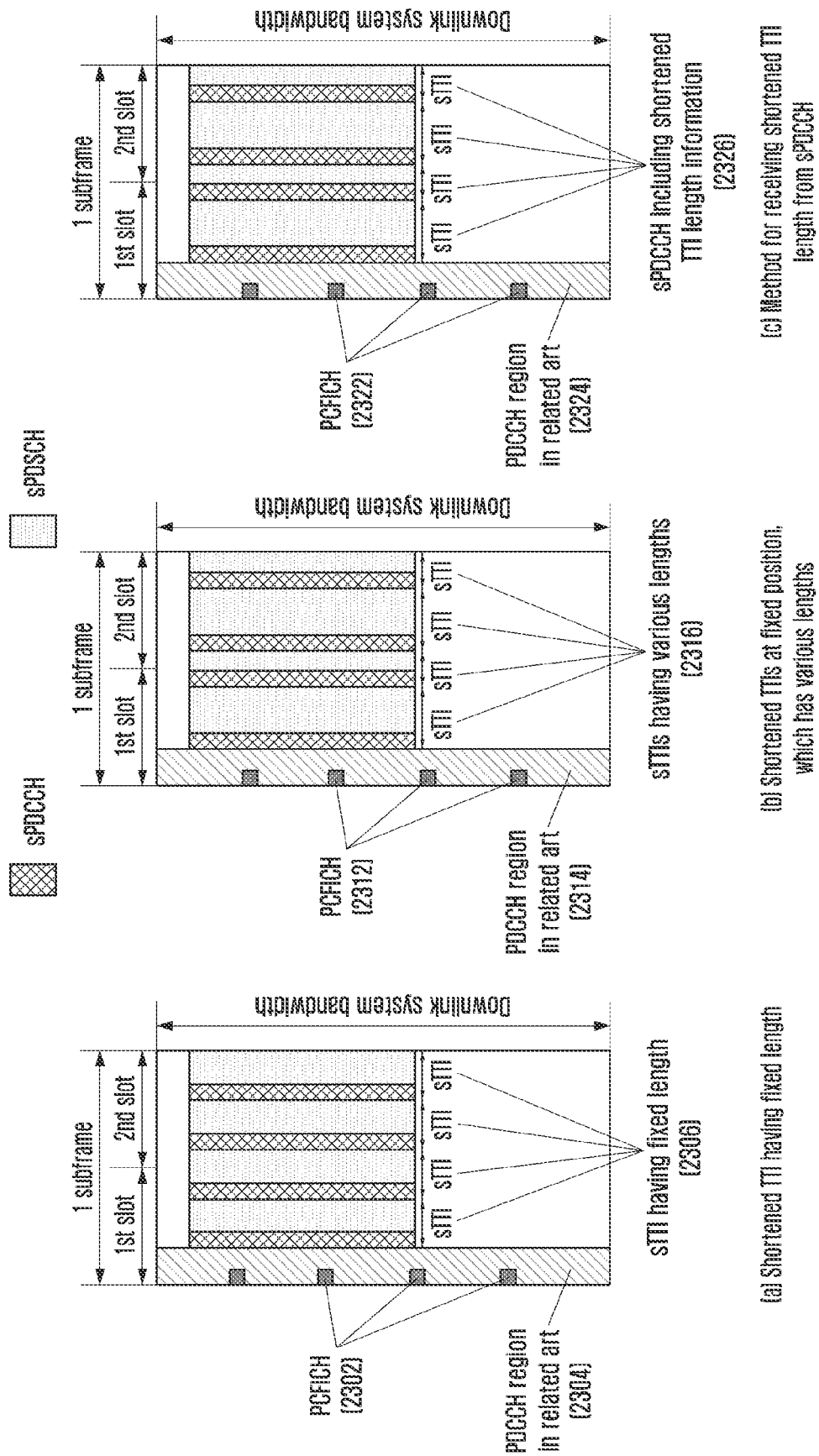
FIG. 23 is a diagram illustrating a method for defining a shortened TTI length according to an embodiment of the present disclosure.

(a) of FIG. 23 illustrates an example in which four shortened TTIs 2306 are included in one subframe. The number of shortened TTIs included in one subframe will vary depending on the length of the shortened TTI. The base station may allocate and transmit a shortened TTI of a predetermined length according to the PDCCH region 2304 in the related art. Further, the base station may allocate the shortened TTI to a predetermined position regardless of the PDCCH region 2304 in the related art. When the shortened TTI position may be changed according to the number of OFDM symbols in the PDCCH region in the related art, the terminal first decodes a PCFICH 2302 in the corresponding subframe to find the number of OFDM symbols in the PDCCH region 2304. Thereafter, the position of a shortened TTI 2306 having a predetermined length is determined and the sPDCCH is received. The terminal may confirm the position of the start symbol of the sPDSCH according to the PDCCH region estimated from the PCFICH. The terminal confirms the start symbol position of the sPDSCH to confirm the corresponding sTTI pattern. When self-scheduling is configured, the downlink control information is decoded in the PDCCH region confirmed based on the PCFICH decoded in the corresponding cell, so that the method can be applied to the self-scheduling.

In the case where the cross carrier scheduling is applied, the method described in Embodiment 2-1 may be applied.

Figure 24:
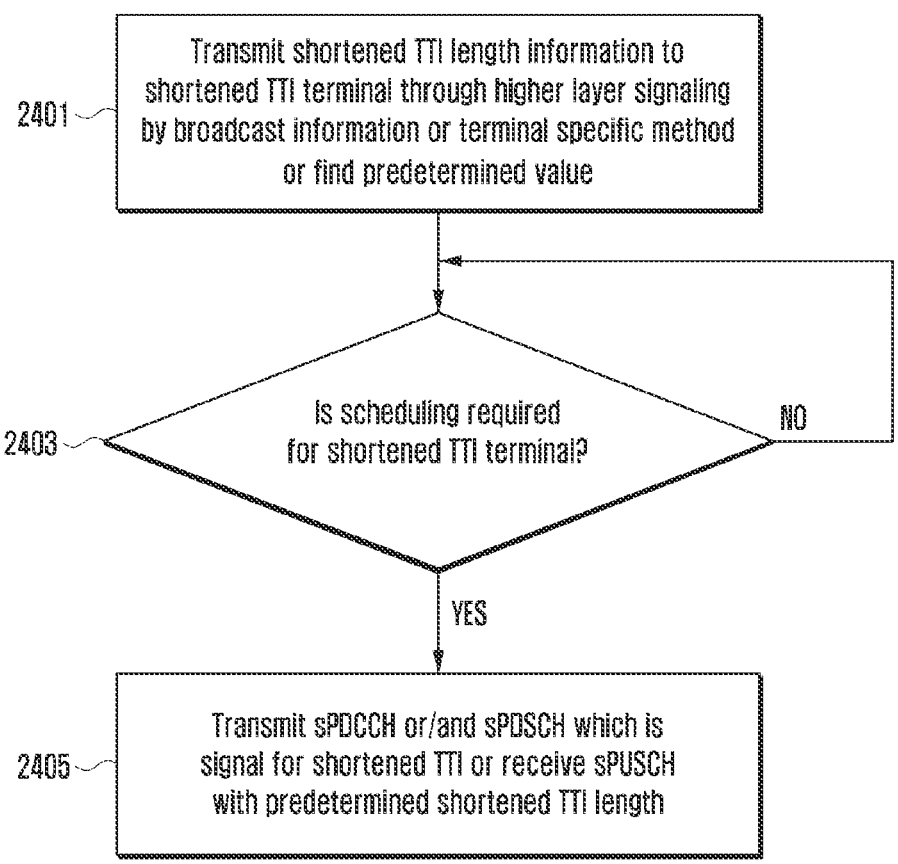
FIG. 24 is a flowchart illustrating a method for allocating, by a base station, a shortened TTI length in one subframe to transmit sPDCCH and sPDSCH or receive sPUSCH according to an embodiment of the present disclosure.

FIG. 24 illustrates a process of transmitting the sPDCCH and the sPDSCH to the shortened TTI terminal or receiving the sPUSCH by the base station in the above example. The base station first informs the terminal of the shortened TTI length by using the higher layer signaling by a broadcast information or terminal specific method or obtains a predetermined shortened TTI length value (operation 2401). The base station can determine the pattern of the sTTI according to the OFDM symbol length of the PDCCH region when the self-scheduling is applied. The base station may decide the sPDCCH position (e.g., the start position of the sPDCCH) or the sPDSCH position (e.g., the start position of the sPDSCH) according to the OFDM symbol length of the PDCCH region.

When scheduling is required for the shortened TTI terminal (operation 2403), the base station maps and transmits the sPDCCH and the sPDSCH using the shortened TTI length information or receives the sPUSCH (operation 2405).

Figure 25:
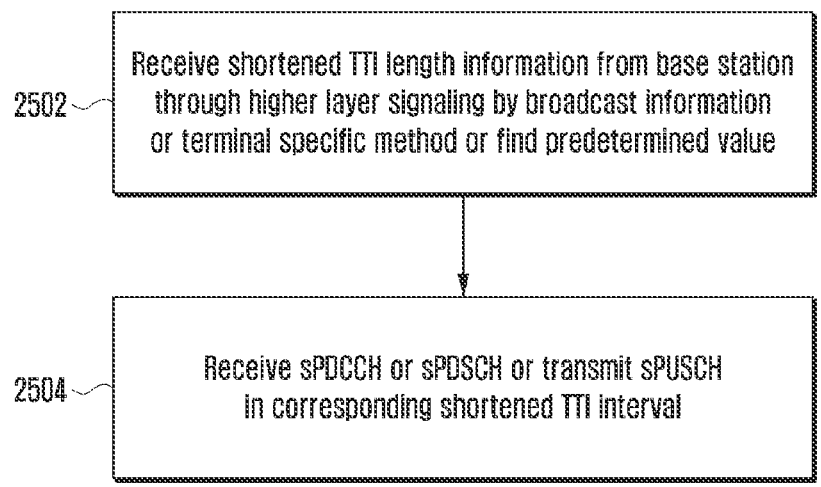
FIG. 25 is a flowchart illustrating a method for allocating, by a terminal, a shortened TTI length in one subframe to receive sPDCCH and sPDSCH or transmit sPUSCH according to an embodiment of the present disclosure.

FIG. 25 illustrates a process of receiving the sPDCCH and the sPDSCH from the base station or transmitting the sPUSCH by the terminal in the above example.

The shortened TTI terminal receives the shortened TTI length information from the base station or finds the shortened TTI length from a predetermined value (operation 2502). When the self-scheduling is applied, the terminal may confirm the length or position of the sTTI based on the PCFICH indicating the OFDM symbol length of the PDCCH region. The terminal may confirm the start position of the sPDSCH or the start position of the sPDCCH. For example, the terminal may confirm the corresponding sTTI pattern from the start position of the sPDSCH.

sPDCCH and sPDSCH reception and decoding are performed in the shortened TTI length range or the sPUSCH is transmitted (operation 2504). That is, the terminal may decode the sPDCCH based on the confirmed sTTI pattern and receive data through the sPDSCH.

Another example is a method in which shortened TTIs having various lengths are predetermined by the base station and the terminal so that as to be assigned BS and the MS have a predetermined agreement so that shortened TTIs having various lengths may be assigned as illustrated in (b) of FIG. 23. That is, the pattern of the sTTI may be predetermined between the terminal and the base station. There may be a plurality of sTTI patterns. Predetermining may mean that the position may be determined as one fixed value or that the base station and the terminal may know the position each other through the higher layer signaling. As illustrated in (b) of FIG. 23, shortened TTIs having several lengths exist in one subframe (2316), so that the terminal may transmit a signal to the shortened TTI terminal. The terminal may confirm the sTTI pattern applied to the terminal among the plurality of sTTI patterns based on the PCFICH.

As another example, shortened TTI length information is included in the sPDCCH as illustrated in (c) of FIG. 23 (2326). The shortened TTI length information may indicate the number of OFDM symbols of the sPDSCH and the last symbol position of the sPDSCH.

Another example is a method in which the position of the OFDM symbol to which the sPDCCH may be transmitted may be transferred from the base station to the terminal by the higher layer signaling in Embodiment 2-1 described above, in which the terminal determines the shortened TTI from the higher layer signaling such as sPDCCH_symbol_set. For example, when sPDCCH_symbol_set= {0100100100100} is set, it is indicated that the sPDCCH may be transmitted in the 3rd, 6th, 9th, and 12th OFDM symbols. Accordingly, it can be seen that 3rd, 4th, and 5th OFDM symbols which are symbols the 6th symbol from the 3rd symbol constitute one shortened TTI and by such a method, the 6th, 7th, and 8th OFDM symbols, 9th, 10th, and 11th OFDM symbols, and 12th, 13th, and 14th OFDM symbols may each constitute the shortened TTI.

Embodiment 2-3

Figure 26:
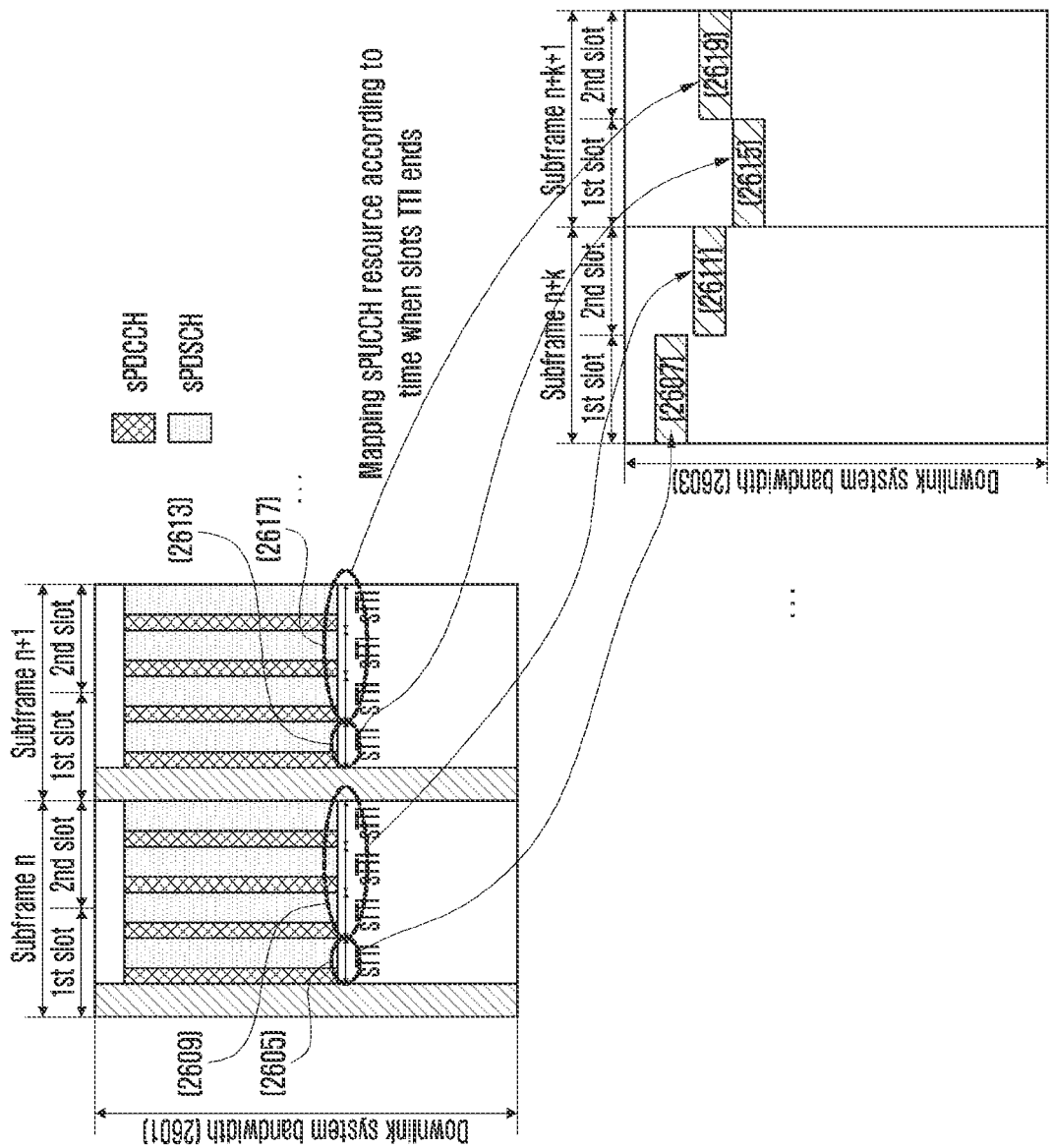
FIG. 26 is a diagram illustrating a method for determining a resource for an HARQ ACK/NACK transmission for sPDSCH according to an embodiment of the present disclosure.

Embodiment 2-3 provides a method for transmitting, by the base station and the terminal, the sPUCCH for HARQ ACK/NACK feedback to the sPDSCH in shortened TTI downlink transmission and will be described with reference to FIG. 26.

The base station and the shortened TTI terminal map the HARQ ACK/NACK feedback for the sPDSCHs that have been received before a specific time to a specific sPUCCH resource. FIG. 26 illustrates a structure in which four shortened TTIs are included in one subframe in a downlink band 2601 and a shortened TTI structure in which the slots are transmitted in units of slot in an uplink band 2603. The base station transmits data to the terminal in four shortened TTIs in subframe n (2605 and 2609). In the embodiment, an sPDSCH 2605 that has been received in the first slot of subframe n is transmitted with HARQ ACK/NACK from the terminal to the base station in a first slot 2607 of subframe n+k. Further, sPDSCH that has been received in a second slot 2609 of subframe n is transmitted with HARQ ACK/NACK from the terminal to the base station in a second slot 2611 of subframe n+k. In the above, k may be 1 or may be 2 or 3. Likewise, an sPDSCH 2613 that has been received in the first slot of subframe n+1 is transmitted with HARQ ACK/NACK from the terminal to the base station in a first slot 2615 of subframe n+k+1. Further, sPDSCH that has been received in a second slot 2617 of subframe n+1 is transmitted with HARQ ACK/NACK from the terminal to the base station in a second slot 2619 of subframe n+k+1. In the above method, HARQ ACK/NACK information corresponding to three downlink sPDSCHs needs to be mapped to one uplink slot. In order to share the same frequency and time resources and transmit the sPUCCH resource, it is necessary to be able to distinguish the cyclic shift value or the OCC or sequence used in the reference signal DMRS by using another one. Therefore, the terminal may decide an uplink cyclic shift value, an OCC, or a sequence according to the sTTI order of one subframe in the downlink and use the uplink sPUCCH for transmission in the uplink sPUCCH and the base station may distinguish the sPUCCHs sharing the same frequency and time resources.

In the above example, the base station and the terminal may decide the sPUCCH resource based on the time when the sPDSCH ends, but the sPUCCH resource may be decoded based on the position where the sPDCCH is mapped. In this case, the sPDSCH of the first and second sTTI of subframe n of FIG. 26 is the first slot 2607 of subframe n+k and the sPDSCH of the third and fourth sTTIs of subframe n is subframe n+k.

Embodiment 2-4

Embodiment 4 provides a method for transmitting the sPDCCH or sPDSCH to the shortened TTI terminal by adjusting an OFDM symbol position where an EPDCCH starts to be transmitted or an OFDM symbol position where the PDSCH starts to be transmitted within the subframe and will be described with reference to FIG. 27.

Figure 27:
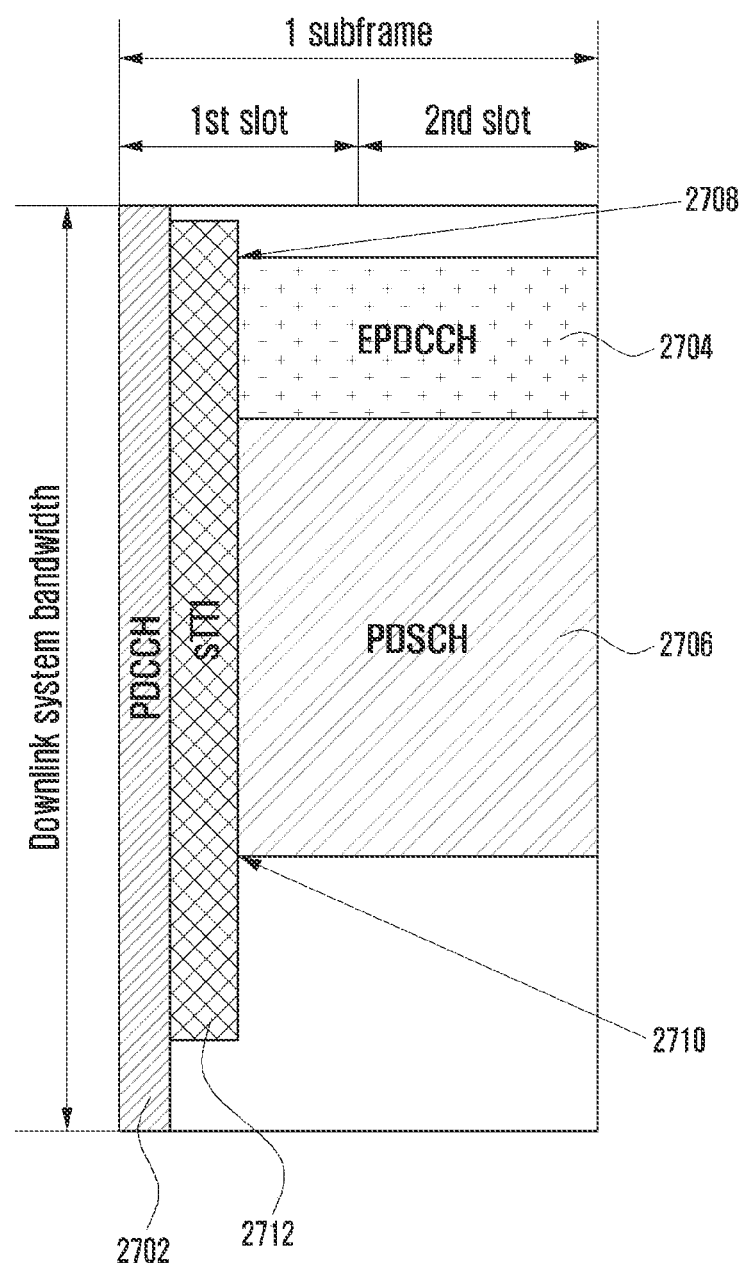
FIG. 27 is a diagram illustrating resource allocation for transmitting control signals or data signals for PDCCH, EPDCCH, PDSCH, and a control signal or a data signal for a first type terminal in one subframe according to an embodiment of the present disclosure.

FIG. 27 illustrates an example of resource assignment for the base station to transmit a PDCCH 2702, an EPDCCH 2704, a PDSCH 2706, and a control signal or data signal 2712 for the first type terminal in one subframe. The base station may use one, two, or three OFDM symbols in one subframe for the PDCCH 2702. However, in the MBSFN subframe, two OFDM symbols are used for mapping the PDCCH 2702. The OFDM symbol used for the PDCCH may be different when the system frequency spectrum is 10 PRBs or less.

Meanwhile, the base station uses specific PRBs in one subframe to map the EPDCCH 2704 for the first type or second type terminal. It is possible for the base station to signal the position 2708 of the first OFDM symbol among the OFDM symbols used for the EPDCCH mapping to the terminal. For example, the base station transfers startSymbol-r11 of EPDCCH-Config_r11 to the terminal through the higher layer signaling and the terminal determines that the value of the startSymbol-r11 is the position of the first OFDM symbol to which the EPDCCH is mapped. The value of startSymbol-r11 may have 1, 2, 3, or 4, and the value that may be a startSymbol-r11 may be different according to the system frequency spectrum.

When downlink data for the first type or second type terminal indicated by the EPDCCH 2704 is mapped to the PDSCH 2706, the PDSCH 2706 is mapped in an OFDM symbol such as the EPDCCH 2704. That is, the terminal may find the position 2710 of the OFDM symbol from which the PDSCH 2706 is to be mapped, from the value of the startSymbol-r11 of the EPDCCH-Config_r11 that is transmitted from the base station through the higher layer signaling.

In FIG. 27, the base station uses 1 or 2 OFDM symbols in the PDCCH mapping and transfers the value of startSymbol-r11 of the EPDCCH-Config_r11 to the terminal as 2 or 3 for the higher layer signaling. This results in one or two OFDM symbols 2712 between the OFDM symbol for which PDCCH 2702 mapping ends and the OFDM symbols 2708 and 2710 for which EPDCCH 2704 and PDSCH 2706 mapping starts. The base station transmits control signals or data to the first type terminal to one or two OFDM symbols 2712 between the PDCCH 2702 and the EPDDCH 2704 and the PDSCH 2706. The EPDDCH 2704 and the PDSCH 2706 and the control signal or data 2712 to the first type terminal may be for the same first type terminal or may be for the first type terminal or the second type terminal, and a first type terminal different therefrom. Although it is described that the control signal or data for the first type terminal is transmitted to the 1 or 2 OFDM symbols 2712 between the PDCCH 2702 and the EPDDCH 2704 and the PDSCH 2706, signals for other heterogeneous systems including 5G, NR, WiFi, and the like may be used.

Figure 28:
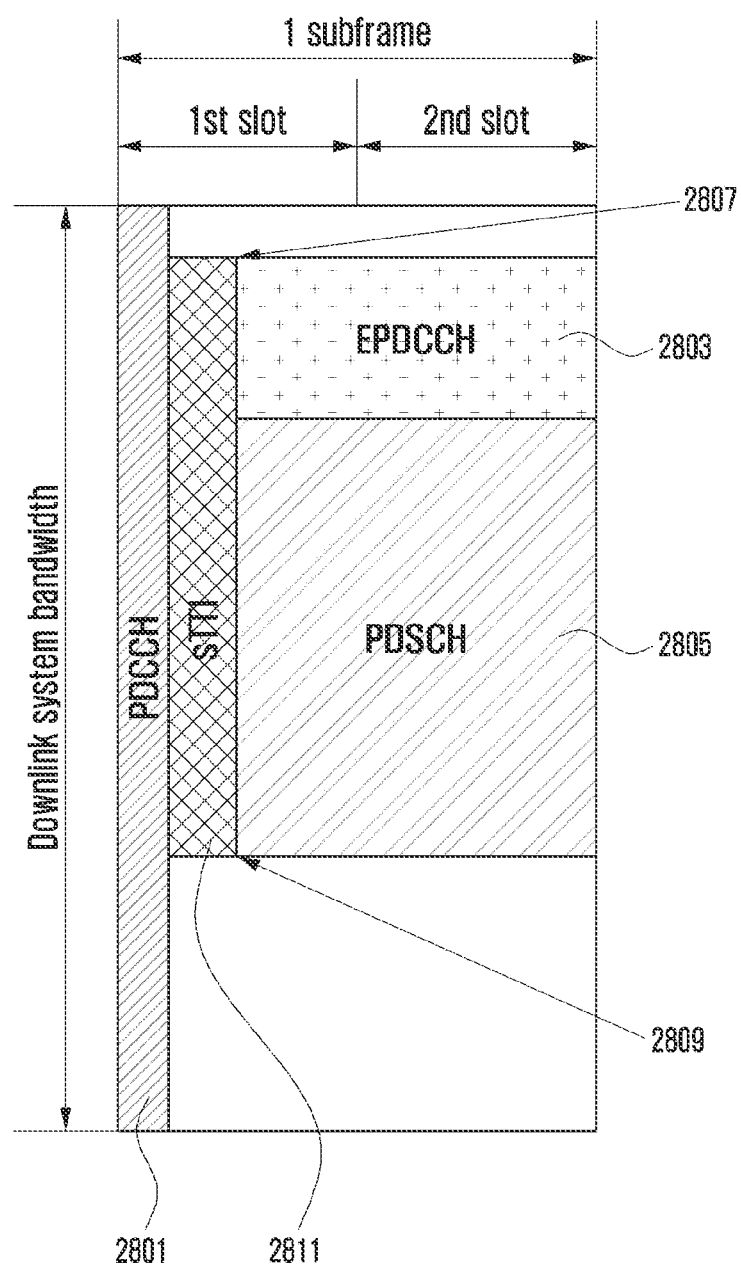
FIG. 28 is a diagram illustrating a resource allocation for configuring a PRB area allocated for a signal transmitted from a base station to the first type terminal as an area such as EPDCCH and PDSCH and transmitting the configured PRB area according to an embodiment of the present disclosure.

FIG. 28 illustrates an example in which the base station transmits the control signal or data by configuring the PRB region assigned for the signal transmitted to the first type terminal as the same region as the EPDCCH 2703 and the PDSCH 2705 at the time of transmitting the control signal or data to the first type terminal in one or two OFDM symbols 2812 between the PDCCH 2802 and the EPDDCH 2804 and the PDSCH 2806.

Figure 29:
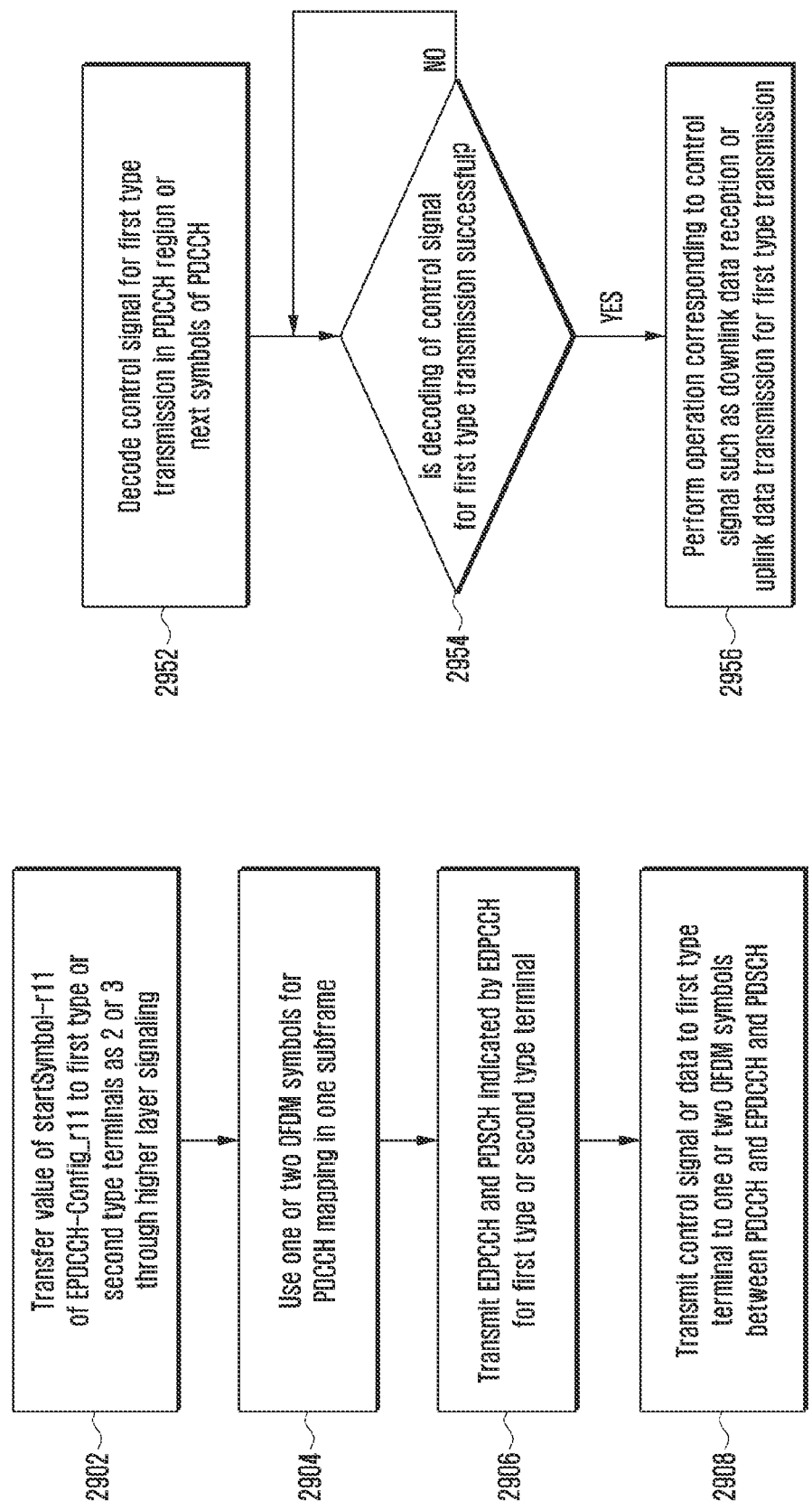
FIG. 29 is a flowchart showing operations of the base station and the first type terminal for the control signal for the first type terminal or the data transmission according to the embodiment of the present disclosure.

FIG. 29 is a flowchart illustrating operations of a base station and a first type terminal for transmitting a control signal or data for the first type terminal.

The base station transfers the value of the startSymbol-r11 of the EPDCCH-Config_r11 as 2 or 3 to the first or second type terminals by the higher layer signaling (operation 2902). The base station uses one or two OFDM symbols for PDCCH transmission in any one subframe (operation 2904). Meanwhile, the EPDCCH for the first type or the second type terminal and the EPDCCH transmit the PDSCH indicating the resource assignment (2906). When the EPDCCH is not a control signal for downlink data transmission in the same subframe, the PDSCH may not be transmitted. The base station transmits control signals or data to the first type terminal to one or two OFDM symbols between the PDCCH and the EPDDCH and the PDSCH (S2908).

The first type terminal performs control signal decoding for the first type transmission in the PDCCH area or the search area for transmission of the first type control signal among next symbols of the PDCCH (2952). When decoding of the control signal for the first type transmission is unsuccessful, decoding is attempted in the next search area. When the decoding of the control signal for the first type transmission is successful, an operation corresponding to the control signal is performed, such as downlink data reception or uplink data transmission for the first type transmission (2956).

In the above embodiment, when the number of OFDM symbols through which the PDCCH is transmitted is adjusted to 1, 2, or 3, a CFI indicating the number of OFDM symbols used for the PDCCH may be changed to a corresponding value.

Embodiment 2-5

Embodiment 2-5 provides a method for transmitting the sPDCCH or sPDSCH to the shortened TTI terminal by adjusting an OFDM symbol position where a PDSCH subjected to cross carrier scheduling starts to be transmitted within the subframe and will be described with reference to FIG. 30.

Figure 30:
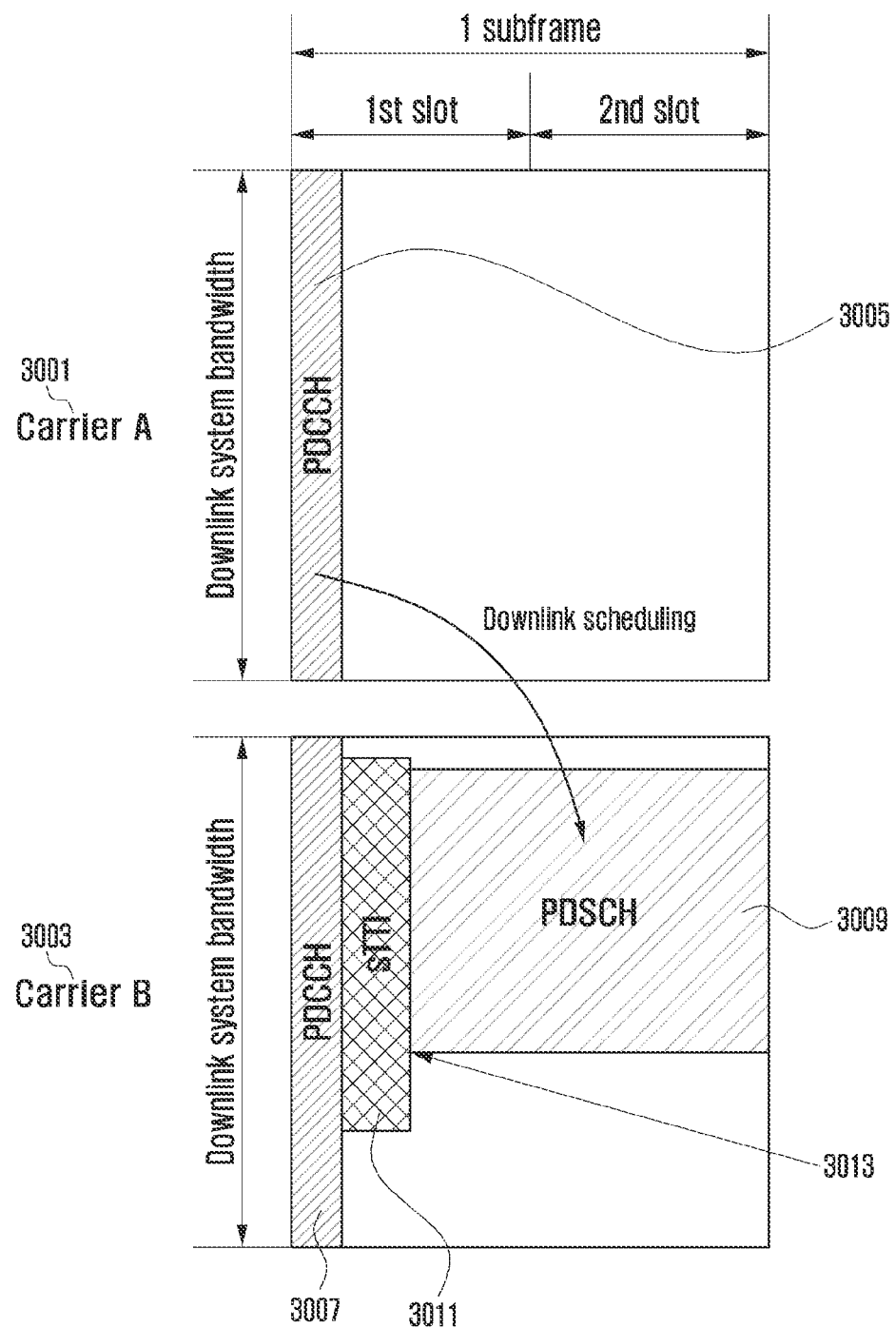
FIG. 30 is a diagram illustrating the resource allocation for transmitting the control signal or data signal for the first type terminal by cross carrier scheduling using PDCCH according to an embodiment of the present disclosure.

FIG. 30 illustrates an example of resource assignment for the base station to assign resources for a PDSCH 3009 of carrier B 3003 in a PDCCH 3005 of carrier A 3001 and transmit a control signal or data signal 3011 for the first type terminal in carrier B 3003.

The base station may use one, two, or three OFDM symbols in one subframe for the PDCCHs 3005 and 3007. However, in the MBSFN subframe, two OFDM symbols are used for mapping the PDCCHs 3005 and 3007. The OFDM symbol used for the PDCCH may be different when the system frequency spectrum is 10 PRBs or less. The PDCCH 3005 of carrier A 3001 includes scheduling information of the PDSCH 3009 of carrier B 3003.

The base station may transmit a position 3013 of the first OFDM symbol among the OFDM symbols in which the PDSCH 3009 subjected to cross carrier scheduling is transmitted in advance to the terminal that intends to receive the PDSCH 3009 of carrier B 3003 by the higher layer signaling. For example, the base station transfers pdsch-Start-r10 of CrossCarrierSchedulingConfig-r10 to the terminal through the higher layer signaling and the terminal determines that the value of the pdsch-Start-r10 is the position of the first OFDM symbol to which the PDSCH 3009 subjected to the cross carrier scheduling is mapped. The value of the pdsch-Start-r10 may have 1, 2, 3, or 4, and the value that may be the pdsch-Start-r10 may be different according to the system frequency spectrum.

Meanwhile, when the cross carrier scheduling is applied, it is possible to transmit the start position of the sPDSCH through the higher layer signaling (for example, RRC message). The terminal may confirm the pattern of the sTTI from the start position of the sPDSCH.

In FIG. 30, the base station uses 1 or 2 OFDM symbols in mapping of the PDCCH 3007 of carrier B 3003 and transfers the value of the pdsch-Start-r10 of the CrossCarrierSchedulingConfig-r10 to be transmitted through the higher layer signaling to the terminal as 2 or 3. This results in one or two OFDM symbols 3011 between the OFDM symbol for which mapping of a PDSCH 1507 of carrier B 3003 ends and an OFDM symbol 3013 for which mapping of a PDSCH 3009 cross-carrier scheduled from the PDCCH 3005 of carrier A 3001 starts. The base station transmits the control signal or data to the first type terminal to one or two OFDM symbols 3011 between the PDCCH 3007 and the PDSCH 3009 of carrier B 3003. The PDSCH 3009 and the control signal or data 3011 to the first type terminal may be for the same first type terminal or may be for the first type terminal or the second type terminal, and a first type terminal different therefrom. Although it is described that the control signal or data for the first type terminal is transmitted to the 1 or 2 OFDM symbols 3011 between the PDCCH 3007 and the PDSCH 3009 of carrier B 3003, signals for other heterogeneous systems including 5G, NR, WiFi, and the like may be used.

Figure 31:
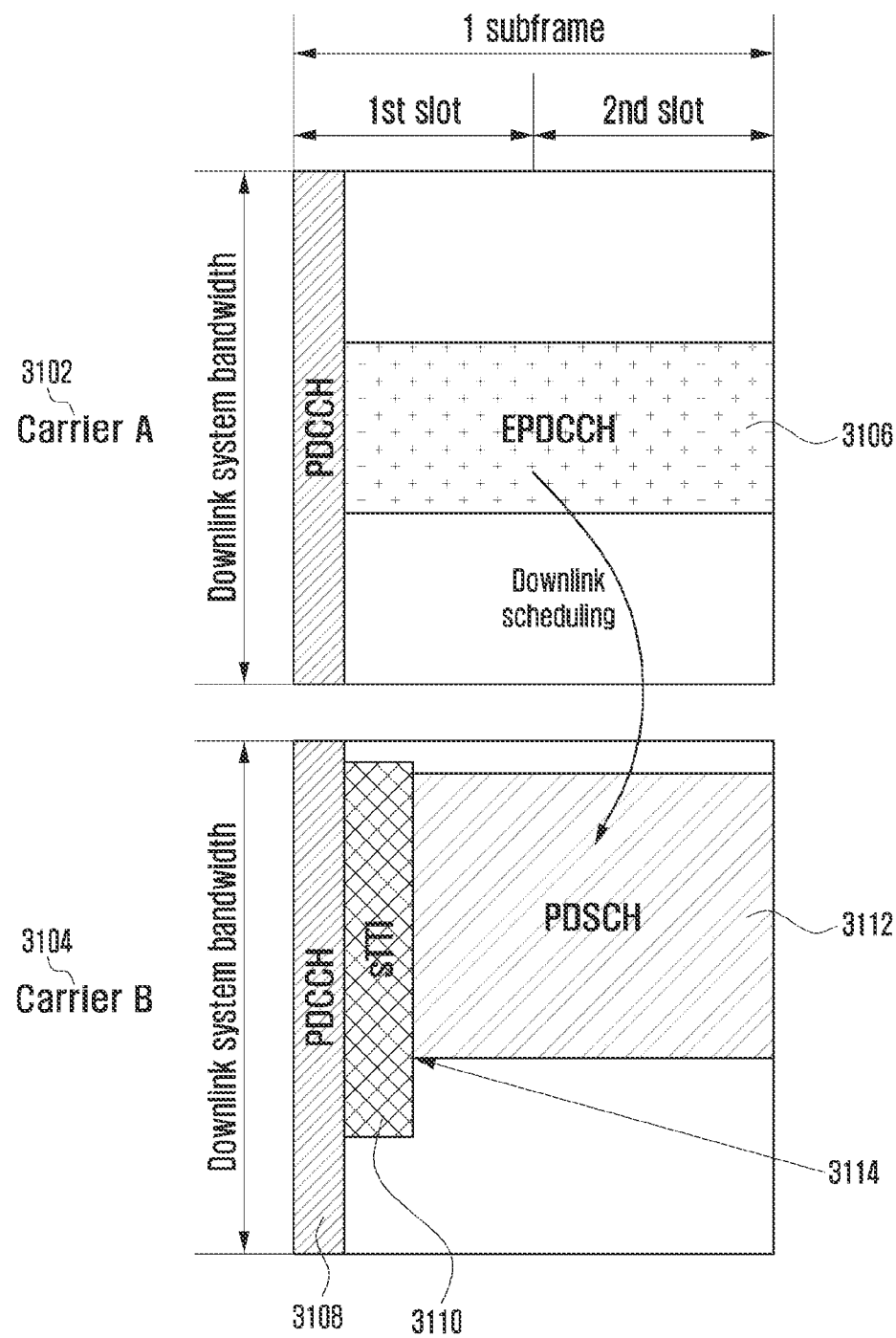
FIG. 31 is a diagram illustrating the resource allocation for transmitting the control signal or data signal for the first type terminal by the cross carrier scheduling using EPDCCH according to an embodiment of the present disclosure.

FIG. 31 illustrates an example in which the base station transfers scheduling of a PDSCH 3112 of carrier B 3104 from an EPDCCH 3106 of carrier A 3102 at the time of transmitting the control signal or data to the first type terminal in one or two OFDM symbols 3104 between a PDCCH 3108 and a PDSCH 3112 of carrier B 3104. Meanwhile, the base station uses specific PRBs in one subframe to map the EPDCCH 3106 for the first type or second type terminal.

Figure 32:
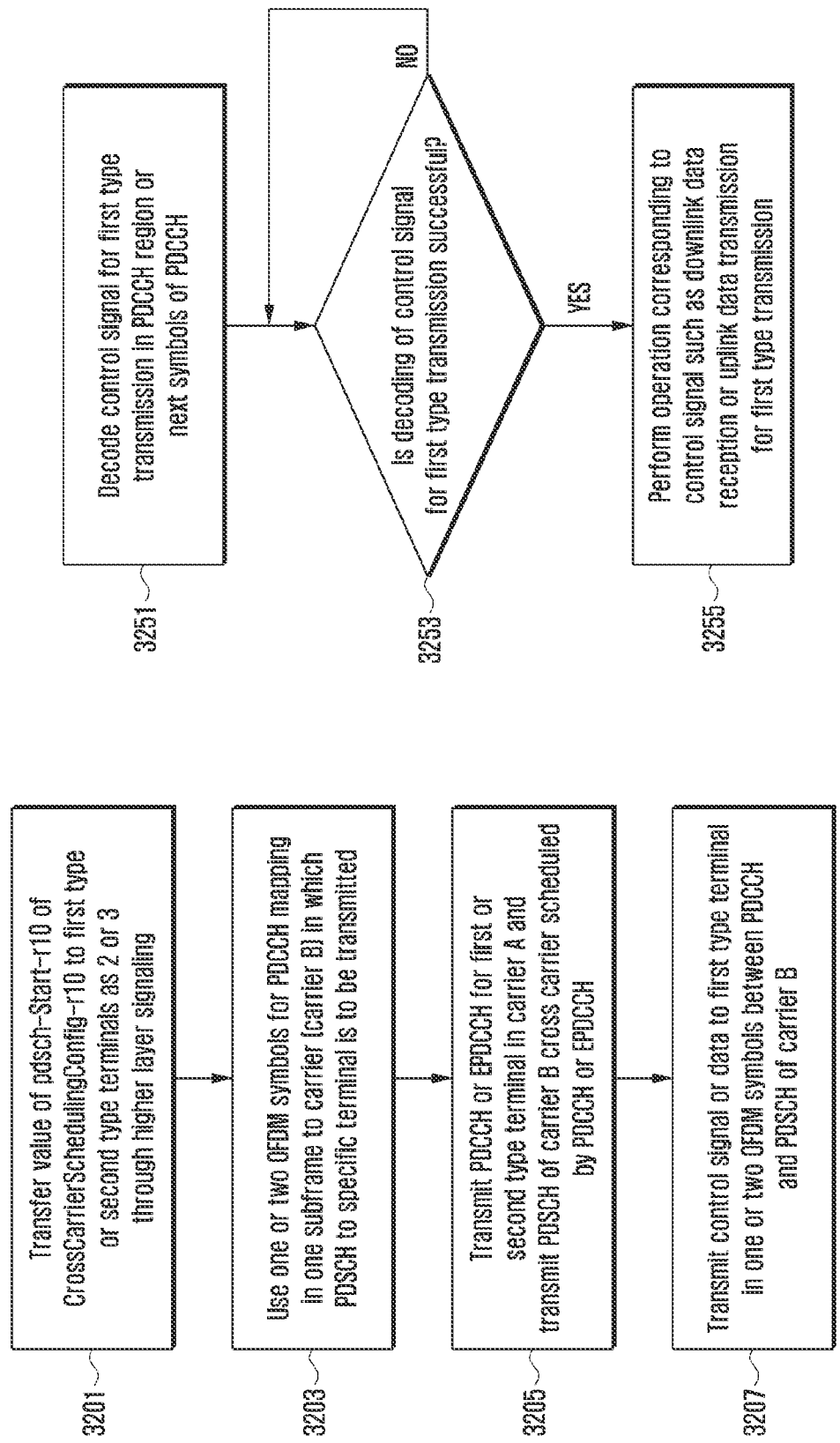
FIG. 32 is a flowchart showing the operations of the base station and the first type terminal for the control signal for the first type terminal or the data transmission according to the embodiment of the present disclosure.

FIG. 32 is a flowchart illustrating operations of a base station and a first type terminal for transmitting a control signal or data for the first type terminal.

The base station transfers the value of the pdsch-Start-r10 of the CrossCarrierSchedulingConfig-r10 as 2 or 3 to the first or second type terminals by the higher layer signaling (operation 3201). The base station uses one or two OFDM symbols in the PDCCH mapping in one subframe of the carrier (carrier B) to which the PDSCH to be transmitted to a specific terminal (operation 3203). Meanwhile, the PDCCH or EDPCCH for the first type or second type terminal is transmitted in carrier A and the PDCCH or the EPDCCH performs the PDSCH transmission in carrier B for the cross carrier scheduling (operation 3205). The base station transmits the control signal or data to the first type terminal to one or two OFDM symbols between the PDCCH and the PDSCH of carrier B (S3207).

The first type terminal performs control signal decoding for the first type transmission in the PDCCH area or the search area for transmission of the first type control signal among next symbols of the PDCCH (operation 3251). When decoding of the control signal for the first type transmission is unsuccessful, decoding is attempted in the next search area. When the decoding of the control signal for the first type transmission is successful, an operation corresponding to the control signal is performed, such as downlink data reception or uplink data transmission for the first type transmission (operation 3255).

In the above embodiment, when the number of OFDM symbols through which the PDCCH of carrier B is transmitted is adjusted to 1, 2, or 3, a CFI indicating the number of OFDM symbols used for the PDCCH may be changed to a corresponding value.

Figure 33:
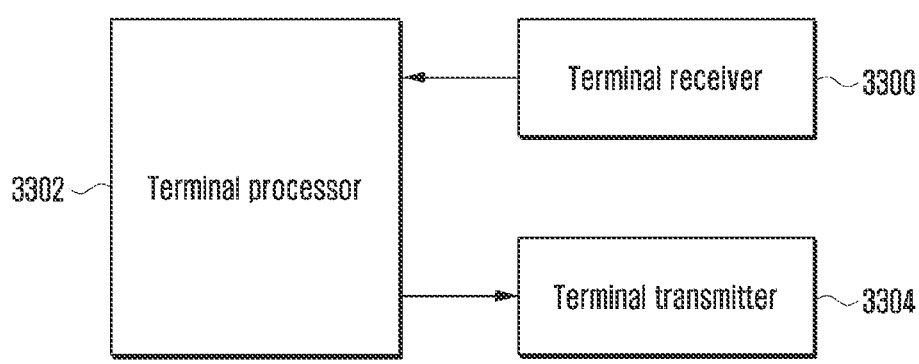
FIG. 33 is a diagram illustrating a base station apparatus according to embodiments of the present disclosure.
Figure 34:
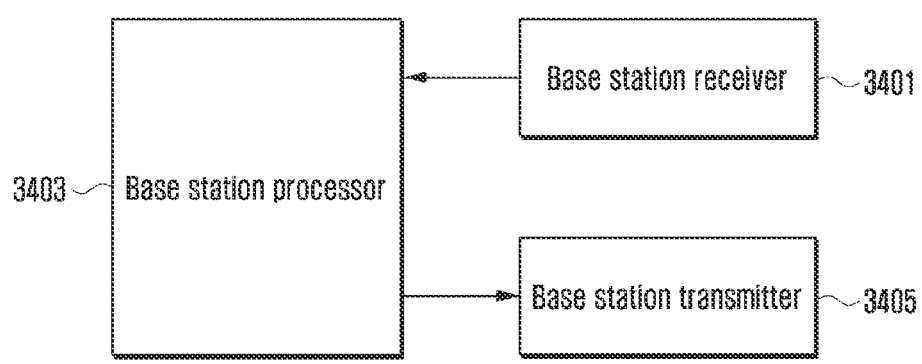
FIG. 34 is a diagram illustrating a terminal apparatus according to embodiments of the present disclosure.

In order to perform the second embodiments of the present disclosure, the transmitters, receivers, and processors of the terminal and the base station are illustrated in FIGS. 33 and 34, respectively. In order to perform the downlink and uplink transmission for the shortened-TTI from Embodiment 2-1 to Embodiment 2-5, transmission/reception methods of the base station and the terminal are illustrated and in order to perform the transmission/reception methods, the receiver, processors, and transmitters of the base station and the terminal need to operate according to the embodiments, respectively.

Specifically, FIG. 33 is a block diagram illustrating an internal structure of a terminal according to an embodiment of the present disclosure.

As illustrated in FIG. 33, the terminal of the present disclosure may include a terminal receiver 3300, a terminal transmitter 3304, and a terminal processor 3302. The terminal receiver 3300 and the terminal transmitter 3304 may collectively be referred to as a transceiver in the embodiment of the present disclosure. The transceiver may transmit/receive a signal to/from the base station. The signal may include control information and data. To this end, the transceiver may include an RF transmitter for up-converting and amplifying a frequency of the transmitted signal and an RF receiver for low-noise amplifying the received signal and down-converting the frequency. The transceiver may receive the signal through a radio channel, output the signal to the terminal processor 3302, and transmit the signal output from the terminal processor 3302 through the radio channel.

The terminal processor 3302 may control a series of processes so that the terminal may operate according to the embodiment of the present disclosure described above. The terminal processor 3302 may be referred to as a controller or a control unit. The controller may include at least one processor. The controller may perform the operation of the terminal according to Embodiment 2 of the present disclosure described with reference to FIGS. 17 to 32 as well as the operation of FIG. 33.

FIG. 34 is a block diagram illustrating the internal structure of a base station according to an embodiment of the present disclosure.

As illustrated in FIG. 34, the base station of the present disclosure may include a base station receiver 3401, a base station transmitter 3405, and a base station processor 3403. The base station receiver 3401 and the base station transmitter 3405 are collectively referred to as a transceiver in the embodiment of the present disclosure. The transceiver may transmit/receive a signal to/from the terminal. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal on a radio channel and output the received signal to the base station processor 3403 and transmit the signal output from the base station processor 3403 on the radio channel.

The base station processor 3403 may control a series of process to operate the base station according to the embodiment of the present disclosure as described above. For example, the base station processor 3403 decides which type of terminal a scheduling target terminal is of the first type terminal and the second type terminal and when the scheduling target terminal is the first type terminal, the base station processor 3403 control to generate the control information based on the control information for the first type terminal. In this case, the length of the transmission time interval for the first type terminal is shorter than the transmission time interval for the second type terminal.

Further, according to an embodiment of the present disclosure, the base station processor 3403 may control to generate downlink control information (DCI) for the first type terminal. In this case, the DCI may indicate the control information for the first type terminal. Further, according to an embodiment of the present disclosure, the base station processor 3403 may control to generate the downlink control information (DCI) for the first type terminal based on a terminal identifier for the first type terminal. Further, according to an embodiment of the present disclosure, the base station processor 3403 may control to map the downlink control information (DCI) for the first type terminal to a search space for the first type terminal. Further, according to an embodiment of the present disclosure, the base station processor 3403 may control to generate the downlink control information (DCI) including resource allocation information of a data channel for the first type terminal. In addition, according to an embodiment of the present disclosure, the base station processor 1103 may control to map enhanced control information for the first type terminal to a resource block to which the enhanced control information for the first type terminal may be mapped.

In addition, according to an embodiment of the present disclosure, the base station processor 3403 may control to set and transmit the number of resource blocks in which an uplink control information format for the first type terminal is usable, assign and transmit resources for the first type terminal in the set resource block to each terminal, and transmit the control information and data corresponding to the control information according to the resources assigned to each terminal.

The base station processor 3403 may be referred to as the controller or the control unit. The controller may include at least one processor. The controller may perform the operation of the base station according to Embodiment 2 of the present disclosure described with reference to FIGS. 17 to 32 as well as the operation of FIG. 34.

Some of Embodiments 2-1 and 2-2 and Embodiments 2-3, 2-4, and 2-5 of the present disclosure may be combined with each other to operate the base station and the terminal. In addition, although the present disclosure is described based on the LTE or LTE-A system for the sake of understanding, the present disclosure can be easily implemented in a 5G or new radio (NR) system. It is also apparent to those skilled in the art that the present disclosure is applicable to a 5G or NR terminal other than the shortened TTI terminal.

The embodiments of the present disclosure disclosed in the present specification and the accompanying drawings have been provided only as specific examples in order to assist in understanding the present disclosure and do not limit the scope of the present disclosure. That is, it is obvious to those skilled in the art to which the present disclosure pertains that other change examples based on the technical idea of the present disclosure may be made without departing from the scope of the present disclosure. Further, each embodiment may be combined and operated as needed.

What is claimed:

1. A method performed by a terminal, the method comprising:
receiving, from a base station, downlink control information (DCI) including information associated with a position and a number of symbols; and
transmitting, to the base station, uplink data through a physical uplink shared channel (PUSCH) based on information associated with a number of a plurality of time domain scheduling units and the information associated with the position and the number of symbols,
wherein the information associated with the position and the number of symbols is applied to each of the plurality of time domain scheduling units.

2. The method of claim 1, wherein the DCI indicates a relation between a reception of the DCI and a transmission of the uplink data.

3. The method of claim 1, wherein the information associated with the number of the plurality of time domain scheduling units is received via a radio resource control (RRC) message, and
wherein the time domain scheduling unit consists of a plurality of symbols.

4. The method of claim 1, wherein the information associated with the number of the plurality of time domain scheduling units is obtained based on the DCI.

5. The method of claim 1, wherein the number of the plurality of time domain scheduling units is one of two, four, or eight.

6. A method performed by a base station, the method comprising:
transmitting, to a terminal, downlink control information (DCI) including information associated with a position and a number of symbols; and
receiving, from the terminal, uplink data through a physical uplink shared channel (PUSCH) based on information associated with a number of a plurality of time domain scheduling units and the information associated with the position and the number of symbols,
wherein the information associated with the position and the number of symbols is applied to each of the plurality of time domain scheduling units.

7. The method of claim 6, wherein the DCI indicates a relation between a reception of the DCI and a transmission of the uplink data.

8. The method of claim 7, wherein the information associated with the number of the plurality of time domain scheduling units is received via a radio resource control (RRC) message, and
wherein the time domain scheduling unit consists of a plurality of symbols.

9. The method of claim 6, wherein the information associated with the number of the plurality of time domain scheduling units is obtained based on the DCI.

10. The method of claim 6, wherein the number of the plurality of time domain scheduling units is one of two, four, or eight.

11. A terminal, comprising:
a transceiver; and
a controller configured to:
receive, from a base station via the transceiver, downlink control information (DCI) including information associated with a position and a number of symbols, and
transmit, to the base station via the transceiver, uplink data through a physical uplink shared channel (PUSCH) based on information associated with a number of a plurality of time domain scheduling units and the information associated with the position and the number of symbols, wherein the information associated with the position and the number of symbols is applied to each of the plurality of time domain scheduling units.

12. The terminal of claim 11, wherein the DCI indicates a relation between a reception of the DCI and a transmission of the uplink data.

13. The terminal of claim 12, wherein the information associated with the number of the plurality of time domain scheduling units is received via a radio resource control (RRC) message, and wherein the time domain scheduling unit consists of a plurality of symbols.

14. The terminal of claim 11, wherein the information associated with the number of the plurality of time domain scheduling units is obtained based on the DCI.

15. The terminal of claim 11, wherein the number of the plurality of time domain scheduling units is one of two, four, or eight.

16. A base station, comprising:

a transceiver; and a controller configured to:

transmit, to the terminal via the transceiver, downlink control information (DCI) including information associated with a position and a number of symbols, and receive, from the terminal via the transceiver, uplink data through a physical uplink shared channel (PUSCH) based on information associated with a number of a plurality of time domain scheduling units and the information associated with the position and the number of symbols, wherein the information associated with the position and the number of symbols is applied to each of the plurality of time domain scheduling units.

17. The base station of claim 16, wherein the DCI indicates a relation between a reception of the DCI and a transmission of the uplink data.

18. The base station of claim 17, wherein the information associated with the number of the plurality of time domain scheduling units is received via a radio resource control (RRC) message, and wherein the time domain scheduling unit consists of a plurality of symbols.

19. The base station of claim 16, wherein the information associated with the number of the plurality of time domain scheduling units is obtained based on the DCI.

20. The base station of claim 16, wherein the number of the plurality of time domain scheduling units is one of two, four, or eight.

* * * * *